(12) United States Patent
Ukita et al.

(10) Patent No.: US 8,817,677 B2
(45) Date of Patent: Aug. 26, 2014

(54) POWER CONTROL DEVICE FOR HOME APPLIANCES

(75) Inventors: Yosuke Ukita, Osaka (JP); Hironori Nakae, Osaka (JP); Hiroshi Hayashino, Hyogo (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 13/390,549

(22) PCT Filed: Jun. 9, 2011

(86) PCT No.: PCT/JP2011/003262
§ 371 (c)(1),
(2), (4) Date: Feb. 15, 2012

(87) PCT Pub. No.: WO2011/158470
PCT Pub. Date: Dec. 22, 2011

(65) Prior Publication Data
US 2012/0147802 A1 Jun. 14, 2012

(30) Foreign Application Priority Data
Jun. 18, 2010 (JP) ................................. 2010-139585

(51) Int. Cl.
*H04B 7/00* (2006.01)
(52) U.S. Cl.
USPC .......................................... 370/310; 370/311
(58) Field of Classification Search
USPC .......................................................... 370/311
See application file for complete search history.

(56) References Cited

U.S. PATENT DOCUMENTS

| 2004/0116786 A1 | 6/2004 | Iijima et al. |
| 2006/0193287 A1 | 8/2006 | Ooshima et al. |
| 2009/0040954 A1* | 2/2009 | Usuba .......................... 370/311 |
| 2009/0135836 A1* | 5/2009 | Veillette ....................... 370/400 |
| 2009/0195349 A1 | 8/2009 | Frader-Thompson et al. |

(Continued)

FOREIGN PATENT DOCUMENTS

| JP | 2004-234622 | 8/2004 |
| JP | 2006-238320 | 9/2006 |

(Continued)

OTHER PUBLICATIONS

International Search Report issued Sep. 13, 2011 in International (PCT) Application No. PCT/JP2011/003262.

(Continued)

*Primary Examiner* — Hassan Kizou
*Assistant Examiner* — Deepa Belur
(74) *Attorney, Agent, or Firm* — Wenderoth, Lind & Ponack, L.L.P.

(57) ABSTRACT

An energy controller, as a communication device, transmits and receives data by transmitting a signal for establishing transmission and reception of the data to network-connected home appliances. The energy controller includes a power saving control unit that determines a transmission period such that the transmission period during which the signal is transmitted is increased as a power value difference increases, which is a value obtained by subtracting the total power consumption value of a power consumption appliance from available power supply value to the power consumption appliance including the network-connected home appliances; and a wireless communication IF for transmitting the signal containing the information indicating the transmission period to the network-connected home appliances in order to set the network-connected home appliances in an active state with a period according to the transmission period.

14 Claims, 47 Drawing Sheets

(56) References Cited

U.S. PATENT DOCUMENTS

| | | | |
|---|---|---|---|
| 2009/0287433 A1 | 11/2009 | Houston et al. | |
| 2010/0318235 A1* | 12/2010 | Moss | 700/295 |
| 2011/0046792 A1* | 2/2011 | Imes et al. | 700/278 |
| 2011/0116429 A1* | 5/2011 | Jeon et al. | 370/311 |
| 2011/0202189 A1* | 8/2011 | Venkatakrishnan et al. | 700/286 |
| 2011/0243050 A1* | 10/2011 | Yanover | 370/311 |
| 2011/0313695 A1 | 12/2011 | Houston et al. | |
| 2012/0261991 A1* | 10/2012 | Tatar et al. | 307/48 |
| 2012/0316808 A1 | 12/2012 | Frader-Thompson et al. | |
| 2013/0018608 A1 | 1/2013 | Houston et al. | |
| 2014/0088895 A1 | 3/2014 | Houston et al. | |

FOREIGN PATENT DOCUMENTS

| | | |
|---|---|---|
| JP | 2007-006579 | 1/2007 |
| WO | 2009/097400 A1 | 8/2009 |
| WO | 2009/151289 A2 | 12/2009 |

OTHER PUBLICATIONS

Extended European Search Report issued May 12, 2014 in corresponding European Application No. 11795378.6.

\* cited by examiner

FIG. 4

| No. | Item name (model number) | Appliance address | Maximum power consumption (W) | Maximum rate of change (W/sec) |
|---|---|---|---|---|
| 1 | Television (THA1) | 0x0011 | 400 | 80 |
| 2 | Water heater pot (NCX1) | 0x0012 | 800 | 400 |
| 3 | Microwave oven (NER3) | 0x0013 | 1600 | 800 |
| 4 | Air conditioner (N345) | 0x0014 | 2000 | 200 |
| ... | ... | ... | ... | ... |

| Date (Y:M:D) | Time (H:M:S) | Home power generation supply capability value | | Total power consumption value (W) |
|---|---|---|---|---|
| | | Generated power value (W) | Accumulated power value (W) | |
| ... | ... | ... | ... | ... |
| 2010/1/19 | 11:00:30 | 3000 | 2000 | 220 |
| 2010/1/19 | 11:00:31 | 3010 | 1990 | 200 |
| ... | ... | ... | ... | ... |

| No. | Item name (model number) | Appliance address | Current power consumption (W) | Peak suppression information 52a | |
|---|---|---|---|---|---|
| | | | | Peak suppression possibility yes/no | Type |
| 1 | Television (THA1) | 0x0011 | 380 | Yes | Power supply OFF |
| 2 | Water heater pot (NCX1) | 0x0012 | 2 | No | — |
| 3 | Microwave oven (NER3) | 0x0013 | 1 | No | — |
| 4 | Air conditioner (N345) | 0x0014 | 20 | Yes | Room temperature change |
| ... | ... | ... | ... | ... | ... |

FIG. 14

| Date (Y:M:D) | Time (H:M:S) | Electric power rate change boundary value (W) | Distribution board supply capability value (W) | Total power consumption value (W) |
|---|---|---|---|---|
| ... | ... | ... | ... | ... |
| 2010/1/19 | 11:00:30 | 4500 | 5000 | 320 |
| 2010/1/19 | 11:00:31 | 4500 | 5000 | 300 |
| ... | ... | ... | ... | ... |

| Pattern | Beacon period (msec) |
|---|---|
| 1 | 15 |
| 2 | 100 |
| 3 | 500 |
| 4 | 1000 |
| 5 | 5000 |
| 6 | 30000 |
| 7 | 60000 |
| 8 | 120000 |

| Application | Allowable delay time (msec) |
|---|---|
| Visualization of power consumption | 5000 |
| Peak suppression | 500 |
| ⋮ | ⋮ |

82a

POWER CONTROL DEVICE FOR HOME APPLIANCES

BACKGROUND OF INVENTION

1. Technical Field

The present invention relates to a communication device and a communication method in a wireless network system such as WLAN (Wireless Local Area Network) of IEEE (Institute of Electrical and Electronics Engineers) 802.11 standard, or WPAN (Wireless Personal Area Network) of EEE 802.15 standard.

2. Background Art

In recent years, attention is being focused on a network shared by wireless terminals with low power consumption, such as WPAN or a sensor network. As a system like system, there is a system called Active RF (Radio Frequency) which sends a radio signal itself.

FIG. 43 is a diagram showing an example of a conventional wireless network configuration.

In FIG. 43, the wireless network includes a control station 1001 which is a wireless control station, and terminal devices 1002, 1003, 1004 which are a plurality of wireless terminal devices. The control station 1001 periodically broadcasts a beacon packet including control information to the terminal devices 1002 to 1004. The terminal devices 1002 to 1004 communicate with the control station 1001 based on the control information.

Various access control methods may be used for the control station 1001 and the terminal devices 1002 to 1004. For example, CSMA (Carrier Sense Multiple Access), TDMA (Time Division Multiple Access) or FDMA (Frequency-Division Multiple Access) may be used.

The wireless devices used in these wireless networks (the control station 1001, and the terminal devices 1002 to 1004) have a feature of low power consumption performance. For example, in order to reduce the power consumption of the wireless devices, a wireless network has a configuration in which an active time interval during which communication is performed in the wireless network, and an inactive time interval during which communication is not performed and the terminal devices may shift to a sleep state are provided. When the inactive time interval is increased, a sleep state can be maintained for a longer time, and thus power consumption may be reduced.

FIG. 44 shows an example of a frame period. Specifically, FIG. 44 shows the relationship between a conventional beacon period, an active time interval, and an inactive time interval.

In FIG. 44, 1 frame period includes an active time interval 1007 and an inactive time interval 1008. The active time interval 1007 is a time interval during which the control station, and the terminal devices 1002 to 1004 communicate with each other.

The inactive time interval 1008 is a time interval during which the control station 1001 and the terminal devices 1002 to 1004 do not communicate with each other, and thus the terminal devices 1002 to 1004 may reduce the power consumption by shifting to a sleep state. Even in the active time interval 1007, a terminal device which does not perform communication may reduce the power consumption by shifting to a sleep state.

The control station 1001 and the terminal devices 1002 to 1004 share and use the active time interval. The control station 1001 uses an initial portion of the active time interval to broadcast a beacon frame 1009. That is to say, the beacon period 1006 is the sum of the active time interval 1007 and the inactive time interval 1008.

The active time interval except the time interval during which a as beacon frame is broadcasted is used for communication between the control station 1001 and the terminal devices 1002 to 1004, and for example, CSMA may be used. The active time interval may be divided into a plurality of time slots, and slots may be shared and used by Slot CSMA or TDMA. For example, in the IEEE 802.15.4 standard, the first half time slot of the active time interval is used for competition access by CSMA, and the second half time slot of the active time interval is used for communication where each time slot is assigned to a wireless device which may be used during the time slot.

The beacon frame contains control information related to a frame, such as the number of these time slots, their assignment, the length of the active time interval, the length of the inactive time interval, and the time until the subsequent beacon frame is transmitted.

FIG. 45 is a flowchart showing an example of a sequence of data communication from the conventional control station 1001 to the terminal device 1002.

As shown in FIG. 45, when data to be transmitted to the terminal device 1002 is generated (S1010), the control station 1001 buffers the data. The control station 1001 adds information as buffered data to a beacon frame, the buffered data to be transmitted to the terminal device 1002. For example, in the IEEE 802.15.4 standard, the control station 1001 adds Data Pending Address List to the beacon frame, and broadcasts the beacon frame at the initial time of the active time interval (S1011). However, in IEEE 802.11 standard, the control station 1001 adds TIM (Traffic Indication Message) to the beacon frame instead of Data Pending Address List, and broadcasts the beacon frame at the initial time of the active time interval.

The terminal device 1002 shifts from a sleep state to an active state at the timing when receiving a beacon frame, and then receives the beacon frame (S1011). The beacon frame contains information such as the length of the active time interval, the length of the inactive time interval, and the time until the subsequent beacon frame is transmitted, Data Pending information. The terminal device 1002 shifts to an active state at the timing when receiving a beacon frame without fail, and then receives the beacon frame.

The terminal device 1002 analyzes the Data Pending information of the beacon frame (S1012). The terminal device 1002, when recognizing that there is data addressed to the self device, transmits a data request to the control station 1001 (S1013). The control station 1001, when receiving a data request (S1013), transmits the buffered data to the terminal device 1002 (S1014). The terminal device 1002 returns ACK which is an arrival acknowledgement signal to the control station 1001 (S1015).

As described above, the terminal device 1002 shifts from a sleep state to an active state at the timing when receiving a periodically transmitted beacon frame, and checks whether or not there is data addressed to the self device based on the beacon frame. When there is data addressed to the self device, the terminal device 1002 inquires about the data to the control station and receives the data. The terminal device 1002 shifts to a sleep state and keeps the state until subsequent timing of receiving a beacon frame. On the other hand, when there is no data addressed to the self device, the terminal device 1002 immediately shifts to a sleep state and keeps the state until subsequent timing of receiving a beacon frame. By these operations, low power consumption of the terminal device 1002 is achieved.

That is to say, in order to achieve significantly low power consumption of the terminal device 1002, a method may be considered in which the time during which the terminal device 1002 is in a sleep state is increased, and the period of the beacon frame is increased. However, while the low power consumption of the terminal device 1002 may be achieved, the buffering time in the control station 1001 increases, and thus the delay time until the data is delivered to the terminal device 1002 increases. This presents a problem for application for which real time performance and immediacy are demanded.

For the above-mentioned problem, a method disclosed in Patent Literature 1 collects statistics on the past record of the time information of the data frame which is received by the terminal device, and then determines whether the data traffic is periodical (stream) or continuous (burst). When the data received by the terminal device is periodical (stream) data, the transmission period of the beacon frame from the control station is changed in accordance with the reception interval of the data. On the other hand, when the data received by the terminal device is continuous (burst) data, a time interval during which data is continuous, and a time interval during which no data transfer is found for the time being are distinguished, and it is determined whether an active state is continued or a sleep state is activated according to the distinguished time interval. Accordingly, in Patent Literature 1, delay of data reception is reduced, real time performance is maintained, and improvement of power saving effect is achieved.

CITATION LIST

Patent Literature

[PTL 1]
Japanese Unexamined Patent Application Publication No. 2006-238320

SUMMARY OF INVENTION

Here, in the above-mentioned Patent Literature 1, it is necessary to determine whether received data is stream data or burst data, and further to determine a time interval during which data is continuous, or a time interval during which no data transfer is found for the time being based on the statistics of reception record of data frame. However, there may be no regularity of received data depending on application, and thus there is a problem in that whether an active state is continued or a sleep state is activated cannot be determined.

For example, as an example of application without the regularity of data, peak suppression by EMS (Energy Management System) may be taken.

FIG. 46 is a diagram showing an example of a network configuration which achieves EMS application in a house. An energy controller 1021 serves as a wireless control station. The network-connected home appliances 1022, 1023, 1024 each serve as a wireless terminal device. A distribution board 1025 can measure the total power consumption in a house, and notifies the information to the energy controller 1021. Total power consumption is the sum of the power which is consumed by a plurality of appliances such as home appliances that are in use at the same time. The unit used is, for example, Watt (W). Other units of electric power amount include Watt hour (Wh) and kilo Watt hour (kWh). A network-connected home appliance is a home appliance which has a communication function and is to be connected to a network.

FIG. 47A and FIG. 47B are diagrams each showing an example of a correspondence between the total power consumption and time. Specifically, FIG. 47A shows an example of a temporal variation in total power consumption 1031 in a house. FIG. 47B shows an example of a temporal variation in the total power consumption 1031 when peak suppression is performed.

As shown in FIG. 47A, a dotted line shows a maximum available power value 1032. The maximum available power value 1032 is, for example, a permissible value of a breaker (interrupter) of the distribution board, an amount of supply from a power company, an electric power rate change boundary value, or a home power generation supply amount by a solar power generation device, or a fuel cell device. The maximum available power value 1032 is an example of a permissible value of the breaker of the distribution board.

When the total power consumption 1031 exceeds the maximum available power value 1032 at time T1, a breaker trips, for example, and electric power supply to an appliance, which is in operation, is stopped. It is not preferable to turn off some appliances while in operation, such as a microwave oven, a rice cooker, a washing machine, a personal computer, and HDD recorder in recording.

Thus, peak suppression is known that recognizes the operational situation of each appliance and the total power consumption in real time, and controls the total power consumption value 1031 so as to not exceed the available power supply value 1032. For example, as shown in FIG. 47B, peak suppression threshold value 1033 which is less than the maximum available power value 1032 is provided. When the total power consumption 1031 exceeds the peak suppression threshold value 1033, the energy controller 1021 suppresses the total power consumption 1031 by remotely controlling the turn-off of the network-connected home appliances 1022 to 1024, and changing the setting item.

This is also called peak shaving. The total power consumption 1031 may be reduced, for example, by turning off the power supply of a home appliance such as a light or a television, changing the preset temperature of an air-conditioner, changing strong wind mode to power-saving mode of an air-conditioner, or reducing the illuminance of a light.

In FIG. 47B, the total used power 1031 exceeds the peak suppression threshold value 1033 at time T2. FIG. 47B shows an example in which the total power consumption 1031 has not exceeded the maximum available power value 1032 because peak suppression has been performed.

Other than such a peak cut, there is known a peak shift which shifts the peak time of the total power consumption.

As described above, control with less delay is demanded for peak suppression of EMS, while a temporal variation in the total power consumption varies in accordance with various factors such as household, time zone, area, season, climate, country. It is not easy to learn statistics of the regularity of the data. Consequently, there is a problem in that it is difficult to achieve low power consumption and real time performance (low delay, immediacy) of the communication terminal devices at the same time for applications such as peak suppression with no regularity of data.

The present invention solves the above-described existing problem, and it is an object of the invention to provide a communication device and a communication method that can achieve low power consumption and real time performance of the communication terminal devices at the same time for applications such as peak suppression with no regularity of data.

In order to solve the above-described conventional problem, a communication device according to an aspect of the present invention is a communication device for transmitting and receiving data to and from a communication terminal device by transmitting a signal for establishing transmission and reception of the data to the communication terminal device when the communication terminal device, which alternately switches between an active state and a sleep state, is in the active state, the active state being a state in which communication is possible, and the sleep state being a state in which communication is not possible, the communication device including: a power saving control unit configured to determine a transmission period in such a manner that the transmission period during which the signal is transmitted is increased as a power value difference increases which is a value obtained by subtracting a total power consumption value of a power consumption appliance including the communication terminal device from an available power supply value to the power consumption appliance; and a communication interface unit configured to transmit the signal containing information indicating the determined transmission period to the communication terminal device so as to set the communication terminal device in the active state with a period according to the determined transmission period.

With this configuration, the communication device as the control station transmits a signal containing information indicating a transmission period to the communication terminal device, the transmission period being determined in such a manner that the transmission period is increased as a power value difference increases, which is the difference between the available power supply value to the power consumption appliance and the total power consumption value of the power consumption appliance. That is to say, the transmission period of a signal is calculated based on the information of the remaining available power. Consequently, the peak suppression to control the total power consumption value so as to not exceed the available power supply value is performed and controlled without delay, while a longer transmission period of a signal is set for a larger power value difference. When a longer transmission period of a signal is set, the communication terminal device may maintain the sleep state for a long time. Therefore, low power consumption and real time performance of the communication terminal devices may be achieved at the same time even in applications such as peak suppression with no regularity of data.

Preferably, the communication device further includes a power management storage unit configured to store a generated power value of a power generator, an accumulated power value of a power accumulator, and the total power consumption value of the power consumption appliance, wherein the power saving control unit is configured to calculate the power value difference by subtracting the total power consumption value from the available power supply value, which is set to a sum of the generated power value and the accumulated power value, and to determine the transmission period such that the transmission period is increased as the calculated power value difference increases.

With this configuration, the communication device as the control station determines a transmission period in such a manner that the transmission period is increased as a power value difference increases, which is obtained by subtracting the total power consumption value from the sum of the generated power value and the accumulated power value. That is to say, a transmission period is calculated based on the information of the power value obtained by subtracting the total power consumption from the power that is generated in a house or its local area, i.e., the remaining power which is available from home power generation, home power accumulation without purchasing the power from a commercial electric power system of a power company. Consequently, the peak suppression to control the total power consumption value so as to not exceed the remaining power which is available from home power generation, home power accumulation is performed and controlled without delay, while a longer transmission period of a signal is set for a larger power value difference. When a longer transmission period of a signal is set, the communication terminal device may maintain the sleep state for a long time. Therefore, low power consumption and real time performance of the communication terminal devices may be achieved at the same time even in applications such as peak suppression with no regularity of data.

In addition, the communication device may further include a power management storage unit configured to store an electric power rate change boundary value which is an electric power value at which an electric power rate is incremented, and the total power consumption value of the power consumption appliance, wherein the power saving control unit is configured to calculate the power value difference by subtracting the total power consumption value from the available power supply value, which is set to the electric power rate change boundary value, and to determine the transmission period such that the transmission period is increased as the calculated power value difference increases.

With this configuration, the communication device as the control station determines a transmission period in such a manner that the transmission period is increased as a power value difference increases, which is obtained by subtracting the total power consumption value from the electric power rate change boundary value. That is to say, a transmission period of a signal is calculated based on the information of the power value obtained by subtracting the total power consumption from the power of the contracted electric power rate change boundary value of a power company, i.e., the information of the power available with the current contracted electric power rate. Consequently, the peak suppression to control the total power consumption value so as to not exceed the current contracted electric power rate boundary value is performed and controlled without delay, while a longer transmission period of a signal is set for a larger power value difference. When a longer transmission period of a signal is set, the communication terminal device may maintain the sleep state for a long time. Therefore, low power consumption and real time performance of the communication terminal devices may be achieved at the same time even in applications such as peak suppression with no regularity of data.

In addition, the communication device may further include a power management storage unit configured to store a distribution board supply capability value indicating a power value that can be supplied by a distribution board, and the total power consumption value of the power consumption appliance, wherein the power saving control unit is configured to calculate the power value difference by subtracting the total power consumption value from the available power supply value, which is set to the distribution board supply capability value, and to determine the transmission period such that the transmission period is increased as the calculated power value difference increases.

With this configuration, the communication device as the control station determines a transmission period in such a manner that the transmission period is increased as a power value difference increases, which is obtained by subtracting the total power consumption value from the distribution board supply capability value. That is to say, a transmission period of a signal is calculated based on the information of the power value obtained by subtracting the total power consumption from the supply capability power of the distribution board, e.g., the limit value of the breaker (interrupter) of the distribution board, i.e., the information of the available power supply from the current distribution board. Consequently, the peak suppression to control the total power consumption value so as to not exceed the current supply capability limit value of the distribution board is performed and controlled without delay, while a longer transmission period of a signal is set for a larger power value difference. When a longer transmission period of a signal is set, the communication terminal device may maintain the sleep state for a long time. Therefore, low power consumption and real time performance of the communication terminal devices may be achieved at the same time even in applications such as peak suppression with no regularity of data.

Preferably, the communication device further includes an appliance characteristics storage unit configured to store respective rates of change in power consumption values in the power consumption appliance, wherein the power saving control unit is configured to calculate and determine a transmission period by dividing the power value difference by a value which is obtained by using a rate of change in the total power consumption value, the rate of change being calculated based on the rates of change in the power consumption values.

With this configuration, the communication device as the control station determines a transmission period by calculating a quotient as the transmission period by dividing the power value difference by a value obtained by using the rate of change in the total power consumption value, which is calculated based on the rates of change in the power consumption values. In this manner, a transmission period of a signal may be accurately calculated so that the total power consumption value does not exceed the available power supply value.

Preferably, the communication device further includes a transmission period pattern storage unit configured to store transmission period patterns, each of which is a pattern of the transmission period, wherein the power saving control unit is configured to calculate a transmission period during which the signal is transmitted in such a manner that the transmission period is increased as the power value difference increases, and to determine a transmission period as the determined transmission period, which is less than or equal to the calculated transmission period and is longest among the transmission period patterns.

With this configuration, the communication device as the control station further calculates a transmission period in such a manner that the transmission period is increased as a power value difference increases, and determines the longest transmission period from those transmission period patterns that are shorter than or equal to the calculated transmission period. That is to say, in a communication network system in which the transmission period of a signal is defined by several types of patterns as in the IEEE 802.15.4, a transmission period may be selected from a range of defined patterns.

The communication device further includes an application allowable delay storage unit configured to store allowable delay times which may be allowed when predetermined application is executed, wherein the power saving control unit is configured to calculate a transmission period during which the signal is transmitted in such a manner that the transmission period is increased as the power value difference increases, and to determine an allowable delay time as the determined transmission period, which has a shortest value out of the allowable delay times which are stored in the application allowable delay storage unit when the calculated transmission period is longer than the shortest allowable delay time, and to determine the calculated transmission period as the determined transmission period when the calculated transmission period is shorter than or equal to the shortest allowable delay time.

With this configuration, the communication device as the control station further calculates a transmission period in such a manner that the transmission period is increased as a power value difference increases, and when the calculated transmission period is longer than the shortest allowable delay time in the allowable delay times stored in the application allowable delay storage unit, the communication device determines the shortest allowable delay time as the transmission period. In this manner, in a communication network system in which a plurality of applications with different allowable delay times are operated, setting of a transmission period exceeding the allowable delay times for the applications may be prevented, and thus the allowable times for the applications may be satisfied.

Preferably, the signal is a beacon signal, or an awake signal which controls the active state and the sleep state of the communication terminal device.

With this configuration, the signal is a beacon signal or an awake signal. That is to say, even in a network system in which a beacon signal as a beacon frame is transmitted or a beacon frame is not utilized, the communication device as the control station transmits an awake signal which is awake data for controlling a sleep state and an awake state of the communication terminal device Consequently, the peak suppression to control the total power consumption value so as to not exceed the available power supply value is performed and controlled without delay, while a longer transmission period of a beacon signal or an awake signal is set for a larger power value difference. When a longer transmission period of a signal is set, the communication terminal device may maintain the sleep state for a long time. Therefore, low power consumption and real time performance of the communication terminal devices may be achieved at the same time even in applications such as peak suppression with no regularity of data.

Preferably, the communication device further includes a number-of-channel storage unit configured to store a number of frequency channels which is a total of frequency channels currently utilized, wherein the power saving control unit is further configured to calculate an active time interval and an inactive time interval in the determined transmission period by using the number of frequency channels, and the communication interface unit is configured to transmit the signal containing information indicating the transmission period, the active time interval, and the inactive time interval over each frequency channel.

With this configuration, the communication device as the control station further calculates the active time interval and the inactive time interval in the determined transmission period using the number of frequency channels, and transmits a signal containing the information indicating a transmission period, an active time interval, and an inactive time interval on respective frequency channels. That is to say, in a communication network system in which a plurality of frequency channels are utilized, not only a transmission period is calculated, but also the active time interval and the inactive time interval in the transmission period are calculated for each of all channels in use. Consequently, low power consumption of the communication terminal devices which operate in respective frequency channels may be achieved in their inactive time intervals.

Preferably, the power saving control unit is configured to calculate the active time interval by multiplying the determined transmission period by a reciprocal of the number of frequency channels, and to calculate the inactive time interval by multiplying the determined transmission period by a value obtained by subtracting the reciprocal of the number of frequency channels from 1.

With this configuration, the communication device as the control station calculates the active time interval by multiplying the determined transmission period by a reciprocal of the number of frequency channels, and calculates the inactive time interval by multiplying the determined transmission period by 1 minus the reciprocal of the number of frequency channels. That is to say, in a communication network system in which a plurality of frequency channels are utilized, an active time interval and an inactive time interval are calculated in accordance with the total number of channels to be utilized. Consequently, low power consumption of the communication terminal devices which operate in respective frequency channels may be achieved in their inactive time intervals.

Preferably, the communication interface unit is a wireless communication interface conforming to the IEEE 802.15.4 standard or a power line communication interface.

With this configuration; the communication device as the control station may be utilized in a wireless network system which conforms to the IEEE 802.15.4 standard, or in a PLC (Power Line Communication) network system using a power line communication interface.

The present invention may be achieved not only as such a communication device, but also as an integrated circuit including each processing unit which constitutes the communication device, or as a method including steps which are performed by corresponding processing units which constitute the communication device. The present invention may be achieved as a program which causes a computer to execute these steps, or as a computer readable recording medium such as a CD-ROM, on which the program is recorded, or as information, data, or a signal which indicates the program. The program, information, data, and signal may be distributed via a communication network such as the Internet.

According to a communication device of the present invention, low power consumption and real time performance of the communication terminal devices may be achieved at the same time even in applications such as peak suppression with no regularity of data.

BRIEF DESCRIPTION OF DRAWINGS

FIG. 4 is a memory structure diagram of a home appliance characteristics table held by the energy controller in Embodiment 1 of the present invention.

FIG. 5 is a memory structure diagram of a power management table held by the energy controller in Embodiment 1 of the present invention.

FIG. 8 is a memory structure diagram of a power visualization table held by the peak suppression unit of the energy controller in Embodiment 1 of the present invention.

FIG. 14 is a memory structure diagram of another power management table held by the energy controller in Embodiment 1 of the present invention.

FIG. 17 is a memory structure diagram of a beacon table held by the power saving control unit of the energy controller in Embodiment 2 of the present invention.

FIG. 21 is a memory structure diagram of an application allowable delay table held by the power saving control unit of the energy controller in Embodiment 3 of the present invention.

DETAILED DESCRIPTION OF INVENTION

Hereinafter, an embodiment of the present invention is described with reference to the drawings.

Embodiment 1

Figure 1:
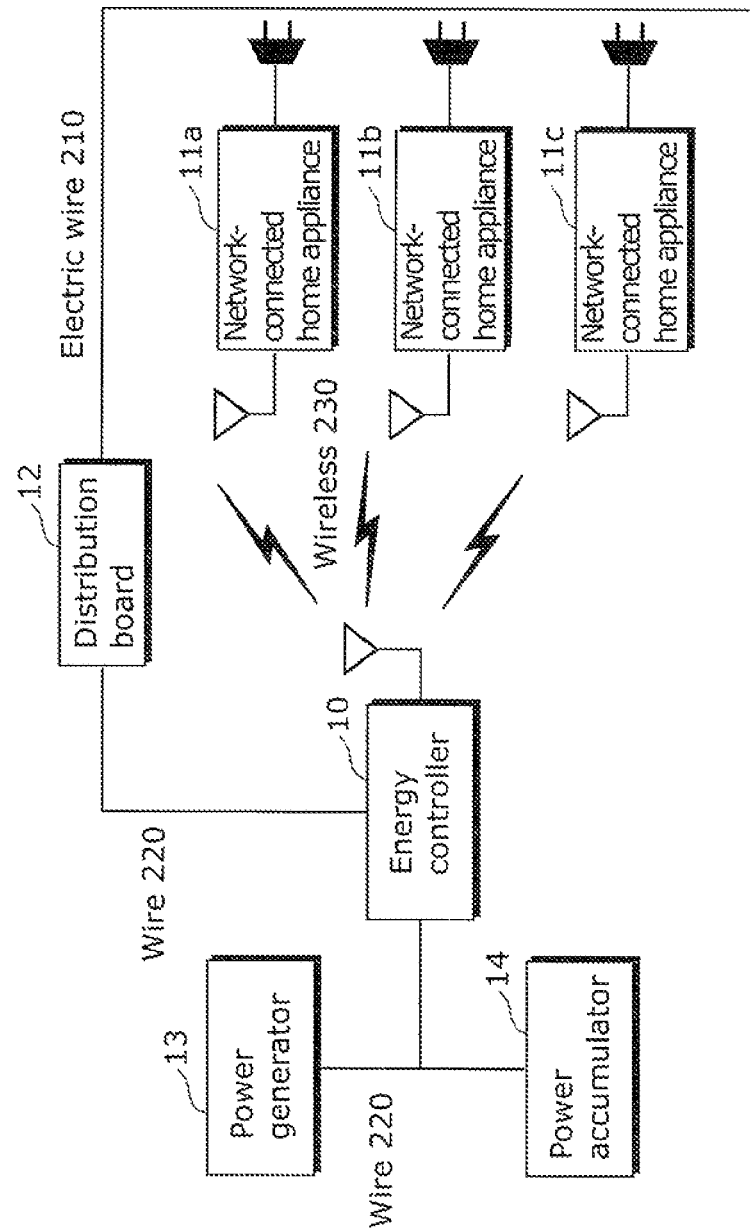
FIG. 1 is a diagram showing the network configuration of Embodiment 1 of the present invention.

FIG. 1 is a diagram showing an example of a network configuration of Embodiment 1 of the present invention.

In FIG. 1, an energy controller 10 is connected to network-connected home appliances 11a, 11b, 11c by a wireless 230. The energy controller 10 is included in "communication device" described in the accompanying claims, and the network-connected home appliances 11a, 11b, 11c are included in "communication terminal device" described in the accompanying claims.

The wireless 230 may be a connection according to a specific low power wireless which conforms to, for example, the IEEE 802.15.4 standard, the IEEE 802.11 standard, or ARIB (Association of Radio Industries and Businesses).

A distribution board 12 supplies power to all the electric appliances (for example, network-connected home appliance 11a) in a house via an electric wire 210, and can measure the total power consumption in the house. The distribution board 12 is connected to the energy controller 10 via a wire 220, however, the distribution board 12 may be connected to the energy controller 10 via the wireless 230.

A power generator 13 and a power accumulator 14 are connected to the energy controller 10 via the wire 220. The wire 220 is, for example, a connection such as Ethernet(®), or USB (Universal Serial Bus). The power generator 13 and/or the power accumulator 14 may be connected to the energy controller 10 via the wireless 230.

The power generator 13 represents a device to generate power, for example, by solar power generation, wind power generation, or fuel cells. The power accumulator 14 represents, for example, a secondary battery such as a lithium ion battery. Surplus power generated by the generator 13 may be stored in the power accumulator 14. Hereinafter, in the present invention, the power that is generated by the power generator 13 and then accumulated by the power accumulator 14 is collectively referred to as home power generation power. This power is different from the power purchased from a commercial electric power system of a power company.

The network-connected home appliances 11a, 11b, 11c are wireless terminal devices which repeat an active state and a sleep state, the active state being a state in which communication is possible, and the sleep state being a state in which communication is not possible. The network-connected home appliances, herein are assumed to include only three appliances, i.e., the network-connected home appliances 11a, 11b, 11c, but may include any number of appliances without being limited to three appliances.

The energy controller 10 transmits and receives data to and from the network-connected home appliances 11a 11b, 11c by transmitting a beacon signal, which is a signal for establishing transmission and reception of the data, to the network-connected home appliances 11a as 11b, 11c when the network-connected home appliances 11a, 11b, 11c are in an active state.

In addition, the energy controller 10 can recognize the total power consumption amount from the distribution board 12; generated amount of power from the power generator 13, and accumulated amount of power from the power accumulator 14 via the wire 220.

Figure 2:
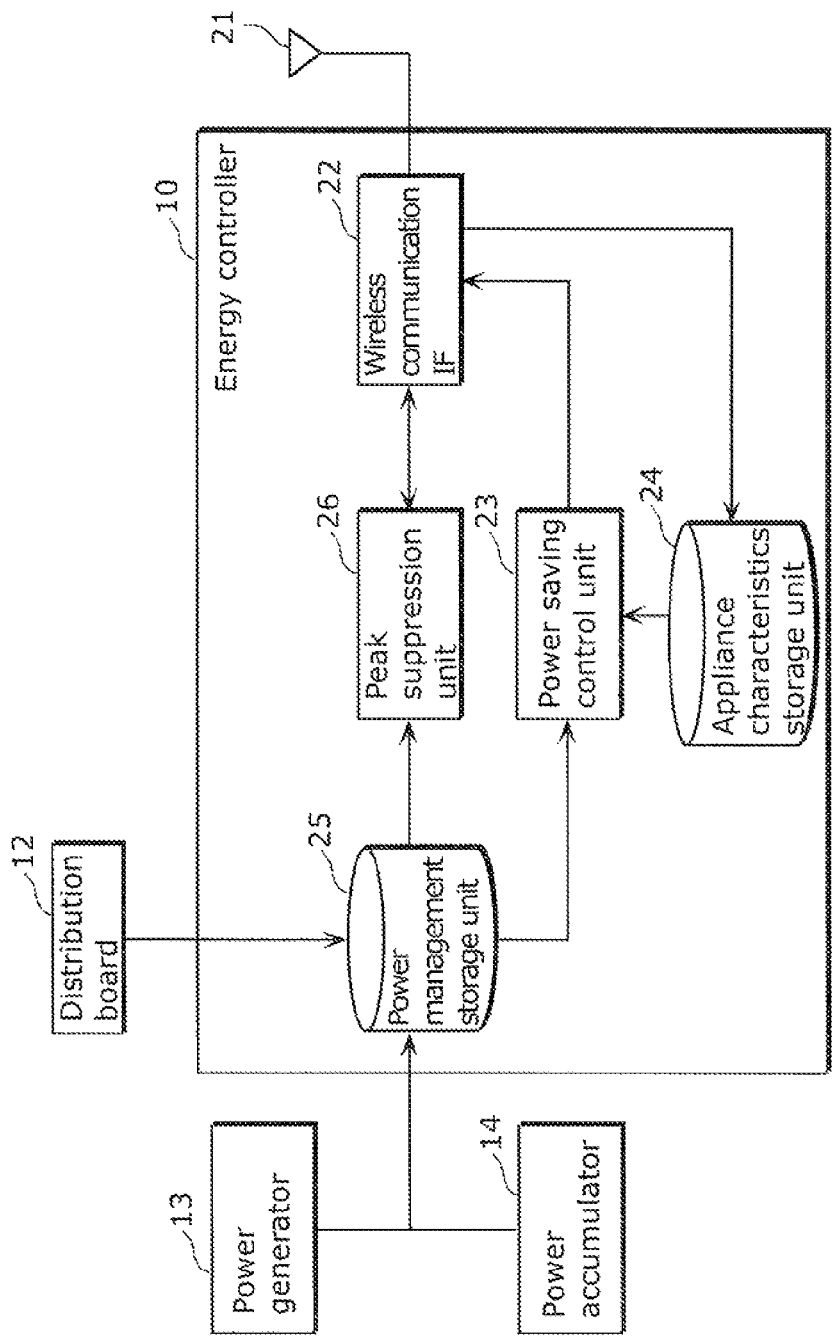
FIG. 2 is a block diagram showing the functional configuration of an energy controller in Embodiment 1 of the present invention.

FIG. 2 is a block diagram showing an example of the functional configuration of the energy controller 10 in Embodiment 1 of the present invention.

An antenna 21 is an aerial which performs wireless communications. As shown in FIG. 2, the energy controller 10 includes a wireless communication IF 22, a power saving control unit 23, an appliance characteristics storage unit 24, a power management storage unit 25, and a peak suppression unit 26.

The wireless communications IF 22 transmits a beacon signal containing information indicating the transmission period of the beacon signal to the network-connected home appliances 11a, 11b, 11c with a period according to the transmission period of the beacon signal in order to set the network-connected home appliances 11a, 11b, 11c in an active state. Specifically, the wireless communication IF 22 has functions of modulating data, demodulating data, controlling media access, generating a frame, and the like.

Examples of the wireless communication IF 22 include the functions of Physical Layer and MAC layer (Media Access Control Layer) that conform to the IEEE 802.15.4 standard. The details of the wireless communication IF 22 are described later in FIG. 3. The wireless communication IF 22 is included in "communication interface unit" described in the accompanying claims.

The peak suppression unit 26 has a function of controlling a peak cut, and a function of collecting (polling) the power consumption of each of the network-connected home appliances by inquiring the network-connected home appliances sequentially. The details of the peak suppression unit 26 are described later in FIG. 7.

The appliance characteristics storage unit 24 is a memory that stores a home appliance characteristics table 24a. The home appliance characteristics table 24a is a table for holding power characteristics such as a rate of change in the power consumption value of each of the network-connected home appliances currently connected. The details of the home appliance characteristics table 24a are described later in FIG. 4.

The power management storage unit 25 is a memory that stores a power management table 25a. The power management table 25a is a table containing information such as the generated power value of the power generator 13, the accumulated power value of the power accumulator 14, and the total power consumption value of the power consumption appliance, and the information is recognized and updated in real time. The details of the power management table 25a are described later in FIG. 5.

The power saving control unit 23 has a function of achieving power saving. In particular, the power saving control unit 23 has a function of calculating a beacon period and changing the beacon period based on the information of the home appliance characteristics table 24a and the power management table 25a, the beacon period being a transmission period during which a beacon signal is transmitted.

Specifically, the power saving control unit 23 determines a beacon period in such a manner that the beacon period is increased as a power value difference increases which is a value obtained by subtracting the total power consumption value of the power consumption appliance including the network-connected home appliances 11a, 11b, 11c from the available power supply value to the power consumption appliance. The details of the power saving control section 23 are described later in FIG. 6.

Figure 3:
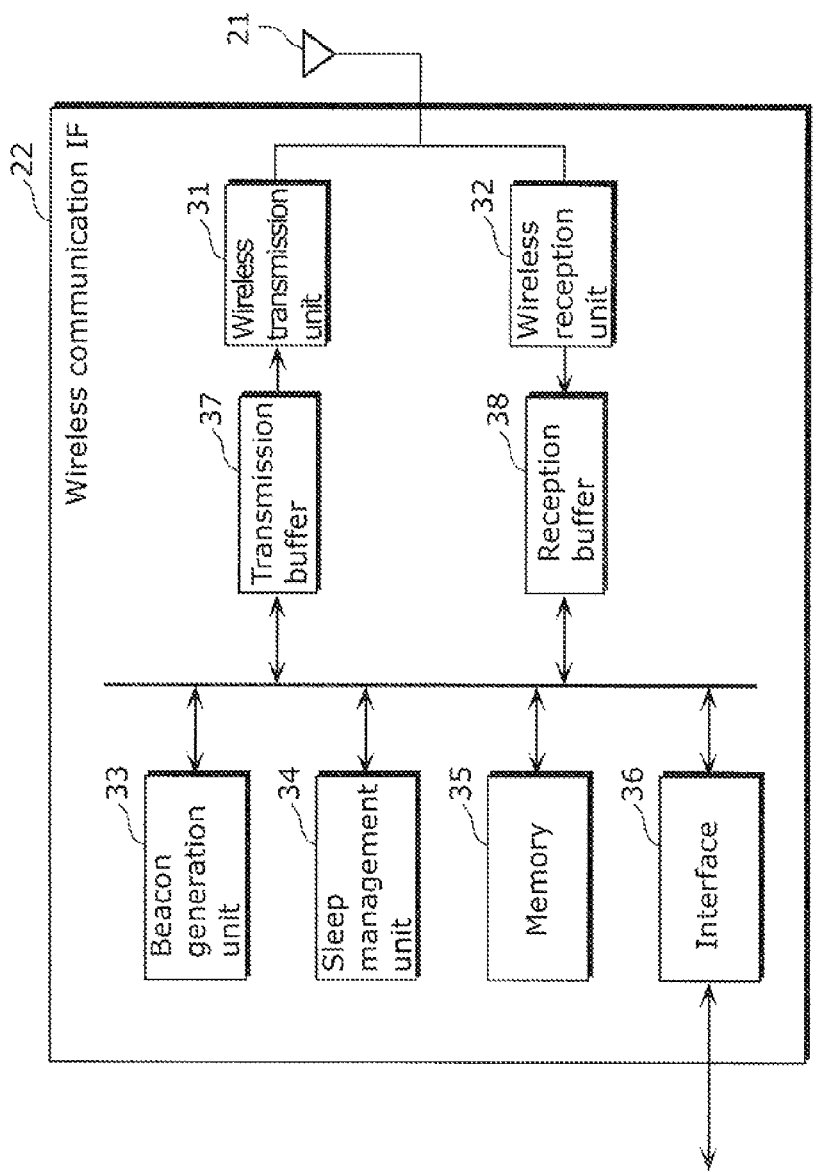
FIG. 3 is a block diagram showing the functional configuration of a wireless communication IF of the energy controller in Embodiment 1 of the present invention.

FIG. 3 is a block diagram showing the detailed function configuration of the wireless communication IF 22 shown in FIG. 2. In FIG. 3, the same components as those in FIG. 2 are labeled with the same reference symbols, and description is omitted.

As shown in FIG. 3, the wireless communication IF 22 includes a wireless transmission unit 31, a wireless reception unit 32, a beacon generation unit 33, a sleep management unit 34, a memory 35, an interface 36, a transmission buffer 37, and a reception buffer 38.

The transmission buffer 37 has a function of temporarily buffering data to be transmitted, such as a beacon signal.

The wireless transmission unit 31 has functions of retrieving data such as a beacon signal from the transmission buffer 37, modulating the data signal, and transmitting the data at an appropriate timing according to the media access control.

The reception buffer 38 has a function of temporarily buffering the data after it is received.

The wireless reception unit 32 has functions of demodulating the received data signal and transferring the demodulated data to the reception buffer 38.

The memory 35 stores information such as a beacon period, an active time interval, and an inactive time interval. Here, the beacon signals transmitted by the wireless transmission unit 31 include information such as a beacon period, an active time interval, and an inactive time interval that are stored in the memory 35.

The beacon generation unit 33 has a function of generating a beacon frame. Specifically, the beacon generation unit 33 generates a beacon frame, which is a beacon signal, based on the beacon period time stored in the memory 35, and stores the beacon frame in the transmission buffer 37.

The sleep management unit 34 has a function of determining whether or not the current state of the wireless communication IF 22 is sleep state according to the information stored in the memory 35, such as an inactive time interval, thereby managing to set the wireless communication IF 22 in a sleep state or an active state.

The interface 36 has a function of connecting between the wireless communication IF 22, and the peak suppression unit 26, the power saving control unit 23, the appliance characteristics storage unit 24.

FIG. 4 is a diagram showing an example of the memory structure of the home appliance characteristics table 24a shown in FIG. 2. The home appliance characteristics table 24a stores information such as "item name (model number)", "appliance address", "maximum power consumption (W)", and "maximum rate of change (W/sec)."

The item name (model number) respectively indicate the type and product number of a network-connected home appliance which is an home appliance.

The appliance address is a specific ID which uniquely identifies each of the home appliances. For example, the appliance address may be a MAC address or a 16-bit short address which is specified in the IEEE 802.15.4.

The maximum power consumption indicates the maximum power consumption consumed by each of the home appliances.

The maximum rate of change indicates the rate of change in the power consumption of each home appliance. For example, the maximum power consumption of a water heater pot in FIG. 4 is 800 W. In the case where the power consumption reaches 800 watts in 2 seconds after the water heater pot is turned on, the maximum rate of change (W/sec)=800 (W)/2(sec)=400 (W/sec). That is to say, the maximum rate of change indicates the increase rate of the power consumption per unit of time. A large maximum rate of change indicates that the power consumption increases rapidly.

It is assumed that each time a home appliance is connected to the energy controller 10, the above-mentioned information is added to in the home appliance characteristics table 24a.

The energy controller 10 may hold the home appliance characteristics table 24a in advance, or may create and update the power consumption and the rate of change of each home appliance while learning by acquiring data subsequently.

FIG. 5 is a diagram showing an example of the memory structure of the power management table 25a shown in FIG. 2. The power management table 25a stores information such as "date", "time", "home power generation supply capability value", and "total power consumption value."

The date and time indicate the date and time when the power management table 25a is updated. The power management table 25a is to be updated periodically, and an update value is added to the power management table 25a.

A generated power value of the home power generation supply capability value is information of the power that is generated by the power generator 13. An accumulated power value of the home power generation supply capability value is information of the power that is accumulated by the power accumulator 14. The home power generation supply capability value is the power generated in a house or its neighboring area excluding the power purchased from a commercial electric power system of a power company, and indicates the amount of power that is currently available.

The total power consumption value is the information obtained from the distribution board 12, and means the sum of the power consumed by a plurality of appliances such as home appliances that are in use at the same time.

The values of all of these items in the power management table 25a are updated as needed.

Examples other than the items shown in FIG. 5 include distribution board supply capability value, and electric power rate change boundary value. FIG. 14 is a diagram showing an example of the memory structure of the power management table 25b which is another example of the power management table. The power management table 25b stores information such as "date", "time", "electric power rate change boundary value", "distribution board supply capability value", and "total power consumption value."

The date and time indicate the date and time when the power management table 25b is updated. The power management table 25b is to be updated periodically, and an update value is added to the power management table 25a.

The distribution board supply capability value is a limit value at which the breaker of distribution board 12 shuts down the supply of power. That is to say, the distribution board supply capability value is the value indicating the power value that can be supplied by the distribution board 12.

The electric power rate change boundary value is a boundary value at which the electric power rate per unit quantity changes. That is to say, the electric power rate change boundary value is contracted power value with a power company, and is a boundary value at which the electric power rate is incremented.

Similarly to the power management table 25a of FIG. 5, the total power consumption value is the total power consumption value of the power consumption appliance.

Figure 6:
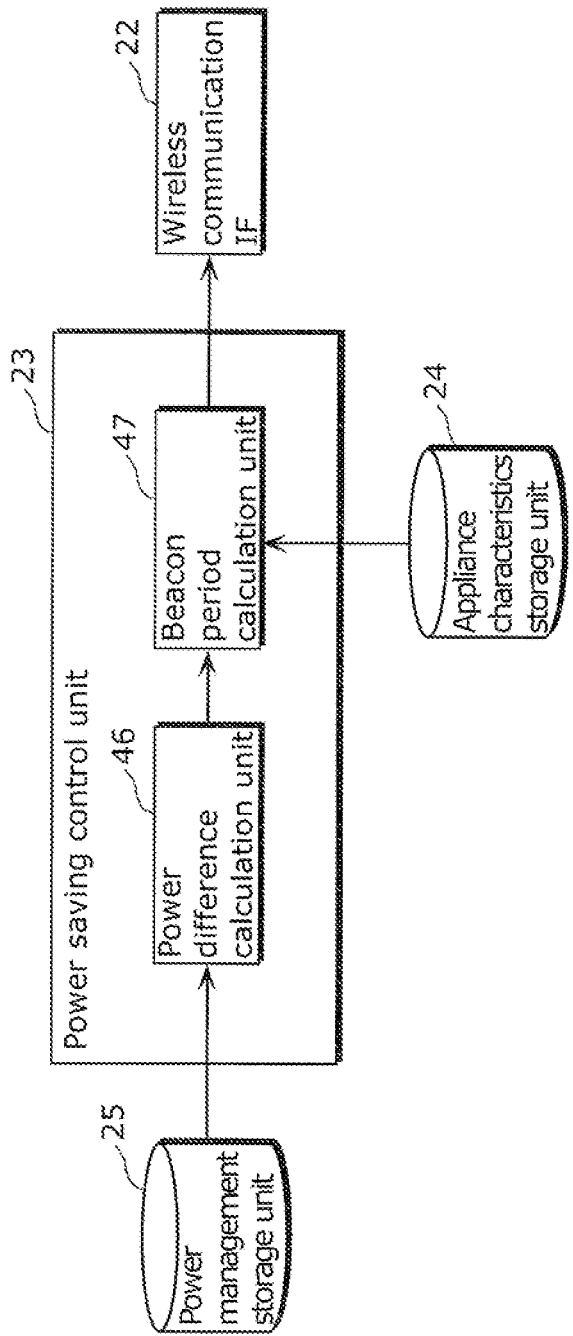
FIG. 6 is a block diagram showing the functional configuration of a power saving control unit of the energy controller in Embodiment 1 of the present invention.

FIG. 6 is a block diagram showing the detailed functional configuration of the power saving control unit 23 shown in FIG. 2.

As shown in FIG. 6, the power saving control unit 23 includes a power difference calculation unit 46 and a beacon period calculation unit 47.

The power difference calculation unit 46 has functions of acquiring an available power supply value and the total power consumption value from the power management table 25a shown in FIG. 5, and calculating the power value difference which is obtained by subtracting the total power consumption value from the available power supply value, which is set to the latest home power generation supply capability value (the generated power value of the power generator 13+the accumulated power value of the power accumulator 14).

For example, in the case of FIG. 5, the home power generation supply capability value is 5000 W (3010 W+1990 W) and the total power consumption value is 200 W, therefore, the power value difference is 4800 W. This means that the surplus of the home power generation supply capability value, i.e., 4800 W is available for use. When an amount of power exceeding 4800 W is used, additional power needs to be bought from a power company. That is to say, the power value difference means the available power from the subsequent home power generation.

In the case where the power management table is the power management table 25b of FIG. 14, the power difference calculation unit 46 may acquire the electric power rate change boundary value and the total power consumption value to calculate the power value difference which is obtained by subtracting the total power consumption value from the electric power rate change boundary value. The power value difference means the available power until the electric power rate is subsequently changed.

As an example, in the case where the power management table is other than the power management table 25b of FIG. 14, the power difference calculation unit 46 may acquire the distribution board supply capability value and the total power consumption value to calculate the power value difference which is obtained by subtracting the total power consumption value from the distribution board supply capability value. The power value difference means the power that can be subsequently supplied by the distribution board 12, and using an amount of power exceeding the power value difference causes an electric breaker (circuit breaker) to trip.

The beacon period calculation unit 47 has a function of calculating a quotient as the beacon period by dividing a power value difference by a divisor value, the power value difference being obtained by subtracting the total power consumption value from the available power supply value, the divisor value being obtained by using the rate of change in the total power consumption value, which is calculated based on the rates of change in the power consumption values in the power consumption appliance.

Specifically, the beacon period calculation unit 47 calculates the beacon period by dividing the above-mentioned power value difference by the maximum rate of change in the home appliance characteristics table 24a shown in FIG. 4 under the assumption that the rate of change in the total power consumption value is set to the maximum rate of change in the power consumption values of the entire power consumption appliance. That is to say, as the maximum rate of change in the home appliance characteristics table 24a, the maximum rate of change in the power consumption values of the home appliances that are stored is selected.

In the case of FIG. 4, compared with other appliances, a microwave oven has the maximum rate of change of 800 W/sec. Here, the calculation method of the beacon is as follows.

Beacon period=power value difference/rate of change (Expression 1)

For example, when the power value difference is 4800 W and the rate of change is 800 W/sec, the beacon period is 6 sec (=4800/800). The beacon period calculation unit 47 stores the calculated beacon period in the memory 35 of the wireless communication IF 22. In this manner, dynamic change of the beacon period of the wireless network is achieved.

By taking the rate of change of power into consideration, during the time interval of the calculated beacon period, there is another opportunity to transmit a beacon before the remaining power value difference is used.

As the calculation method of the rate of change of the total power consumption value, not only the maximum value of the maximum rate of change in the home appliance characteristics table 24a, but also the sum of the maximum rate of change and the second maximum rate of change may be used. For example, in FIG. 4, a microwave oven and a water heater pot are selected, and the sum is 1200 (w/sec) (=800+400). The value indicates a possible rate of change in the power consumption that may be required when the microwave oven and water heater pot are used simultaneously. In this case, the beacon period is calculated to be 4 sec (=4800/1200).

Figure 7:
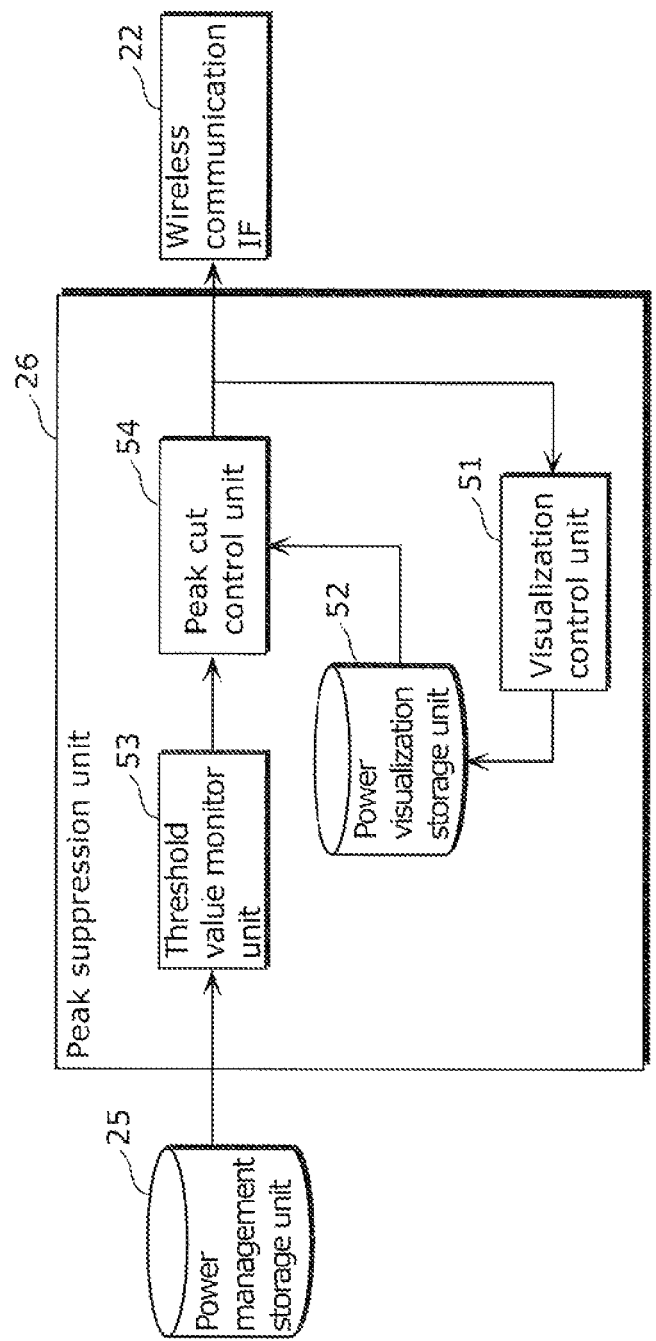
FIG. 7 is a block diagram showing the functional configuration of a peak suppression unit of the energy controller in Embodiment 1 of the present invention.

FIG. 7 is a block diagram showing the detailed functional configuration of the peak suppression unit 26 shown in FIG. 2. As shown in FIG. 7, the peak suppression unit 26 includes a visualization control unit 51, a power visualization storage unit 52, a threshold value monitor unit 53, and a peak cut control unit 54.

The visualization control unit 51 has functions of inquiring and acquiring the power consumption information of the respective network-connected home appliances 11a to 11c that are connected to the energy controller 10. As a method of inquiry, there is a polling method, in which the visualization control unit 51 inquires about the power consumption to each network-connected home appliance, and receives a response of the power consumption information from the network-connected home appliance, and the above-described inquiry is sequentially made for the network-connected home appliances 11a to 11c that are connected.

The power visualization storage unit 52 is a storage unit that stores a power visualization table 52a including the power consumption of each network-connected home appliance, which is acquired by the visualization control unit 51. The details of the power visualization table 52a are described later in FIG. 8.

The threshold value monitor unit 53 has functions of acquiring the total power consumption value from the power management table 25a, and monitoring whether or not the total power consumption value has reached a designated peak suppression threshold value. When the total power consumption value exceeds the peak suppression threshold value, peak cut is performed.

The peak cut control unit 54 has a function of performing peak cut. The peak cut has the object of reducing the total power consumption, for example, by turning off the power supply of a home appliance such as a light or a television, changing the preset temperature of an air-conditioner, changing strong wind mode to power-saving mode of an air-conditioner, or reducing the illuminance of a light. The peak cut control unit 54 refers to the power visualization table 52a to select an appliance for which peak suppression is made, and then makes the peak control.

FIG. 8 is a diagram showing an example of the memory structure of the power visualization table 52a shown in FIG. 7. The power visualization table 52a stores information such as "item name (model number)", "appliance address", "current power consumption (W)", and "peak suppression information."

The item name (model number) and the appliance address are the same as the item name (model number) and the appliance address of the home appliance characteristics table 24a shown in FIG. 4, and thus description is omitted.

The current power consumption is the power consumption of each network-connected home appliance, which is collected by polling performed by the visualization control unit 51.

The peak suppression information includes peak suppression possibility YES/NO and the type of peak suppression. "Yes" of the peak suppression possibility Yes/No indicates an appliance for which peak suppression may be made, and "No" of the peak suppression possibility Yes/No indicates an appliance for which peak suppression may not be made. The type of peak suppression indicates means for making the peak suppression.

Figure 9:
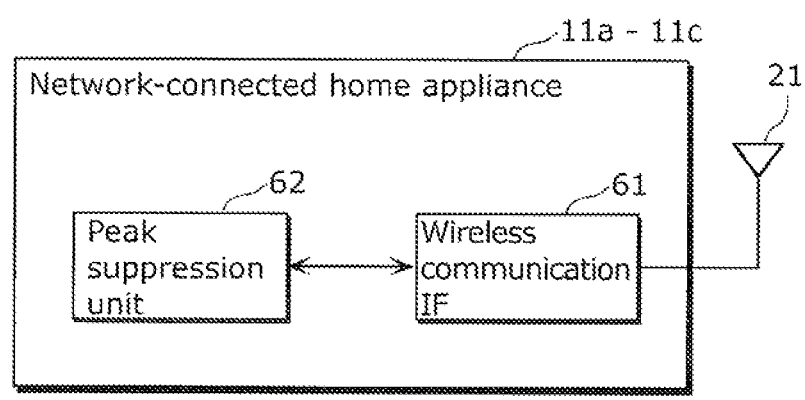
FIG. 9 is a block diagram showing the functional configuration of network-connected home appliances in Embodiment 1 of the present invention.

FIG. 9 is a block diagram showing an example of the functional configuration of the network-connected home appliances 11a, 11b, 11c in Embodiment 1 of the present invention. In FIG. 9, the same components as those in FIG. 2 are labeled with the same reference symbols, and description is omitted.

As shown in FIG. 9, each of the network-connected home appliances 11a, 11b, 11c includes a wireless communication IF 61 and a peak suppression unit 62.

The wireless communication IF 61 has functions of modulating data, demodulating data, controlling media access, generating a frame, and the like. The wireless communication IF 61 has, as an example, the functions of Physical Layer and MAC layer (Media Access Control Layer) that conform to the IEEE 802.15.4 standard. The details of the wireless communication IF 61 are described later in FIG. 10.

The peak suppression unit 62 has a function of sending the current power consumption information, in response to an inquiry request for power consumption information by the visualization control unit 51 of the energy controller 10. In addition, the peak suppression unit 62 has a function of performing an operation of peak cut such as turning off the power supply, changing the room temperature in accordance with a peak cut execution command from the peak cut control unit 54 of the energy controller 10.

Figure 10:
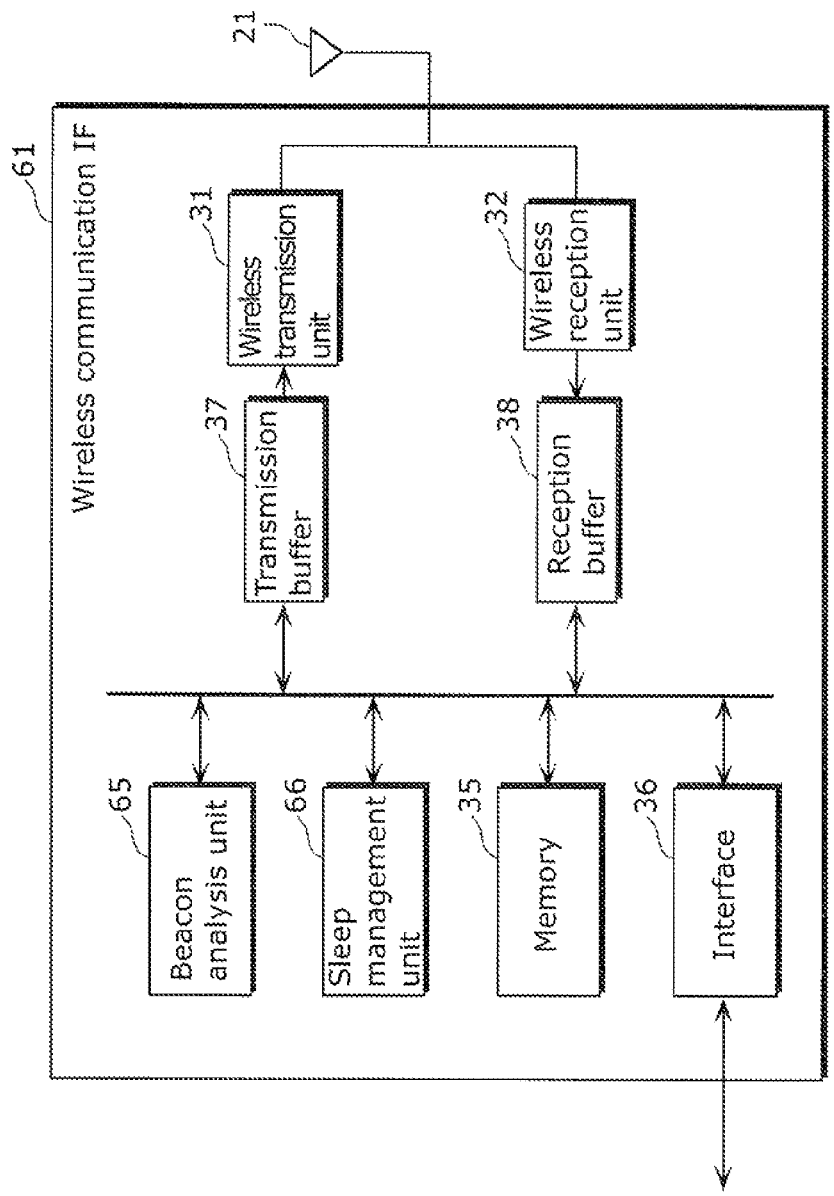
FIG. 10 is a block diagram showing the functional configuration of a wireless communication IF of the network-connected home appliances in Embodiment 1 of the present invention.

FIG. 10 is a block diagram showing the detailed functional configuration of the wireless communication IF 61 in FIG. 9. In FIG. 10, the same components as those of the wireless communication IF 22 shown in FIG. 3 are labeled with the same reference symbols, and description is omitted.

As shown in FIG. 10, the wireless communication IF 61 includes a beacon analysis unit 65 and a sleep management unit 66 in addition to the wireless transmission unit 31, the wireless reception unit 32, the memory 35, the interface 36, the transmission buffer 37, and the reception buffer 38 that are the same components as those of the wireless communication IF 22.

The beacon analysis unit 65 has functions of receiving and analyzing a beacon frame transmitted from the energy controller 10. Specifically, the beacon analysis unit 65 analyzes the presence of Data Pending indicated in the beacon frame. The beacon analysis unit 65, when Pending Data addressed to itself is included, generates a data request frame and transmits the data request frame to the energy controller 10.

The sleep management unit 66 confirms the length of an active time interval, and the time when the subsequent beacon frame is to be transmitted, based on a result of the beacon frame analysis by the beacon analysis unit 65, and manages a sleep state and an active state.

Figure 11:
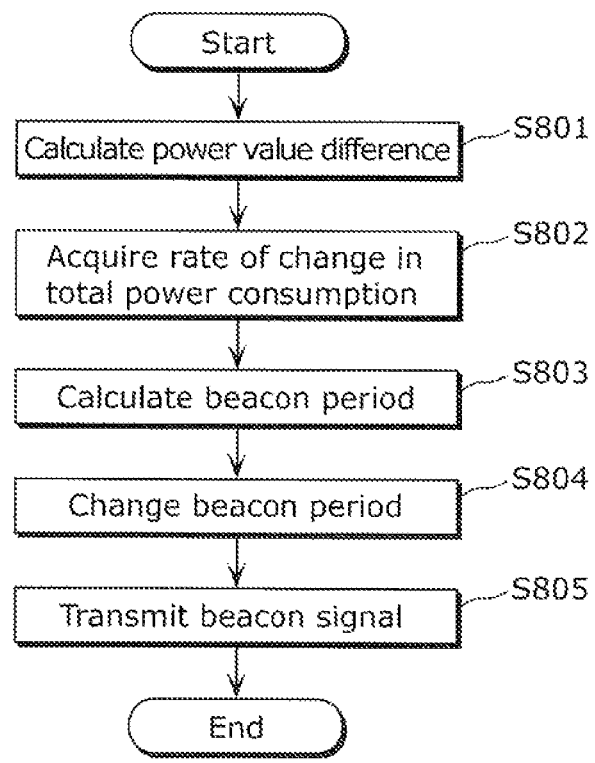
FIG. 11 is a flowchart showing the operation of the power saving control unit of the energy controller in Embodiment 1 of the present invention.

FIG. 11 is a flowchart showing the operation of a method of changing the beacon period according to the power saving control unit 23 in Embodiment 1 of the present invention.

As shown in FIG. 11, at first, the power difference calculation unit 46 of the power saving control unit 23 calculates an available power supply value to the power consumption appliance, and a power value difference between the available power supply value and the total power consumption value of the power consumption appliance (S801).

Subsequently, the beacon period calculation unit 47 acquires the value of the maximum rate of change, as the rate of change of the total power consumption value of the power consumption appliance, from the home appliance characteristics table 24a (S802).

Subsequently, the beacon period calculation unit 47 calculates a beacon period based on the above-mentioned Expression 1 by dividing the power value difference by the maximum value of the maximum rate of change (S803).

Subsequently, the beacon period calculation unit 47 changes the current beacon period by setting the calculated beacon period to the memory 35 of the wireless communication IF 22 (S804).

As described above, the power saving control unit 23 determines a beacon period in such a manner that the beacon period is increased as the power value difference increases, which is the difference between the available power supply value to the power consumption appliance and the total power consumption value of the power consumption appliance.

The wireless communication IF 22 then transmits the beacon signal containing the information indicating the beacon period, and the like to the network-connected home appliances 11a to 11c based on the beacon period (S805). Thus, the network connected home appliances 11a to 11c switch between a sleep state and an active state based on the beacon period so as to be in an active state when the subsequent beacon signal is received.

Figure 12:
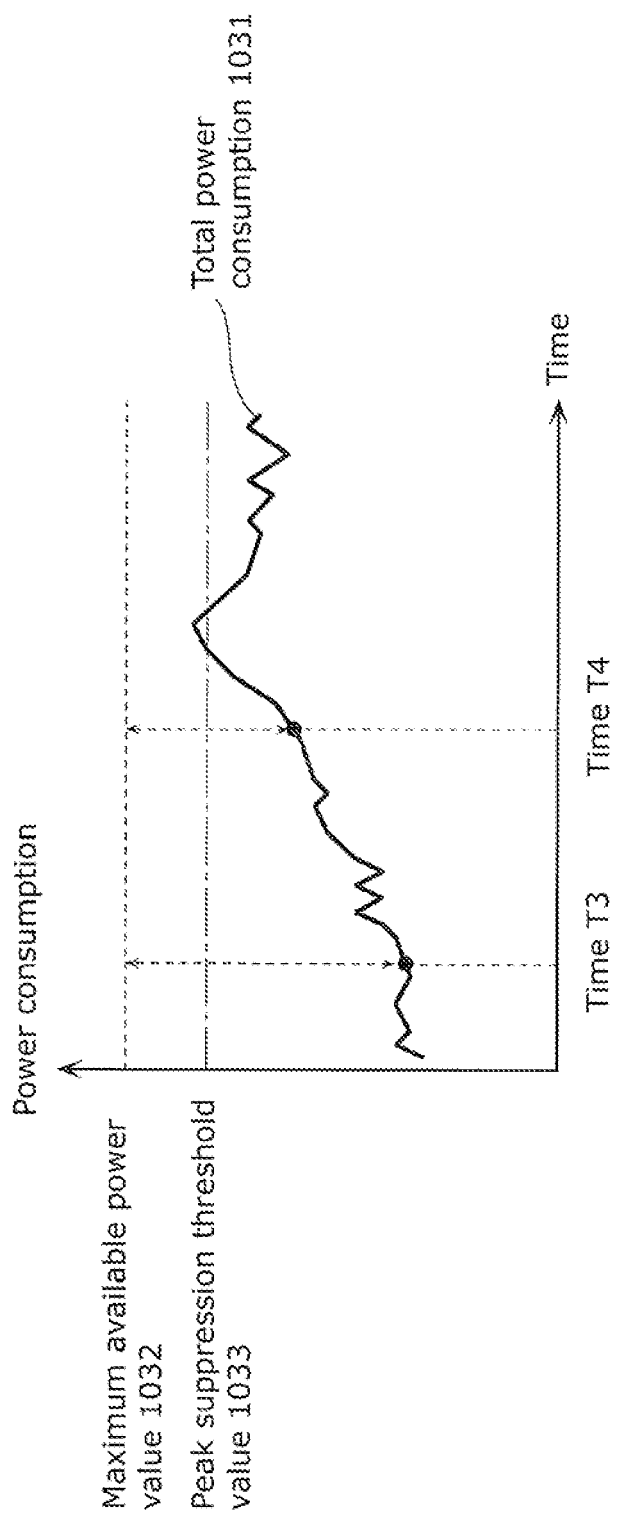
FIG. 12 is a graph showing an example of the correspondence between time and total power consumption in Embodiment 1 of the present invention.

FIG. 12 is a graph showing an example of a temporal variation in a total power consumption 1031 in a house in Embodiment 1 of the present invention.

The maximum available power value 1032 shown in FIG. 12 is, for example, a permissible value of a breaker of the distribution board (distribution board supply capability value), an amount of supply from a power company, an electric power rate change boundary value, or a home power generation supply amount by a solar power generation device, a wind power generation device or a fuel cell device. Here, the maximum available power value 1032 is set to the home power generation supply amount.

A peak suppression threshold value 1033 is set to a value less than the maximum available power value 1032, and is monitored by the threshold value monitor unit 53 of the peak suppression unit 26. When the total power consumption 1031 exceeds the peak suppression threshold value 1033, peak control is activated to reduce the total power consumption 1031.

In FIG. 12, time T3 is compared with time T4. The total power consumption 1031 at time T3 is lower than the total power consumption 1031 at time T4. That is to say, the power value difference at time T3 is greater than the power value difference at time T4. Therefore, according to the method of changing a beacon period in Embodiment 1 of the present invention, the beacon period at time T3 is longer than the beacon period at time T4.

Because the power value difference at time T3 has a larger margin of power, a longer beacon period, i.e., a longer sleep time can be set, and thus low power consumption is expected to be achieved. On the in other hand, because the power value difference at time T4 has a smaller margin, a shorter beacon period, i.e., a shorter sleep time is set, and thus a request for peak suppression can be immediately processed.

Figure 13:
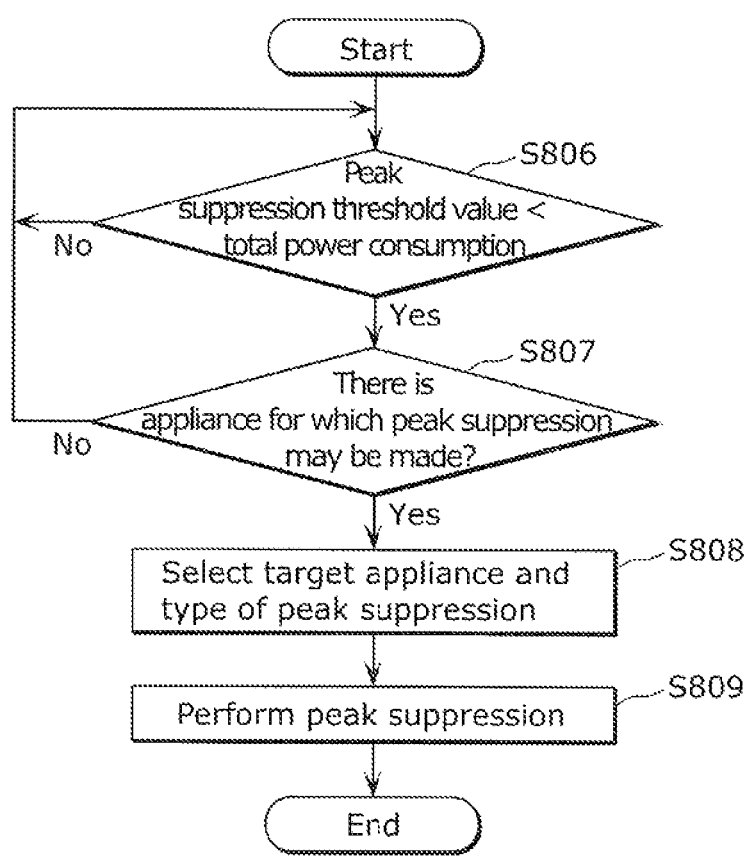
FIG. 13 is a flowchart showing the operation of the peak suppression unit of the energy controller in Embodiment 1 of the present invention.

FIG. 13 is a flowchart showing the operation of the peak suppression by the peak suppression unit 26 in Embodiment 1 of the present invention.

As shown in FIG. 13, at first, the threshold value monitor unit 53 monitors and compares between the total power consumption 1031 and the peak suppression threshold value 1033 (S806).

When the total power consumption 1031 exceeds the peak suppression threshold value 1033 (Yes at S806), the peak cut control unit 54 refers to the power visualization table 52a to check whether or not there is any appliance for which peak suppression is may be made (S807). When the total power consumption 1031 falls below the peak suppression threshold value 1033 (No at S806), the threshold value monitor unit 53 again monitors and compares between the total power consumption 1031 and the peak suppression threshold value 1033 (S806).

When there is an appliance for which peak suppression may be made (Yes at S807), the peak cut control unit 54 selects the target appliance for peak suppression and the type of peak suppression (S808). On the other hand, when there is no appliance for which peak suppression may be made (No at S807), the peak cut control unit 54 again monitors and compares between the total power consumption 1031 and the peak suppression threshold value 1033 (S806).

Subsequently, the peak cut control unit 54 remotely operates the home appliance to perform peak cut (S809).

According to the present Embodiment 1, the beacon period is calculated by taking into consideration the characteristics of the rate of change in the power consumption of the home appliances that are connected, and the power value difference between the home power generation supply amount and the total power consumption.

Normally, the energy controller 10 needs to transmit control commands to perform peak cut to the network-connected home appliances 11a to 11c before the power value difference is used up. For the transmission of the control commands, the energy controller 10 needs to transmit a beacon with data pending. That is to say, calculating the beacon period as in the present Embodiment 1 by taking into consideration the power value difference and the rate of change in the power consumption of the home appliances assures that the subsequent transmission period of the beacon for the energy controller 10 always arrives before the power value difference is used up. In this manner, the beacon period is set so that a delay does not occur in the command control of the peak cut. When the power value difference is larger, a longer beacon period is set, and thus lower power consumption may be achieved.

That is to say, the energy controller 10 transmits a beacon signal to the network-connected home appliances 11a to 11c which are wireless terminal devices, the beacon signal being so determined that the beacon period is increased as the power value difference increases, which is the difference between the available power supply value to the power consumption appliance and the total power consumption value of the power consumption appliance. That is to say, the beacon period is calculated based on the information of the remaining available power. Consequently, the peak suppression to control the total power consumption value so as to not exceed the available power supply value is performed and controlled without delay, while a longer beacon period is set for a larger power value difference. When a longer beacon period is set, each wireless terminal device may be placed in a sleep state for a longer time.

The energy controller 10 determines a beacon period in such a manner that the beacon period is increased as a power value difference increases, which is obtained by subtracting the total power consumption value from the sum of the generated power value and the accumulated power value. That is to say, a beacon period is calculated based on the information of the power value obtained by subtracting the total power consumption from the power that is generated in a house or its local area, i.e., the remaining power which is available from home power generation, home power accumulation without purchasing the power from a commercial electric power system of a power company. The home power generation supply capability value is the power generated in a house or its neighboring area excluding the power purchased from a commercial electric power system of a power company, and indicates the amount of power that is currently available. Consequently, the peak suppression to control the total power consumption value so as to not exceed the current sum of the generated power value and the accumulated power value is performed without delay. At the same time, a longer beacon period is set for a larger power value difference.

The energy controller 10 determines a beacon period in such a manner that the beacon period is increased as a power value difference increases, which is obtained by subtracting the total power consumption value from the electric power rate change boundary value. That is to say, a beacon period is calculated based on the information of the power value obtained by subtracting the total power consumption from the power of the contracted electric power rate change boundary value of a power company, i.e., the information of the power available with the current contracted electric power rate. Consequently, the peak suppression to control the total power consumption value so as to not exceed the current contracted electric power rate boundary value is performed and controlled without delay, while a longer beacon period is set for a larger power value difference.

The energy controller 10 as a control station determines a beacon period in such a manner that the beacon period is increased as a power value difference increases, which is obtained by subtracting the total power consumption value from the distribution board supply capability value. That is to say, a beacon period is calculated based on the information of the power value obtained by subtracting the total power consumption from the supply capability power of the distribution board, e.g., the limit value of the breaker (interrupter) of the distribution board, i.e., the information of the available power supply from the current distribution board. Consequently, the peak suppression to control the total power consumption value so as to not exceed the current supply capability limit value of the distribution board is performed and controlled without delay, while a longer beacon period is set for a larger power value difference.

The energy controller 10 determines a beacon period by calculating a quotient as the beacon period by dividing the power value difference by the rate of change in the total power consumption value, which is calculated based on the rates of change in the power consumption values. In this manner, a beacon period may be accurately calculated so that the total power consumption value does not exceed the available power supply value.

Thus, according to the energy controller 10 in the present Embodiment 1, low power consumption and real time performance of the wireless terminal devices may be achieved at the same time even in applications such as peak suppression with no regularity of data.

Embodiment 2

In the above-described Embodiment 1, a beacon period is calculated based on the power value difference between the available power supply value and the total power consumption value, and the characteristics of the rate of change in the power consumption of the home appliances, and then the beacon period is controlled. Consequently, when the power value difference has a large margin for peak suppression, a longer beacon period is set, and thus low power consumption is achieved, while when the power value difference has a small margin for peak suppression, a shorter beacon period is set, and thus a request for peak suppression can be immediately processed.

On the other hand, in the present Embodiment 2, after a beacon period is calculated, the beacon period is compared with the beacon value in the stored beacon table and then final beacon period is determined. Consequently, the beacon period can be dynamically changed in a system in which the beacon period is defined by several types of patterns as in the IEEE 802.15.4.

The network configuration in the present Embodiment 2 is similar to the network configuration in FIG. 1 of Embodiment 1, and thus description is omitted here.

Figure 15:
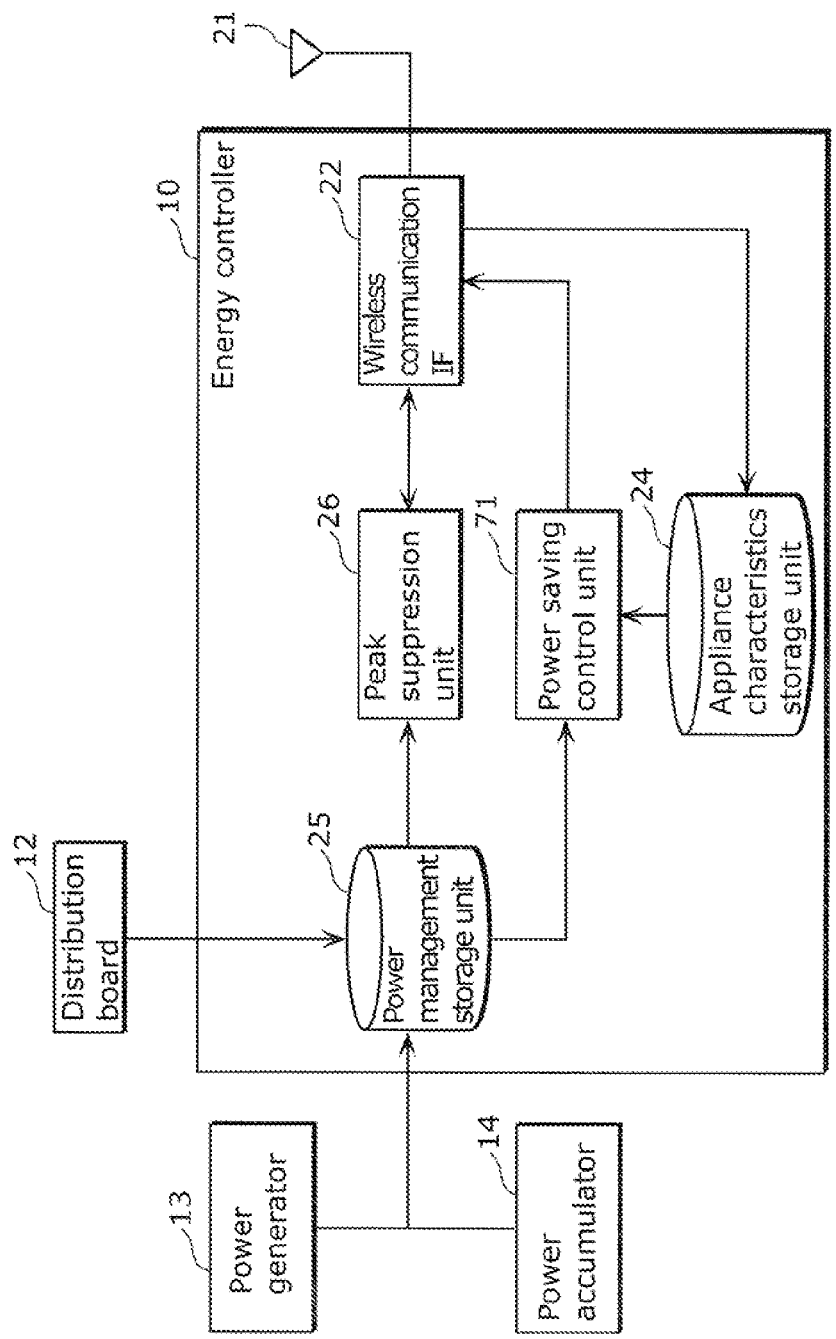
FIG. 15 is a block diagram showing the functional configuration of an energy controller in Embodiment 2 of the present invention.

FIG. 15 is a block diagram showing an example of the functional configuration of the energy controller 10 in Embodiment 2 of the present invention. A block having the same function as a block in the energy controller 10 of Embodiment 1, which has been described with reference to FIG. 2 is labeled with the same numeral, and description is omitted here.

As shown in FIG. 15, the energy controller 10 in Embodiment 2 includes a power saving control unit 71 in addition to the wireless communication IF 22, the appliance characteristics storage unit 24, the power management storage unit 25, and the peak suppression unit 26 that are the same components as those included in the energy controller 10 in Embodiment 1.

The power saving control unit 71 has a function of achieving power saving. In particular, the power saving control unit 71 has functions of calculating a beacon period and changing the beacon period based on the home appliance characteristics table 24a stored in the appliance characteristics storage unit 24, the power management table 25a stored in the power management storage unit 25, and the information of a beacon table 72a stored in a memory by the power saving control unit 71.

Figure 16:
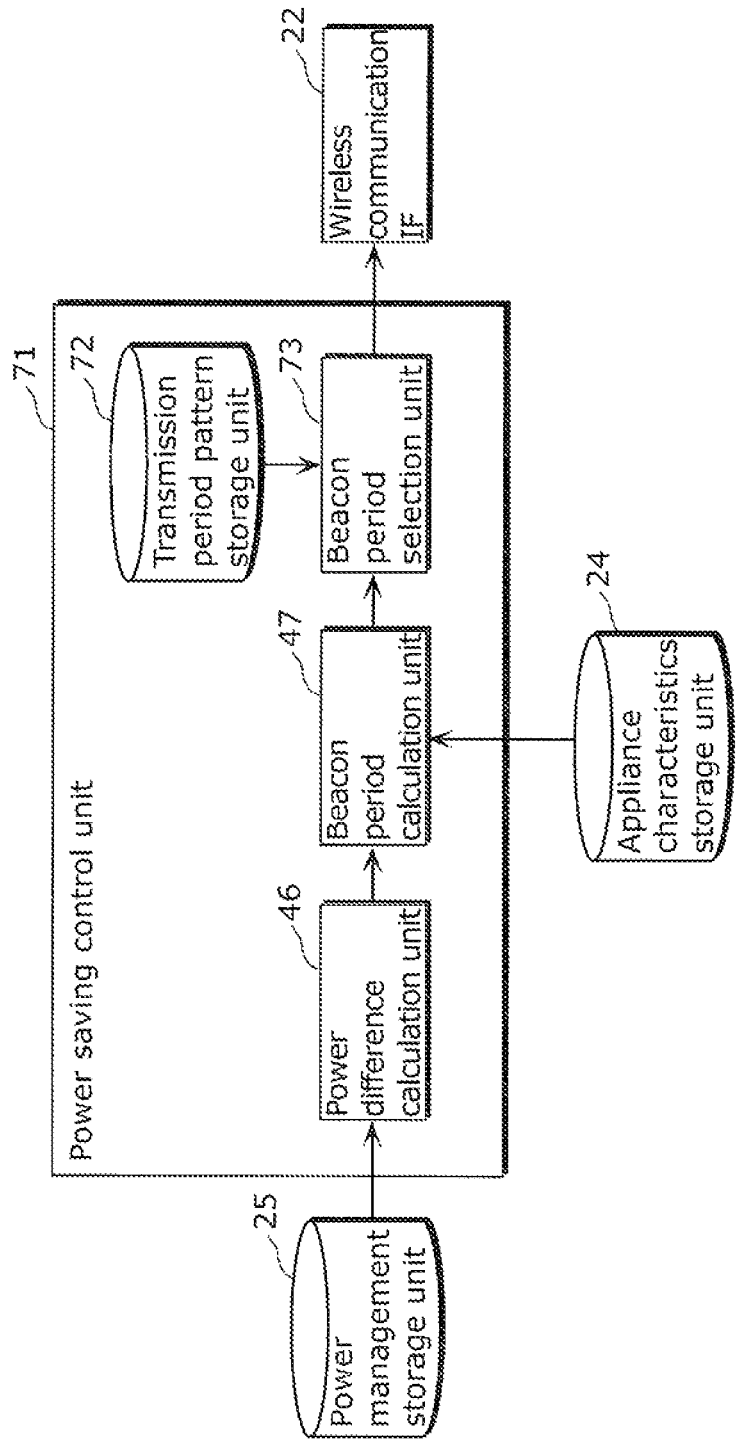
FIG. 16 is a block diagram showing the functional configuration of a power saving control unit of the energy controller in Embodiment 2 of the present invention.

FIG. 16 is a block diagram showing the detailed functional configuration of the power saving control unit 71 shown in FIG. 15. A block having the same function as a block included in the power saving control section 23 which has been described with reference to FIG. 6 is labeled with the same numeral, and description is omitted here.

As shown in FIG. 16, the power saving control unit 71 includes a transmission period pattern storage unit 72 and a beacon period selection unit 73 in addition to the power difference calculation unit 46 and the beacon period calculation unit 47 that are the same components as those included in the power saving control unit 23.

The transmission period pattern storage unit 72 stores a beacon table 72a containing the patterns of the beacon period that can be set by a wireless network system.

FIG. 17 is a diagram showing an example of the memory structure of the beacon table 72a. FIG. 17 shows an example of the beacon table 72a, which holds eight types of beacon periods. The shortest beacon period is 15 msec and the longest beacon period is 120000 msec (=2 min.)

Returning to FIG. 16, the beacon period selection unit 73 has functions of comparing the beacon period calculated by the beacon period calculation unit 47 with the beacon pattern of the beacon table 72a, and selecting a beacon period. The beacon period calculating unit 47 calculates a beacon period in such a manner that the beacon period is increased as a power value difference increases, which is the difference between the available power supply value and the total power consumption value.

In the case where the beacon period of 6 sec is calculated by the beacon period calculation unit 47 similarly to the example of Embodiment 1, as an example of a method of how the beacon period selection unit 73 selects a beacon period, there is a method by which the longest value in those beacon patterns that are shorter than or equal to the calculated beacon period (6 sec=6000 msec) is selected as the beacon period. In the beacon table 72a of FIG. 17, 5000 msec (=5 sec) in pattern 5 is selected as the beacon period.

The beacon period selection unit 73 stores the selected beacon period in the memory 35 of the wireless communication IF 22. In this manner, it is achieved that the beacon period of the wireless network is dynamically changed between the predetermined types.

As described above, the power saving control unit 71 calculates a beacon period in such a manner that the beacon period is increased as the power value difference increases, and selects the longest beacon period from those beacon patterns that are shorter than or equal to the calculated beacon period.

The functional block of the network-connected home appliances 11a, 11b, 11c in the present Embodiment 2 is the same as in FIG. 9 of Embodiment 1, and thus description is omitted here.

Figure 18:
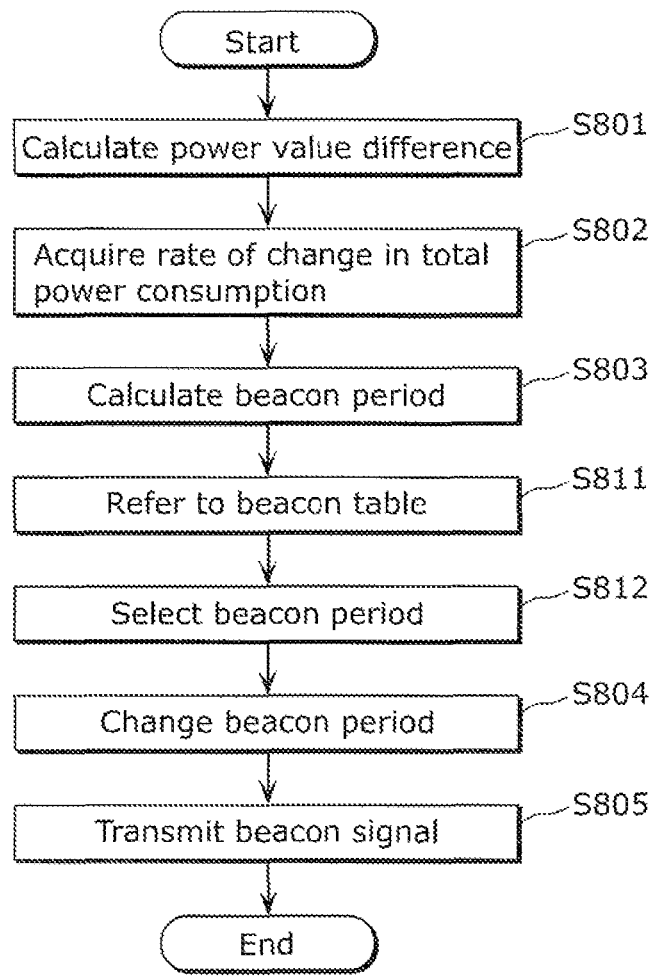
FIG. 18 is a flowchart showing the operation of the power saving control unit of the energy controller in Embodiment 2 of the present invention.

FIG. 18 is a flowchart showing the operation of a method of changing a beacon period by the power saving control unit 71 in Embodiment 2 of the present invention. In the present processes, the processes of S801 to S803, S804 and S805 in FIG. 18 are respectively the same as the processes of S801 to S803, S804 and S805 that have been described with reference to FIG. 11, and thus description is omitted here.

As shown in FIG. 18, at first, the power difference calculation unit 46 of the power saving control unit 71 calculates the power value difference between the available power supply value and the total power consumption value (S801). Subsequently, the beacon period calculation unit 47 acquires the maximum value of the maximum rate of change, as the rate of change of the total power consumption value of the power consumption appliance, from the home appliance characteristics table 24a (S802). Subsequently, the beacon period calculation unit 47 calculates a beacon period based on the above-mentioned Expression 1 (S803).

Subsequently, the beacon table 72a refers to the beacon period selection unit 73 (S811), the longest value in those beacon patterns that are shorter than or equal to the beacon period calculated by the beacon period calculation unit 47 is selected from the beacon patterns in the beacon table 72a (S812).

Subsequently, the beacon period selection unit 73 changes the current beacon period by setting the selected beacon period to the memory 35 of the wireless communication IF 22 (S804). Subsequently, the wireless communication IF 22 transmits the beacon signal containing the information indicating the beacon period and the like to the network-connected home appliances 11a to 11c based on the beacon period (S805).

According to the present Embodiment 2, a beacon period is calculated in such a manner that the beacon period is increased as the power value difference increases, by taking into consideration the characteristics of the rate of change in the power consumption of the home appliances that are connected, and the power value difference between the available power supply value and the total power consumption value. In the case where the patterns of the beacon period are defined in the radio network system, the calculated beacon period is compared with the defined patterns of the beacon period, and the longest beacon period in those beacon patterns that are shorter than or equal to the calculated beacon period is selected. Consequently, even in a wireless network system in which several types of the beacon period are defined as in the IEEE 802.15.4 standard, a longer beacon period is set for a larger power value difference, and thus low power consumption may be achieved, while a shorter beacon period is set for a smaller power value difference, and thus a request for peak suppression can be immediately processed.

Embodiment 3

In the above-described Embodiment 1, a beacon period is calculated based on the power value difference between the available power supply value and the total power consumption value, and the characteristics of the rate of change in the power consumption of the home appliances, and then the beacon period is controlled. Consequently, when the power value difference has a large margin for peak suppression, a longer beacon period is set, and thus low power consumption is achieved, while when the power value difference has a small margin for peak suppression, a shorter beacon period is set, and thus a request for peak suppression can be immediately processed.

On the other hand, in the present Embodiment 3, after a beacon period is calculated, the beacon period is compared with allowable delay times for the applications which are utilized in the wireless network system, and then final beacon period is determined. Consequently, setting of a beacon period exceeding the allowable delay times for the applications may be prevented, and thus the allowable times for the applications may be satisfied.

The network configuration in the present Embodiment 3 is similar to the network configuration in FIG. 1 of Embodiment 1, and thus description is omitted here.

Figure 19:
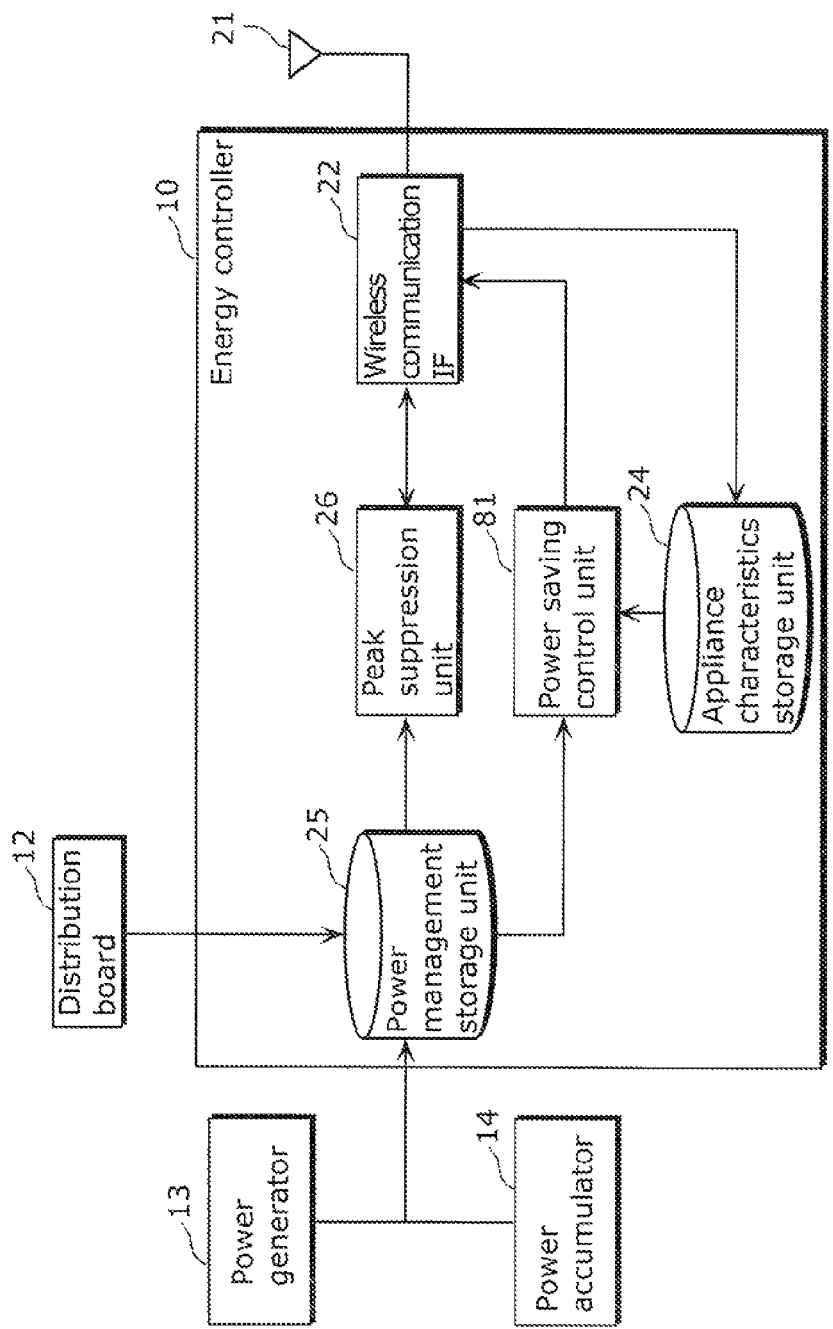
FIG. 19 is a block diagram showing the functional configuration of an energy controller in Embodiment 3 of the present invention.

FIG. 19 is a block diagram showing an example of the functional configuration of the energy controller 10 in Embodiment 3 of the present invention. A block having the same function as a block in the energy controller 10 of Embodiment 1, which has been described with reference to FIG. 2 is labeled with the same numeral, and description is omitted here.

As shown in FIG. 19, the energy controller 10 in Embodiment 3 includes a power saving control unit 81 in addition to the wireless communication IF 22, the appliance characteristics storage unit 24, the power management storage unit 25, and the peak suppression unit 26 that are the same components as those included in the energy controller 10 in Embodiment 1.

The power saving control unit 81 has a function of achieving power saving. In particular, the power saving control unit 81 has functions of calculating a beacon period and changing the beacon period based on the home appliance characteristics table 24a stored in the appliance characteristics storage unit 24, the power management table 25a stored in the power management storage unit 25, and the information of an application allowable delay table 82a stored in a memory by the power saving control unit 81.

Figure 20:
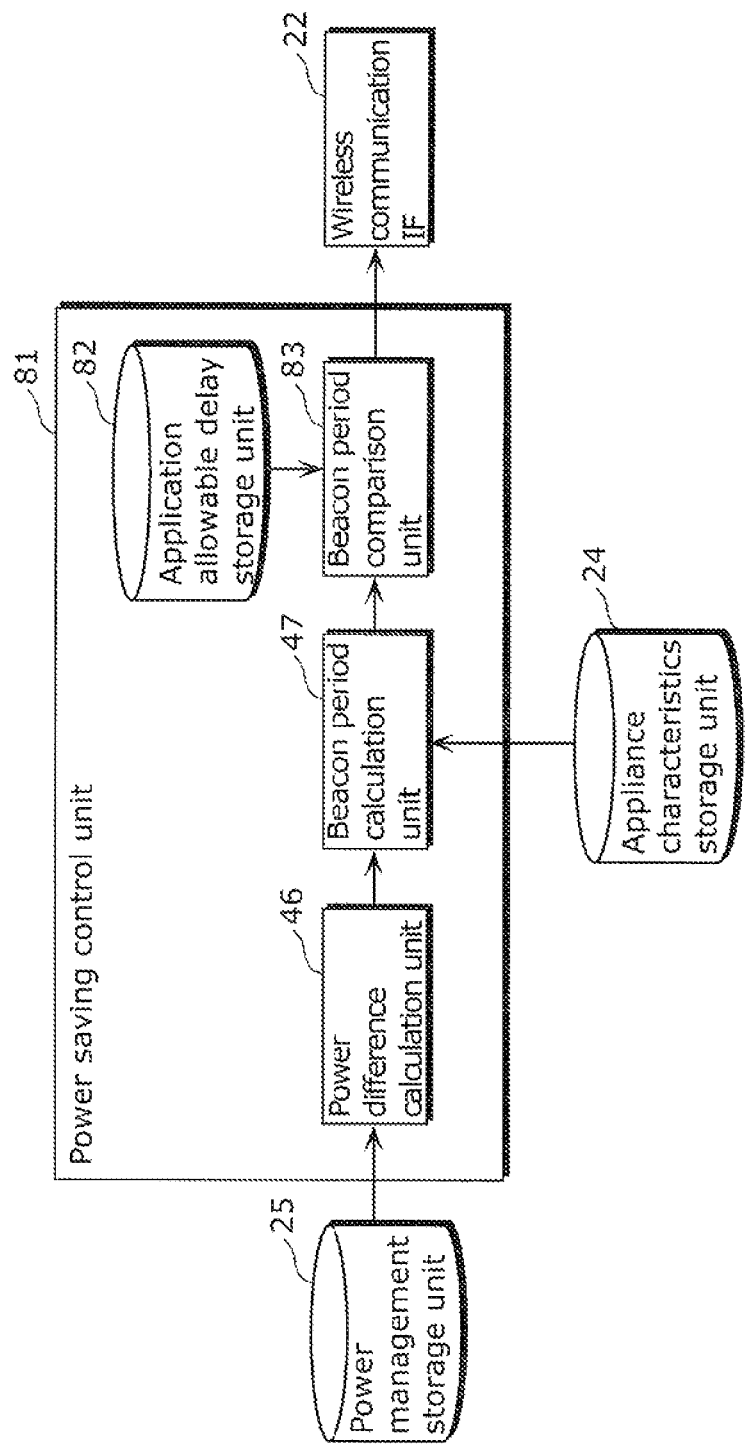
FIG. 20 is a block diagram showing the functional configuration of a power saving control unit of the energy controller in Embodiment 3 of the present invention.

FIG. 20 is a block diagram showing the detailed functional configuration of the power saving control unit 81 shown in FIG. 19. A block having the same function as a block included in the power saving control section 23 which has been described with reference to FIG. 6 is labeled with the same numeral, and description is omitted here.

As shown in FIG. 20, the power saving control unit 81 includes an application allowable delay storage unit 82 and a beacon period comparison unit 83 in addition to the power difference calculation unit 46 and the beacon period calculation unit 47 that are the same components as those included in the power saving control unit 23.

The application allowable delay storage unit 82 stores the application allowable delay table 82a which contains respective allowable delay times for a plurality of applications utilized in the wireless network system. That is to say, the application allowable delay table 82a stores the allowable delay times which are the delay times that may be allowed when a predetermined application is executed.

FIG. 21 is a diagram showing an example of the memory structure of the application allowable delay table 82a. FIG. 21 shows an example which holds allowable delay times for two types of applications: "visualization of power consumption" and "peak control."
The allowable delay time of the visualization of power consumption is 5000 msec, and the allowable delay time for peak suppression is 500 Msec.

Returning to FIG. 20, the beacon period comparison unit 83 has functions of comparing the beacon period calculated by the beacon period calculation unit 47 with the allowable delay time of the application allowable delay table 82a, and determining a beacon period. The beacon period calculating unit 47 calculates a beacon period in such a manner that the beacon period is increased as a power value difference increases, which is the difference between the available power supply value and the total power consumption value.

For example, as an example of a method of how the beacon period comparison unit 83 determines a beacon period, there is a method by which the shortest allowable delay time in the application allowable delay table 82a is compared with the calculated beacon period, and shorter beacon period is selected as the beacon period. In the application allowable delay table 82a of FIG. 21, the shortest allowable delay time for peak suppression is 500 msec. In the case where the beacon period of 6 sec is calculated by the beacon period calculation unit 47 similarly to the example of Embodiment 1, the calculated beacon period (6 sec) is compared with the allowable delay time for peak suppression (500 msec), and the shorter time, 500 msec is determined as the beacon period.

The beacon period comparison unit 83 stores the determined beacon period in the memory 35 of the wireless communication IF 22. In this manner, a beacon period is determined with the condition that allowable delay times for a plurality of applications in the wireless network are satisfied, and thus dynamic change of the beacon period is achieved.

As described above, the power saving control unit 81 calculates a beacon period in such a manner that the beacon period is increased as a power value difference increases. When the calculated beacon period is longer than the shortest allowable delay time in the allowable delay times stored in the application allowable delay storage unit 82, the shortest allowable delay time is determined as the beacon period, while when the calculated beacon period is shorter than or equal to the shortest allowable delay time, the calculated beacon period is determined as the beacon period to be transmitted by being contained in a beacon signal.

The functional block of the network-connected home appliances 11a, 11b, 11c in the present Embodiment 3 is the same as in FIG. 9 of Embodiment 1, and thus description is omitted here.

Figure 22:
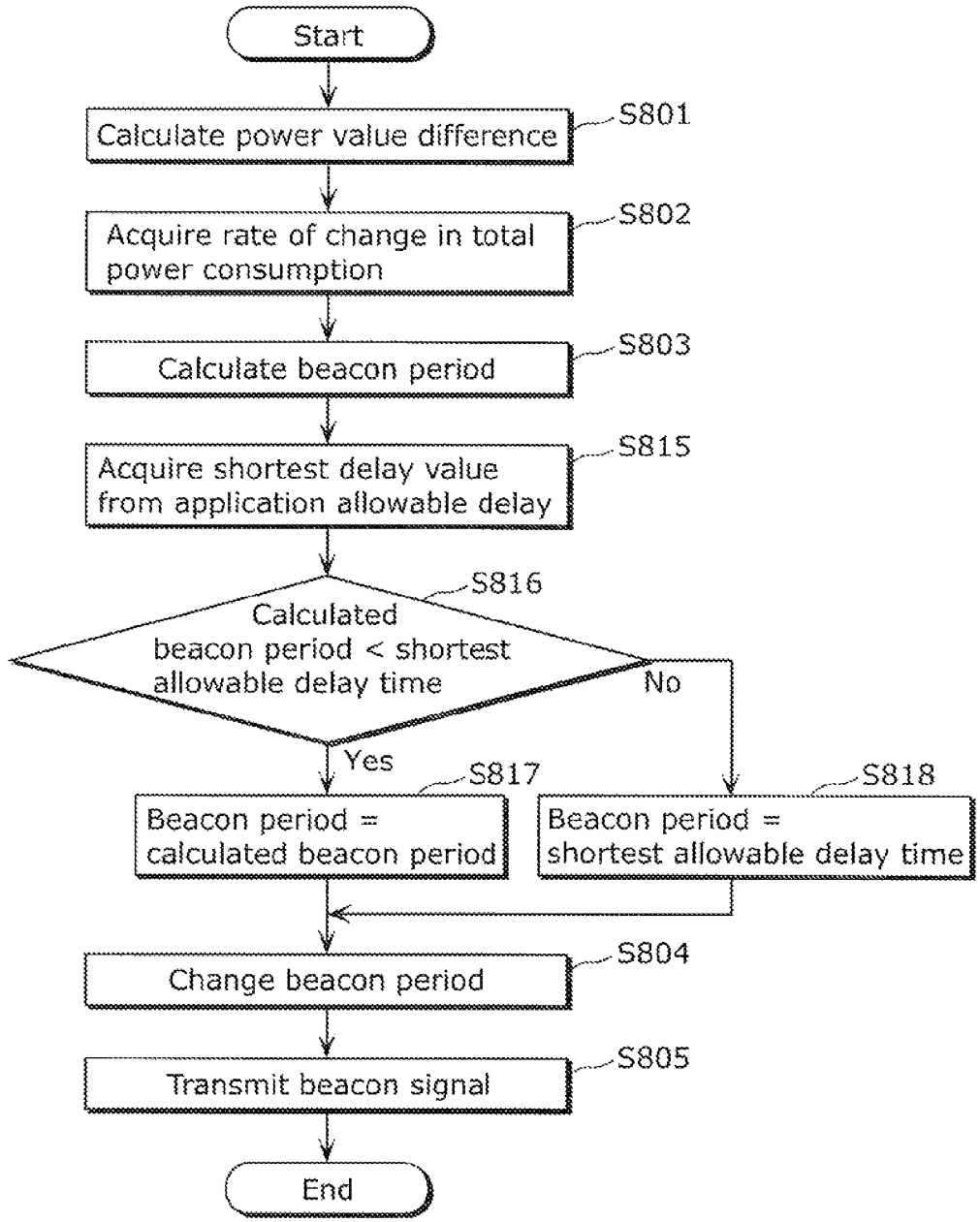
FIG. 22 is a flowchart showing the operation of the power saving control unit of the energy controller in Embodiment 3 of the present invention.

FIG. 22 is a flowchart showing the operation of a method of changing a beacon period by the power saving control unit 81 in Embodiment 3 of the present invention. In the present processes, the processes of S801 to S803, S804 and S805 in FIG. 22 are respectively the same as the processes of S801 to S803, S804 and S805 that have been described with reference to FIG. 11, and thus description is omitted here.

As shown in FIG. 22, at first, the power difference calculation unit 46 of the power saving control unit 81 calculates the power value difference between the available power supply value and the total power consumption value (S801). Subsequently, the beacon period calculation unit 47 acquires the maximum value of the maximum rate of change, as the rate of change of the total power consumption value of the power consumption appliance, from the home appliance characteristics table 24a (S802). Subsequently, the beacon period calculation unit 47 calculates a beacon period based on the above-mentioned Expression 1 (S803).

Subsequently, the beacon period comparison unit 83 acquires the shortest allowable delay time for applications from the application allowable delay table 82a (S815). Subsequently, the beacon period comparison unit 83 compares the shortest allowable delay time with the beacon period which is calculated by the beacon period calculation unit 47 (S816).

When the beacon period comparison unit 83 determines that the calculated beacon period is shorter than the shortest allowable delay time (Yes in S816), the beacon period to be determined is the value of the calculated beacon period (S817).

On the other hand, when the beacon period comparison unit 83 determines that the shortest allowable delay time is shorter than the calculated beacon period (No in S816), the beacon period to be determined is the value of the shortest allowable delay time (S818).

Subsequently, the beacon period comparison unit 83 changes the current beacon period by setting the determined beacon period to the memory 35 of the wireless communication IF 22 (S804). Subsequently, the wireless communication IF 22 transmits the beacon signal containing the information indicating the beacon period and the like to the network-connected home appliances 11a to 11c based on the beacon period (S805).

According to the present Embodiment 3, a beacon period is calculated in such a manner that the beacon period is increased as the power value difference increases, by taking into consideration, the characteristics of the rate of change in the power consumption of the home appliances that are connected, and the power value difference between the available power supply value and the total power consumption value. Furthermore, the allowable delay time requested by the application in the wireless network system and the calculated beacon period are compared with each other, and when the calculated beacon period is longer than the shortest allowable delay time in the allowable delay times, the shortest allowable delay time is determined as the beacon period. Consequently, in a communication network system in which a plurality of applications with different allowable delay times are operated, no beacon period longer than the allowable delay times for the applications is set, and consequently, when the power value difference is large, a beacon period is set so as to satisfy the allowable delay times for the applications, and thus low power consumption may be achieved, while when the power value difference is small, a shorter beacon period is set, and thus a request for peak suppression can be immediately processed.

Embodiment 4

In the above-described Embodiment 1, a beacon period is calculated based on the power value difference between the available power supply value and the total power consumption value, and the characteristics of the rate of change in the power consumption of the home appliances, and then the beacon period is controlled. Consequently, when the power value difference has a large margin for peak suppression, a longer beacon period is set, and thus low power consumption is achieved, while when the power value difference has a small margin for peak suppression, a shorter beacon period is set, and thus a request for peak suppression can be immediately processed.

In the above-described Embodiment 2, after a beacon period is calculated, the beacon period is compared with the beacon value in the stored beacon table, and then the beacon period is determined. Consequently, the beacon period can be dynamically changed in a system in which the beacon period is defined by several types of patterns as in the IEEE 802.15.4.

In the above-described Embodiment 3, after a beacon period is calculated, the beacon period is compared with allowable delay times for the applications which are utilized in the wireless network system, and then final beacon period is determined. Consequently, setting of a beacon period exceeding the allowable delay times for the applications may be prevented, and thus the allowable times for the applications may be satisfied.

On the other hand, in the present Embodiment 4, in contrast to Embodiment 1, Embodiment 2 and Embodiment 3, by utilizing the data (hereinafter referred to as awake data) for controlling an active state and a sleep state of the wireless control station and the wireless terminal devices without utilizing a beacon frame, the transmission period of awake data is controlled. The awake data corresponds to "awake signal" described in the accompanying claims.

Consequently, by utilizing the awake data even in a wireless network system which does not utilize a beacon frame, when the power value difference has a large margin for peak suppression, a longer transmission period of awake data is set, and thus low power consumption is achieved, while when the power value difference has a small margin for peak suppression, a shorter transmission period of awake data is set, and thus a request for peak suppression can be immediately processed.

The network configuration in the present Embodiment 4 is similar to the network configuration in FIG. 1 of Embodiment 1, and thus description is omitted here.

Figure 23:
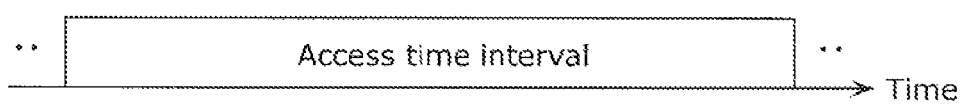
FIG. 23 is a diagram showing the relationship between time and access period in Embodiment 4 of the present invention.
Figure 44:
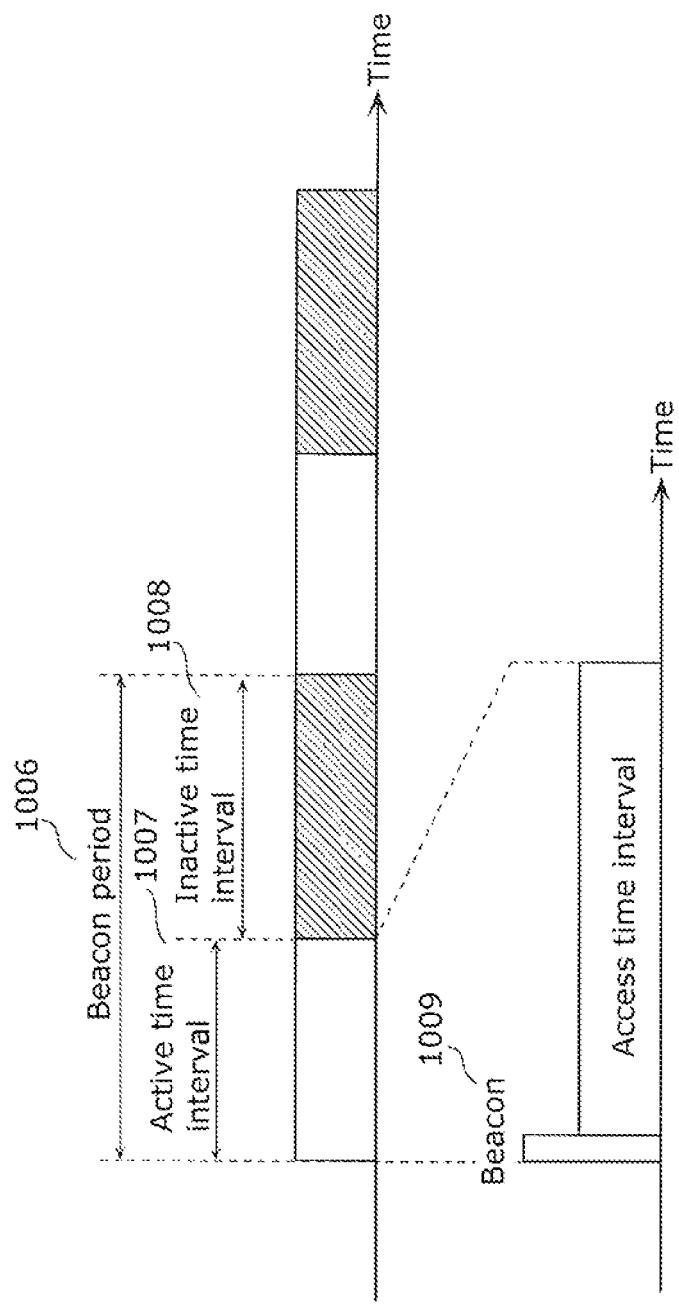
FIG. 44 is a diagram showing the relationship between a conventional beacon period, an active time interval, and an inactive time interval.

In the present Embodiment 4, a beacon frame is not used. For this reason, there is no concept of the active time interval 1007 and the inactive time interval 1008 as shown in FIG. 44, and all the time is the access period as shown in FIG. 23. The access period is a period during which a wireless control station and each wireless terminal device communicate with each other by using access control such as CSMA. Here, FIG. 23 is a diagram showing the relationship between the access period and time in Embodiment 4 of the present invention.

Figure 24:
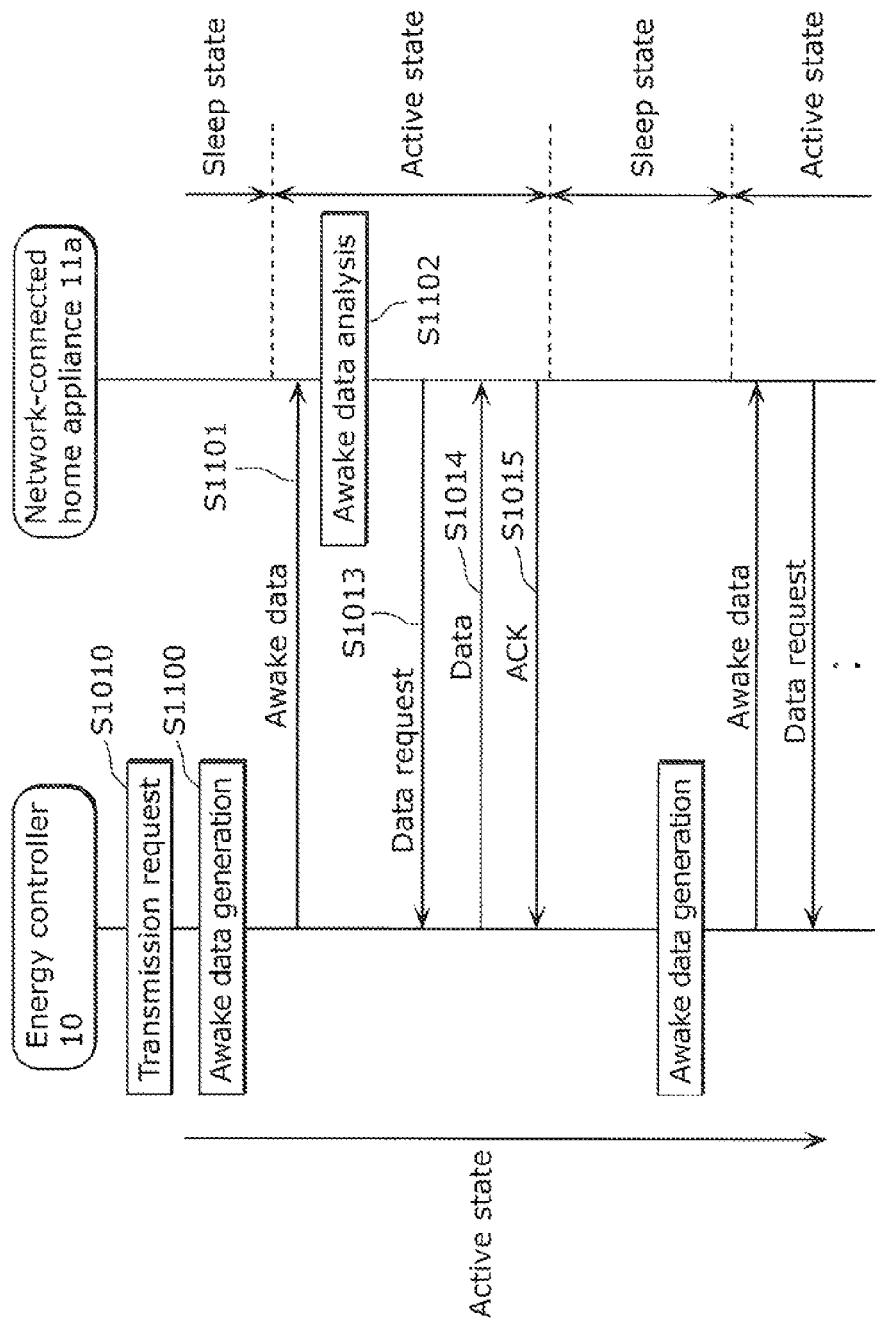
FIG. 24 is a sequence diagram of transmission of awake data to the in network-connected home appliances and reception of data by the energy controller in Embodiment 4 of the present invention.

FIG. 24 is a flowchart showing an example of a sequence in which the energy controller 10 having a function of a wireless control station makes data communication with the network-connected home appliance 11a having a function of a wireless terminal device by using awake data instead of the beacon frame in Embodiment 4.

Figure 45:
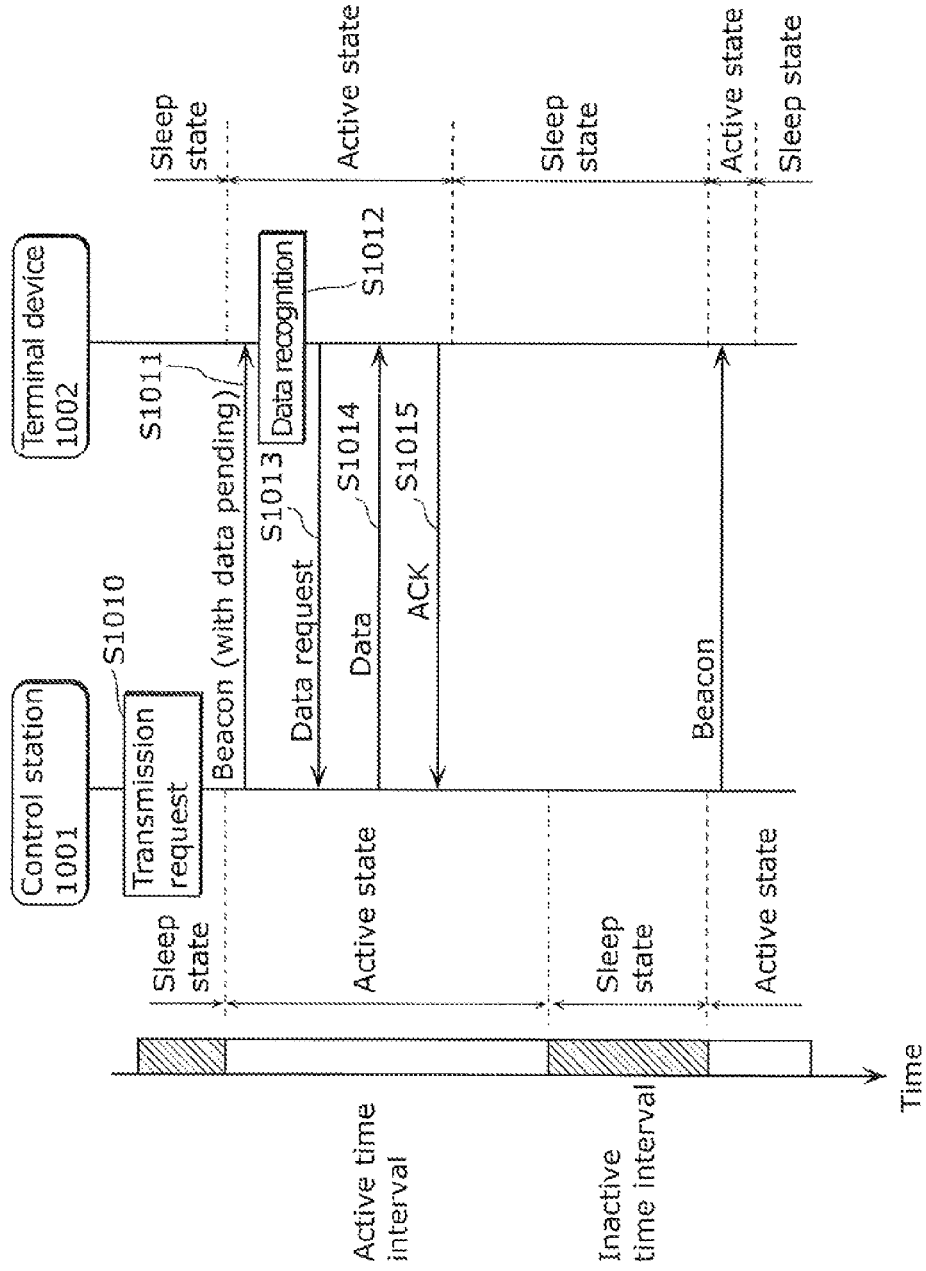
FIG. 45 is a flowchart showing an example of a sequence of data transmission to a terminal device by a conventional control station.
Figure 46:
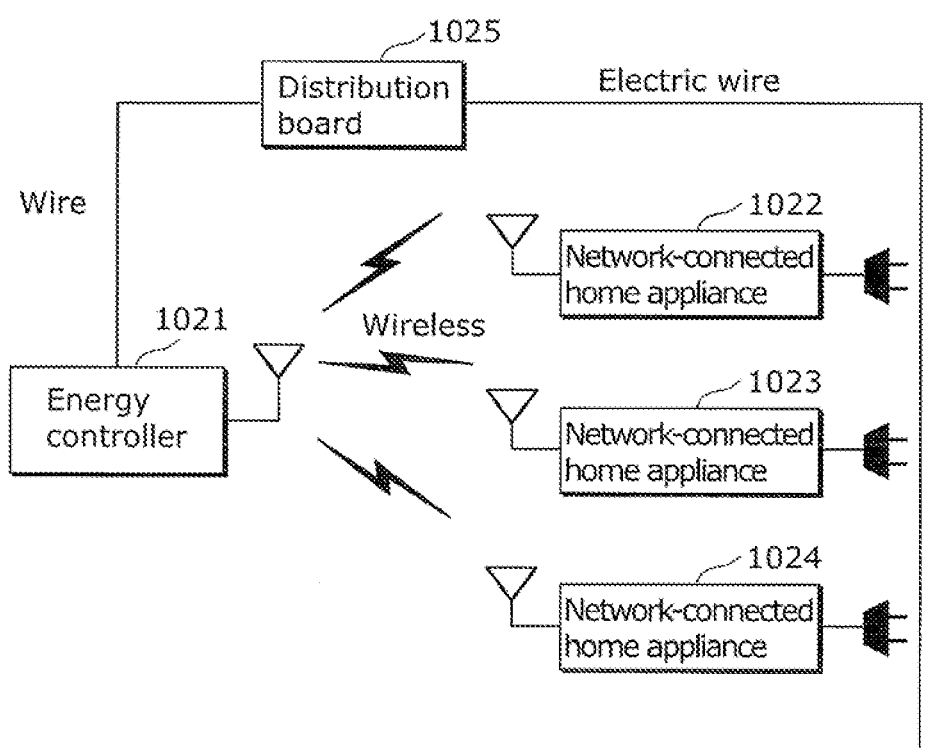
FIG. 46 is a diagram showing an example of a network configuration which achieves EMS application in a house.
Figure 47A:
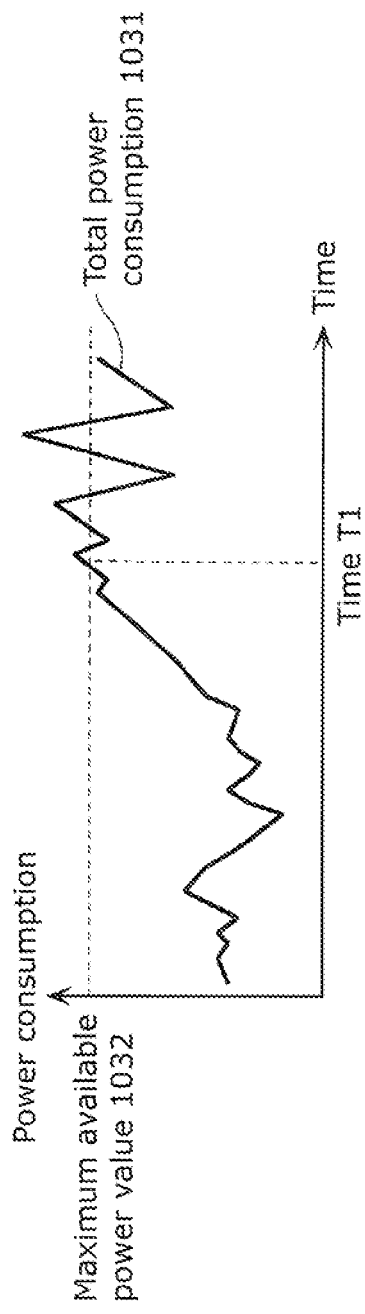
FIG. 47A is a diagram showing an example of the correspondence between total power consumption and time.
Figure 47B:
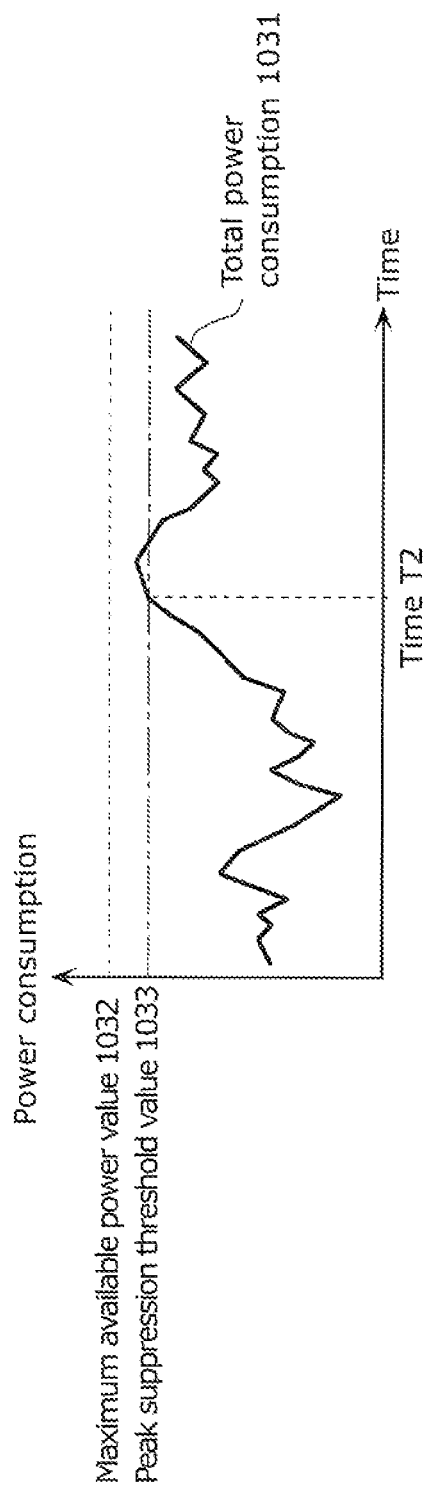
FIG. 47B is a diagram showing an example of the correspondence between total power consumption and time.

It is assumed that the awake data includes information of the time until the subsequent transmission of awake data is performed, and the wireless terminal device receives the awake data without fail. In FIG. 24, the steps which perform processes similar to those shown in FIG. 45 are labeled with the same numerals.

First, as shown in FIG. 24, when data to be transmitted to the network-connected home appliance 11a is generated (S1010), the energy controller 10 buffers the data.

The energy controller 10 then generates an awake frame based on the information of the time until the subsequent transmission of awake data is performed, the information being contained in the previously transmitted awake data (S1100), and then the energy controller 10 transmits awake data (S1101).

The network-connected home appliances 11a shifts from a sleep state, to an active state at the timing when awake data is received, and then receives the awake data (S1101).

The network-connected home appliances 11a then analyzes the awake data (S1102), and checks the time when the subsequent awake data is to be transmitted.

Subsequently, the network-connected home appliances 11a transmits a data request (S1013) in order to check whether or not there is any data buffered in the energy controller 10.

The energy controller 10, when data addressed to the network-connected home appliance 11a is buffered, transmits the data to the network-connected home appliance 11a (S1014).

The network-connected home appliance 11a then returns ACK which is an arrival acknowledgement signal to the energy controller 10 (S1015).

On the other hand, the energy controller 10, when there is no buffered data addressed to the network-connected home appliance 11a after receiving a data request (S1013), notifies ACK no-buffered-data state to the network-connected home appliance 11a.

As described above, the network-connected home appliance 11a shifts from a sleep state to an active state at the timing when receiving awake data, which is periodically transmitted. The network-connected home appliances 11a, after inquiring about data at the energy controller 10, receives the data, and shifts to a sleep state and keeps the state until subsequent timing of receiving awake data. On the other hand, when there is no data to receive, the network connected home appliance 11a immediately shifts to a sleep state and keeps the state until subsequent timing of receiving awake data. By these operations, low power consumption of the network connected home appliance 11a may be achieved.

Figure 25:
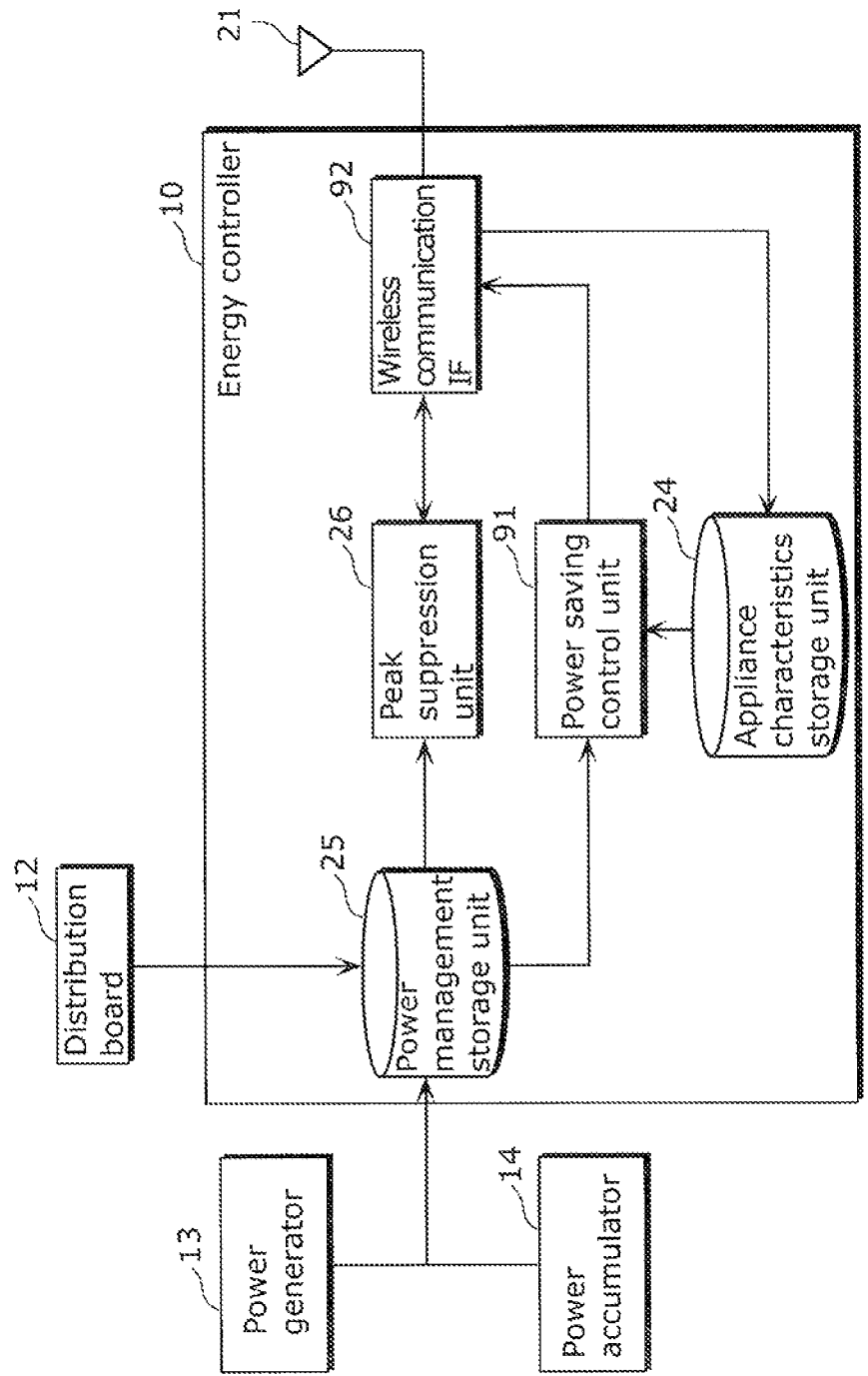
FIG. 25 is a block diagram showing the functional configuration of the energy controller in Embodiment 4 of the present invention.

FIG. 25 is a block diagram illustrating an example of the functional configuration of the energy controller 10 in Embodiment 4 of the present invention. A block having the same function as a block in the energy controller 10 of Embodiment 1, which has been described with reference to FIG. 2 is labeled with the same numeral, and description is omitted here.

As shown in FIG. 25, the energy controller 10 in Embodiment 4 includes a power saving control unit 91 and a wireless communication IF 92 in addition to the appliance characteristics storage unit 24, the power management storage unit 25, and the peak suppression unit 26 that are the same components as those included in the energy controller 10 in Embodiment 1.

The wireless communications IF 92 transmits awake data containing information indicating the transmission period of the awake data to the network-connected home appliances 11a to 11c with a period according to the transmission period of the beacon signal in order to set the network-connected home appliances 11a to 11c in an active state. Specifically, the wireless communication IF 92 has functions such as modulation of data, recovery of data, media access control, frame generation, and the like.

The wireless communication IF 92 has, as an example, the functions of Physical Layer and MAC layer (Media Access Control Layer) that conform to the IEEE 802.15.4 standard. The details of the wireless communication IF 92 are described later in FIG. 26. The wireless communication IF 92 is included in "communication interface unit" described in the accompanying claims.

The power saving control unit 91 has a function of achieving power saving. In particular, the power saving control unit 91 has functions of calculating a transmission period of awake data and generating awake data based on the home appliance characteristics table 24a stored in the appliance characteristics storage unit 24, and the power management table 25a stored in the power management storage unit 25. The details of the power saving control unit 91 are described later in FIG. 27.

Figure 26:
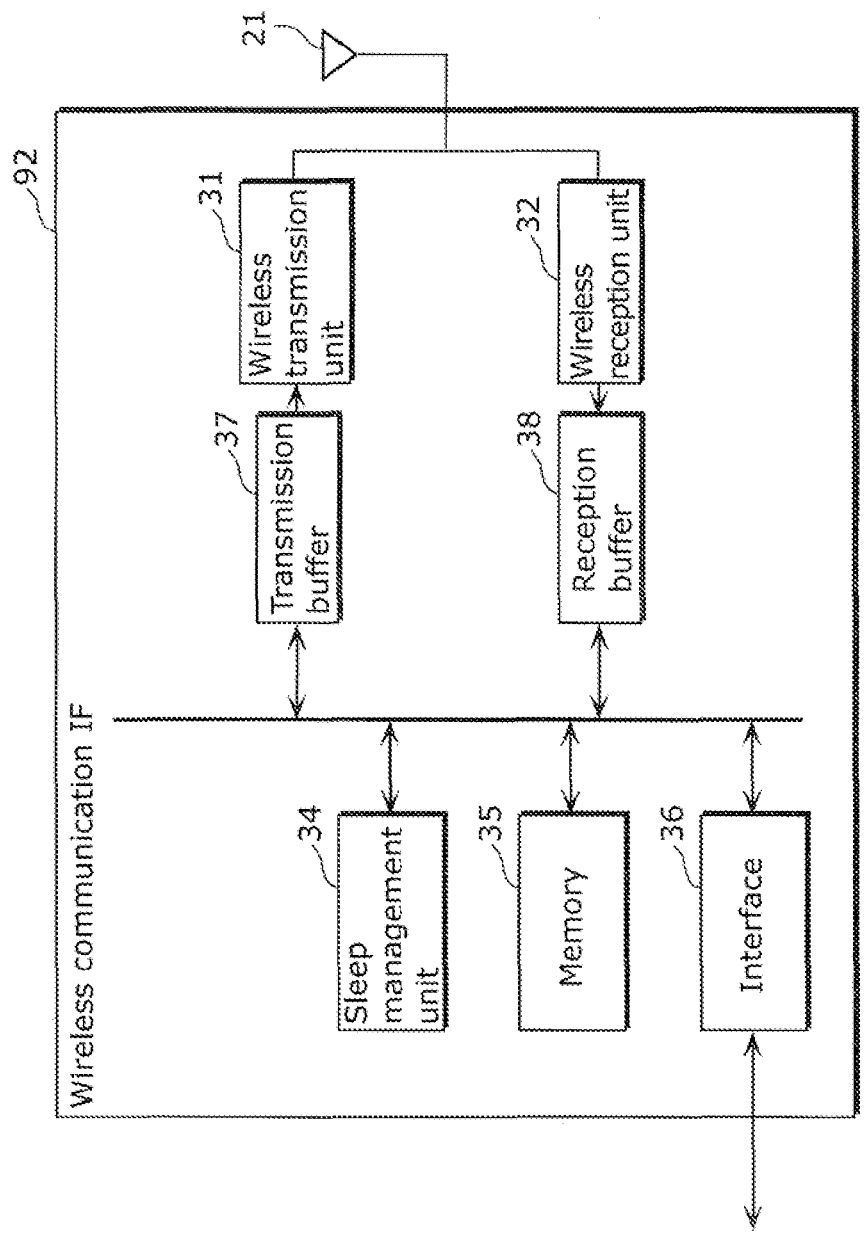
FIG. 26 is a block diagram showing the functional configuration of a wireless communication IF of the energy controller in Embodiment 4 of the present invention.

FIG. 26 is a block diagram illustrating the detailed functional configuration of the wireless communication IF 92 illustrated in FIG. 25. In FIG. 26, the same components as those in FIG. 3 are labeled with the same reference symbols, and description is omitted.

As shown in FIG. 26, the difference between the components of the wireless communication IF 92 illustrated in FIG. 26 and the components of the wireless communication IF 22 illustrated in FIG. 3 is that the wireless communication IF 92 does not include the beacon generation unit 33.

Figure 27:
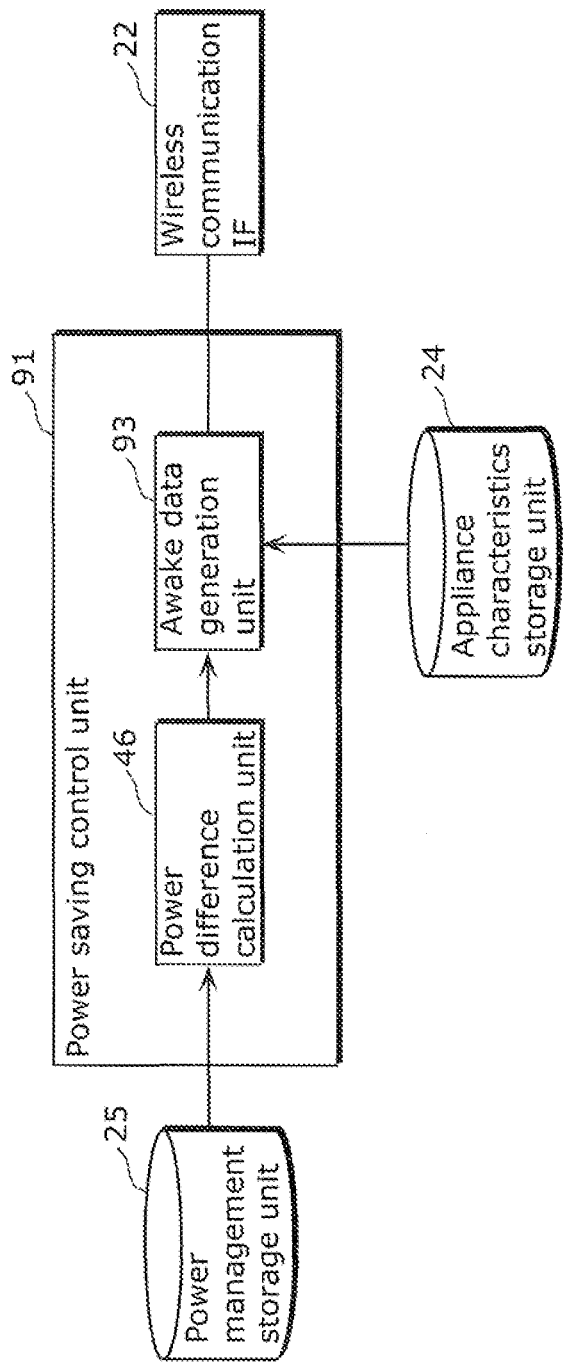
FIG. 27 is a block diagram showing the functional configuration of a power saving control unit of the energy controller in Embodiment 4 of the present invention.

FIG. 27 is a block diagram illustrating the detailed functional configuration of the power saving control unit 91 illustrated in FIG. 25. A block having the same function as a block in the power saving control unit 23, which has been described with reference to FIG. 6 is labeled with the same numeral, and description is omitted here.

As shown in FIG. 27, the power saving control unit 91 includes an awake data generation unit 93 in addition to the power difference calculation unit 46 that is the same component as that included in the power saving control unit 23.

The awake data generation unit 93 has a function of calculating a quotient as the transmission period of awake data by dividing a power value difference by a divisor, the power value difference being obtained by subtracting the total power consumption value from the available power supply value, the divisor being the rate of change in the total power consumption value, which is calculated based on the rates of change in the power consumption values in the power consumption appliance.

Specifically, the beacon period calculation unit 47 calculates a transmission period of awake data based on the power value difference acquired by the power difference calculation unit 46 and the maximum rate of change in the home appliance characteristics table 24a shown in FIG. 4 under the assumption that the rate of change in the total power consumption value is set to the maximum rate of change in the power consumption values of the entire power consumption appliance. That is to say, as the maximum rate of change in the home appliance characteristics table 24a, the maximum rate of change in the power consumption values of the home appliances that are stored is selected.

In the case of FIG. 4, compared with other appliances, a microwave oven has the maximum rate of change of 800 W/sec. Here, the calculation method of the transmission period of awake data is as follows.

$$\text{awake data transmission period} = \text{power value difference/rate of change} \quad \text{(Expression 2)}$$

For example, when the power value difference is 4800 W and the rate of change is 800 W/sec, the awake data transmission period is 6 sec (=4800/800). The awake data generation unit 93 stores the calculated awake data transmission period in the memory 35 of the wireless communication IF 92.

In this manner, dynamic change of the awake data transmission period of the wireless network is achieved.

As the calculation method of the rate of change of the total power consumption value, not only the maximum value of the maximum rate of change in the home appliance characteristics table 24a, but also the total of the maximum rate of change, the second maximum rate of change, and the third maximum rate of change may be used. For example, in FIG. 4, a microwave oven, a water heater pot, and an air-conditioner are selected, and the sum is 1400 (w/sec) (=800+400+200). The value indicates a possible rate of change in the power consumption that may be required when the microwave oven, the water heater pot, and the air-conditioner are used simultaneously.

In this case, the transmission period of awake data is calculated to be 3428 msec (=4800/1400).

Figure 28:
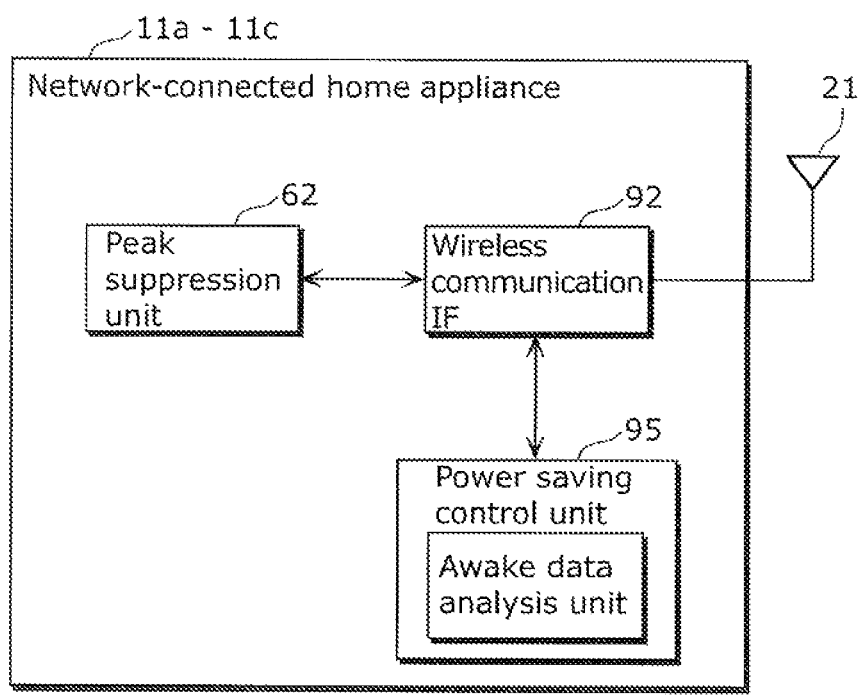
FIG. 28 is a block diagram showing the functional configuration of network-connected home appliances in Embodiment 4 of the present invention.

FIG. 28 is a block diagram showing an example of the functional configuration of the network-connected home appliances 11a, 11b, 11c in the present Embodiment 4. In FIG. 28, the same components as those in FIGS. 9 and 25 are labeled with the same reference symbols, and description is omitted.

As shown in FIG. 28, each of the network connected home appliances 11a, 11b, 11c in the present Embodiment 4 includes the wireless communication IF 92 and a power saving control unit 95 in addition to the peak suppression unit 62 that is the same component as that included in each of the network-connected home appliances 11a, 11b, 11c in the present Embodiment 1. The wireless communication IF 92 has the same function as that of the wireless communication IF 92 included in the energy controller 10 shown in FIG. 25, and thus description is omitted.

The power saving control unit 95 has a function of analyzing awake data, and recognizes the time when the subsequent awake data is to be transmitted, the time being contained in the current awake data. The power saving control unit 95, after receiving the awake data, controls the memory 35 of the wireless communication IF 92, and transmits a data request to the energy controller 10. The power saving control unit 95, when determining that there is no transmission and reception of data to and from the energy controller 10, controls the sleep management unit 34 of the wireless communication IF 92 so as to shift to a sleep state, and thus low power consumption is achieved.

Figure 29:
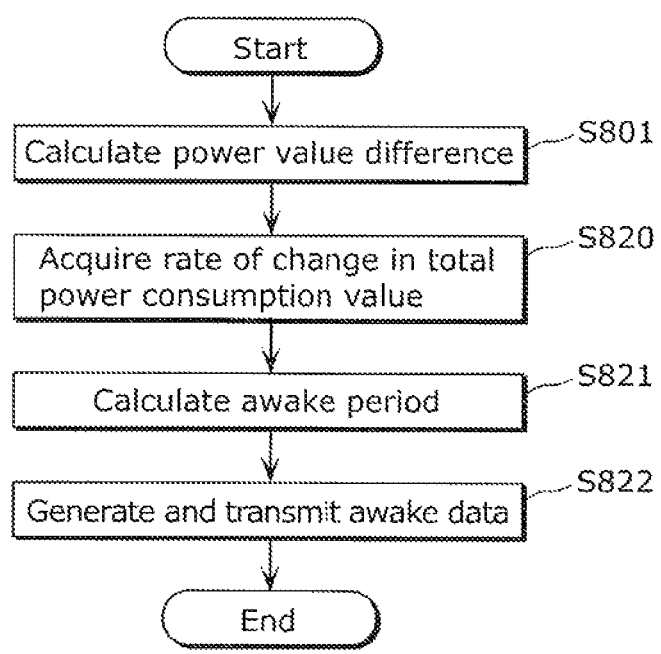
FIG. 29 is a flowchart showing the operation of the power saving control unit of the energy controller in Embodiment 4 of the present invention.

FIG. 29 is a flowchart showing the operation of a method of changing the awake data transmission period by the power saving control unit 91 of the energy controller 10 in Embodiment 4 of the present invention.

As shown in FIG. 29, at first, the power difference calculation unit 46 of the power saving control unit 91 calculates an available power supply value to the power consumption appliance, and a power value difference between the available power supply value and the total power consumption value of the power consumption appliance (S801).

Subsequently, the awake data generation unit 93 acquires the maximum value of the maximum rate of change, as the rate of change of the total power consumption value of the power consumption appliance, from the home appliance characteristics table 24a (S820).

Subsequently, the awake data generation unit 93 calculates an awake data transmission period based on the above-mentioned Expression 2 by dividing the power value difference by the maximum value of the maximum rate of change (S821).

Subsequently, the awake data generation unit 93 generates awake data based on the calculated awake data transmission period, and transmits the awake data (S822).

As described above, the power saving control unit 91 determines an awake data transmission period in such a manner that the awake data transmission period is increased as the power value difference increases, which is the difference between the available power supply value to the power consumption appliance and the total power consumption value of the power consumption appliance.

According to the present embodiment, low power consumption of the wireless terminal devices is achieved by using the application data (awake data) which replaces a beacon frame, without using a beacon frame. In addition, the awake data transmission period is calculated by taking into consideration the characteristics of the rate of change in the power consumption of the home appliances, and the power value difference between the available power supply value and the total power consumption value. Consequently, even in a wireless network system in which a beacon frame is not utilized, a longer transmission period of awake data is set for a larger power value difference, and thus low power consumption is achieved, while a shorter transmission period of awake data is set for a smaller power value difference, and thus a request for peak suppression can be immediately processed.

Embodiment 5

The present Embodiment 5 differs from the above-described Embodiment 1, Embodiment 2, and Embodiment 3 in that the energy controller 10 and the network-connected home appliances 11a to 11c are connected to each other not by wireless communication but by power line communication (hereinafter referred to as PLC). Consequently, the method of changing a beacon period is not limited to be applied to the beacon period of a wireless network system, but may be applied to the beacon period of a PLC network system.

Figure 30:
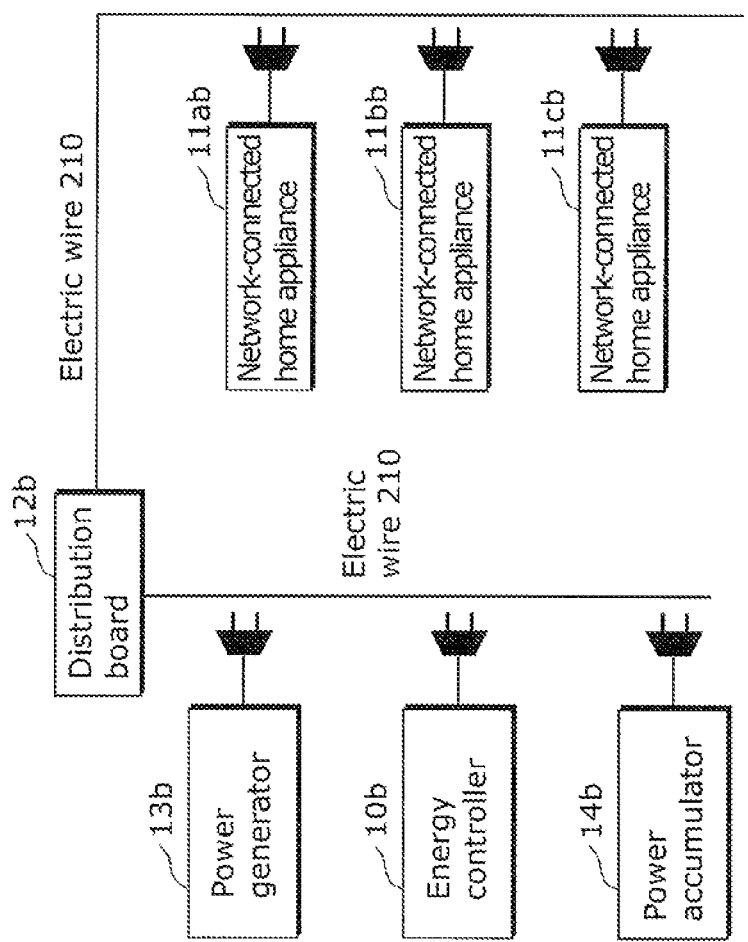
FIG. 30 is a diagram showing the network configuration of Embodiment 5 of the present invention.

FIG. 30 is a diagram showing an example of the network configuration in the present Embodiment 5.

In FIG. 30, the energy controller 10b is connected to the network-connected home appliances 11ab, 11bb, 11cb via the electric wire 210. In addition, a power generator 13b and a power accumulator 14b are also connected to the energy controller 10b via the electric wire 210. The energy controller 10b is included in "communication device" described in the accompanying claims, and the network-connected home appliances 11aa, 11bb, 11cc are included in "communication terminal device" described in the accompanying claims.

A distribution board 12b supplies power to each appliance in a house via the electric wire 210, and can measure the total power consumption in the house. The power generator 13b and the power accumulator 14b are connected to the energy controller 10b via the electric wire 210. Communication using the electric wire 210 includes PLC.

The power generator 13b represents a device to generate power, for example, by solar power generation, wind power generation, or fuel cells. The power accumulator 14b represents, for example, a secondary battery such as a lithium ion battery. Surplus power generated by the generator 13b may be stored in the power accumulator 14b.

The network-connected home appliances 11ab, 11bb, 11cb are wireless terminal device which repeat an active state and a sleep state, the active state being a state in which communication is possible, and the sleep state being a state in which communication is not possible. The network-connected home appliances, herein are assumed to include only three appliances, i.e., the network-connected home appliances 11ab, 11bb, 11cb, but may include any number of appliances without being limited to three appliances.

The energy controller 10b transmits and receives data to and from the network-connected home appliances 11ab to 11cb by transmitting a beacon signal, which is a signal for establishing transmission and reception of the data, to the network-connected home appliances 11ab to 11cb when the network-connected home appliances 11ab to 11cb are in an active state.

In addition, the energy controller 10b can recognize the total power consumption amount from the distribution board 12b, generated amount of power from the power generator 13b, and accumulated amount of power from the power accumulator 14b via the electric wire 210.

Figure 31:
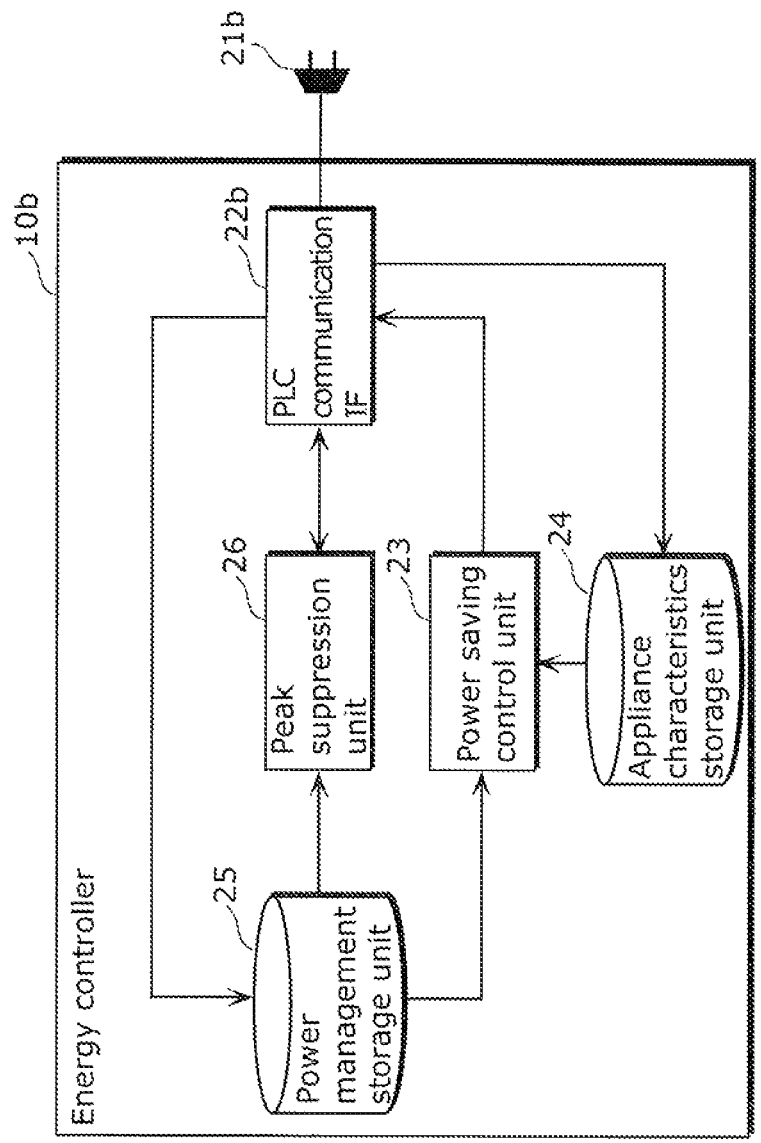
FIG. 31 is a block diagram showing the functional configuration of an energy controller in Embodiment 5 of the present invention.

FIG. 31 is a block diagram showing an example of the functional configuration of the energy controller 10b in Embodiment 5 of the present invention. A block having the same function as a block in the energy controller 10 of Embodiment 1, which has been described with reference to FIG. 2 is labeled with the same numeral, and description is omitted here.

The energy controller 10b in the present Embodiment 5 differs from the energy controller 10 shown in FIG. 2 in that the energy controller 10b includes a PLC communication IF 22b instead of the wireless communication IF 22.

The PLC communication IF 22b is a PLC (Power Line Communication) interface. The PLC communication IF 22b corresponds to "communication interface unit" described in the accompanying claims.

Figure 32:
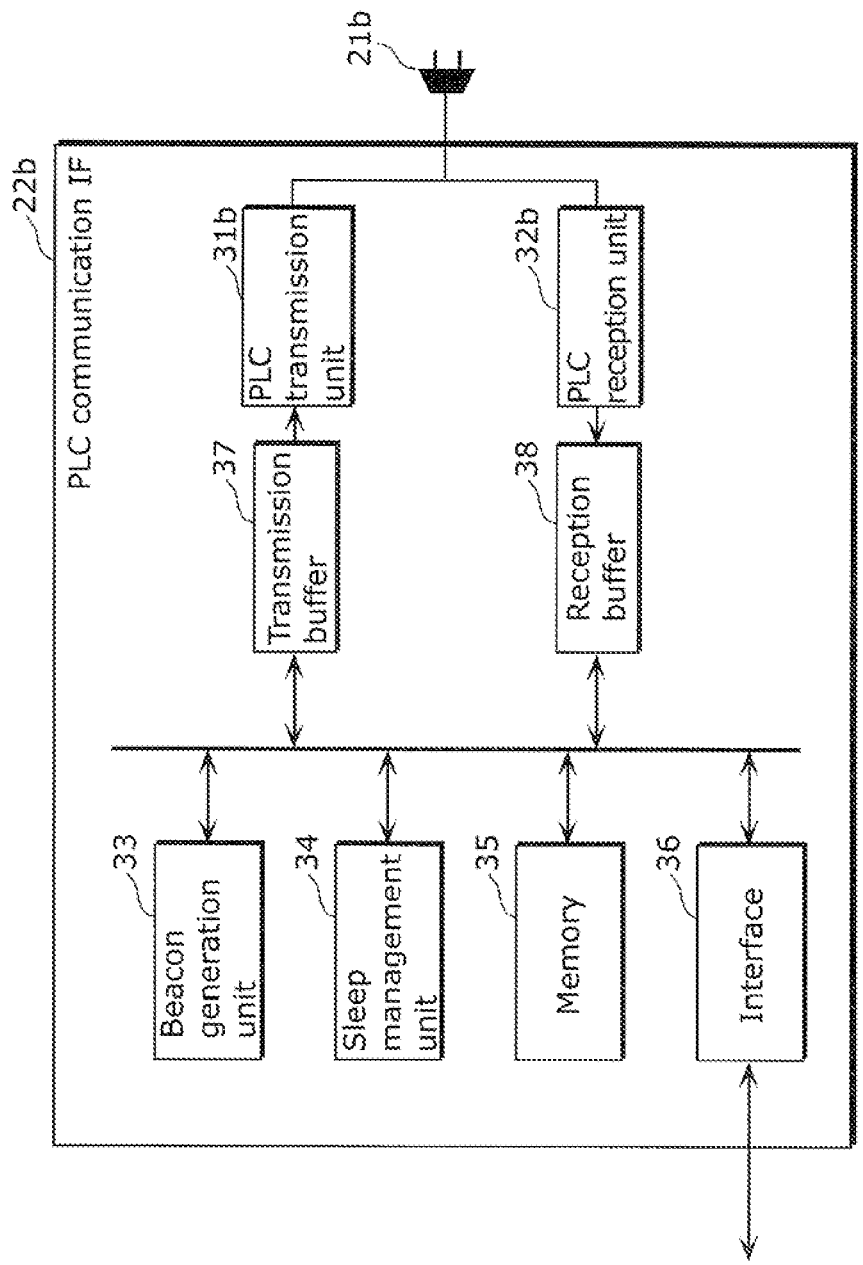
FIG. 32 is a block diagram showing the functional configuration of a PLC communication IF of the energy controller in Embodiment 5 of the present invention.

Here, a detailed functional block of the PLC communication IF 22b is shown in FIG. 32. FIG. 32 is a block diagram showing the function configuration of the PLC communication IF 22b. A block having the same function as a block in the wireless communication IF 22 of Embodiment 1, which has been described with reference to FIG. 3 is labeled with the same numeral, and description is omitted here.

As shown in FIG. 32, the PLC communication IF 22b includes a PLC transmission unit 31b and a PLC reception unit 32b in addition to the beacon generation unit 33, the sleep management unit 34, the memory 35, the interface 36, the transmission buffer 37, and the reception buffer 38 that are the same components as those of the wireless communication IF 22.

Here, an outlet plug 21b is an insertion plug to be connected to the electric wire 210.

The PLC transmission unit 31b has functions of retrieving data such as a beacon signal from the transmission buffer 37, modulating the data signal, and transmitting the data at an appropriate timing according to the media access control. Here, the beacon signals transmitted by the PLC transmission unit 31b include information such as a beacon period, an active time interval, and an inactive time interval that are stored in the memory 35.

The PLC reception unit 32b has functions of demodulating the received data signal and transferring the demodulated data to the reception buffer 38.

Figure 33:
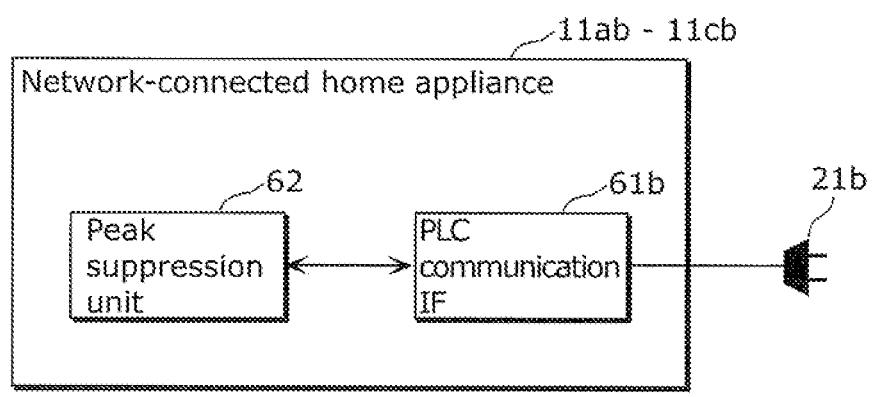
FIG. 33 is a block diagram showing the functional configuration of network-connected home appliances in Embodiment 5 of the present invention.

FIG. 33 is a block diagram showing an example of the functional configuration of the network-connected home appliances 11ab, 11bb, 11cb in Embodiment 5 of the present invention. The same components in the network-connected home appliances 11ab to 11cb shown in FIG. 33 as those in the network-connected home appliances 11a to 11c shown in FIG. 9 are labeled with the same reference symbols, and description is omitted.

As shown in FIG. 33, each of the network connected home appliances 11ab, 11bb, 11cb includes a PLC communication IF 61b in addition to the peak suppression unit 62 that is the same component as that included in each of the network-connected home appliances 11a, 11b, 11c.

Figure 34:
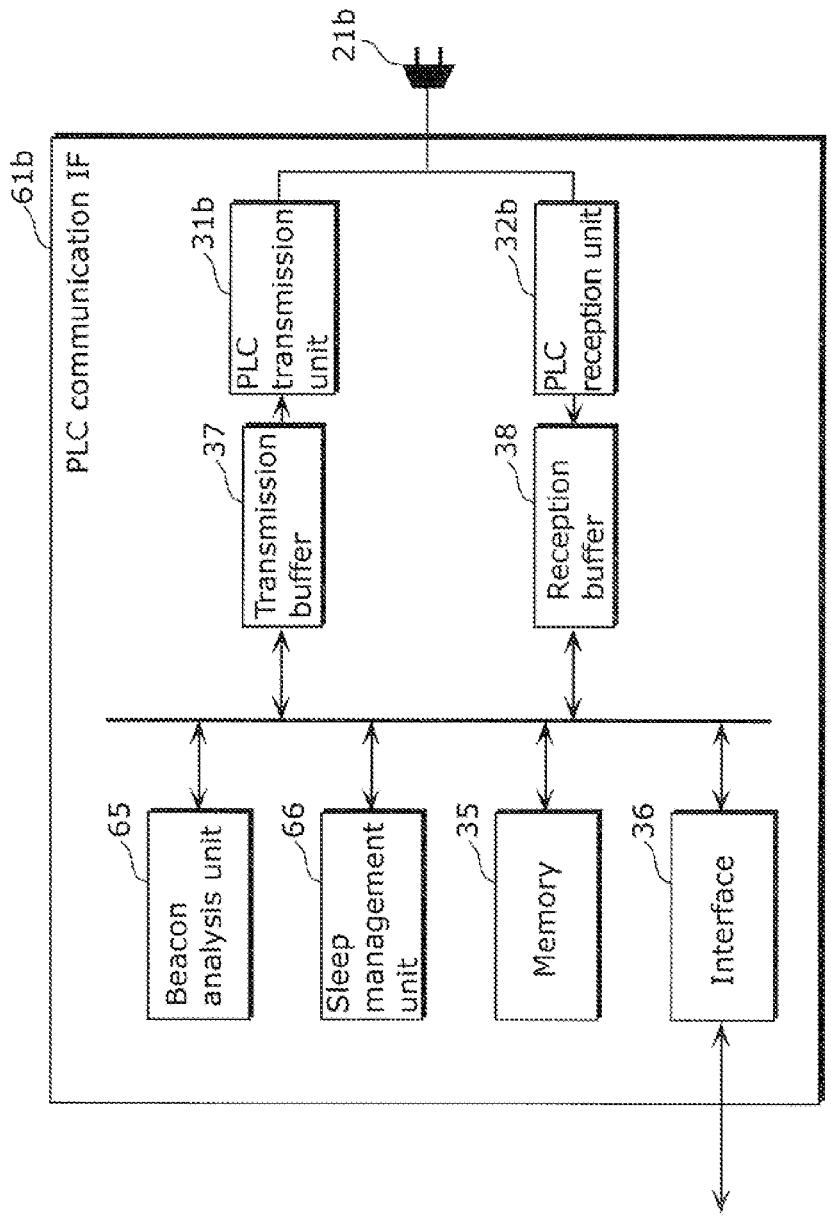
FIG. 34 is a block diagram showing the functional configuration of a PLC communication IF of the network-connected home appliances in Embodiment 5 of the present invention.

A detailed functional block diagram of the PLC communication IF 61b is shown in FIG. 34. A block having the same function as a block described in the wireless communication IF 61 shown in FIG. 10 and the PLC communication IF 22b shown in FIG. 32 is labeled with the same numeral, and description is omitted here.

That is to say, as shown in FIG. 34, the PLC communication IF 61b includes the memory 35, the interface 36, the transmission buffer 37, the reception buffer 38, the beacon analysis unit 65, and the sleep management unit 66 that are the same components as those included in the wireless communication IF 61, and further includes the PLC transmission unit 31b and the PLC reception unit 32b that are the same components as those included in the PLC communication IF 22b.

A flowchart showing the operation of a method of changing a beacon period by the power saving control unit 23 in Embodiment 5 of the present invention is similar to the flowchart shown in FIG. 11 of Embodiment 1, and thus description is omitted. The method of changing a beacon period is also the same as that of Embodiment 1, and thus description is omitted.

According to the present Embodiment 5, a beacon period in the PLC network system is calculated by taking into consideration the characteristics of the rate of change in the power consumption of the home appliances that are connected, and the power value difference between the available power supply value and the total power consumption value. Consequently, not only in a wireless network system but also in a PLC network system, a longer beacon period is set for a larger power value difference, and thus low power consumption may be achieved, while a shorter beacon period is set for a smaller power value difference, and thus a request for peak suppression can be immediately processed.

Embodiment 6

In the above-described Embodiment 1, Embodiment 2, and Embodiment 3, a beacon period is calculated based on the power value difference between the available power supply value and the total power consumption value, and the characteristics of the rate of change in the power consumption of the home appliances, and then the calculated beacon period is further compared with the beacon value in the beacon table, or with the allowable delay time of application, and thus the beacon period is calculated. Here, in each wireless network system in Embodiments 1 to 3, the wireless control station and the wireless terminal devices communicate with each other using the same frequency channel.

On the other hand, in the present Embodiment 6, a beacon period is calculated on the assumption that a wireless network system has a configuration in which a wireless control station communicates with wireless terminal devices while hopping (switching) between a plurality of frequency channels (hereinafter denoted as CH). The active time interval and the inactive time interval are also calculated in accordance with the number of channels. Consequently, the method in Embodiment 6 may be applied to a wireless network system which uses a plurality of frequency channels.

Figure 35:
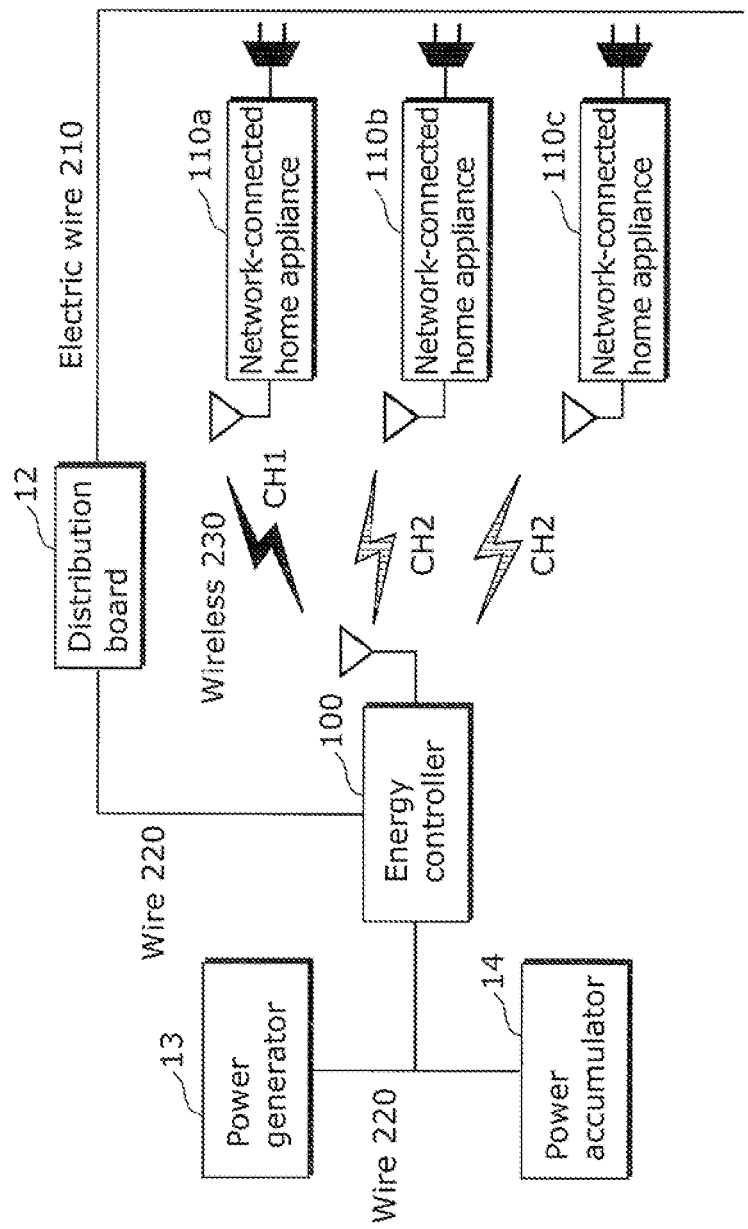
FIG. 35 is a diagram showing the network configuration of Embodiment 6 of the present invention.

FIG. 35 is a diagram showing an example of the network configuration in Embodiment 6. In FIG. 35, the same components as those in the network configuration in FIG. 1 of Embodiment 1 are labeled with the same reference symbols, and description is omitted.

In FIG. 35, an energy controller 100 is connected to network-connected home appliances 110a, 110b, 110c via the wireless 230. The energy controller 100 is included in "communication device" described in the accompanying claims, and the network-connected home appliances 110a, 110b, 110c are included in "communication terminal device" described in the accompanying claims.

The wireless 230 may be a connection according to a specific low power wireless which conforms to, for example, the IEEE 802.15.4 standard, the IEEE 802.11 standard, or ARIB.

Figure 36:
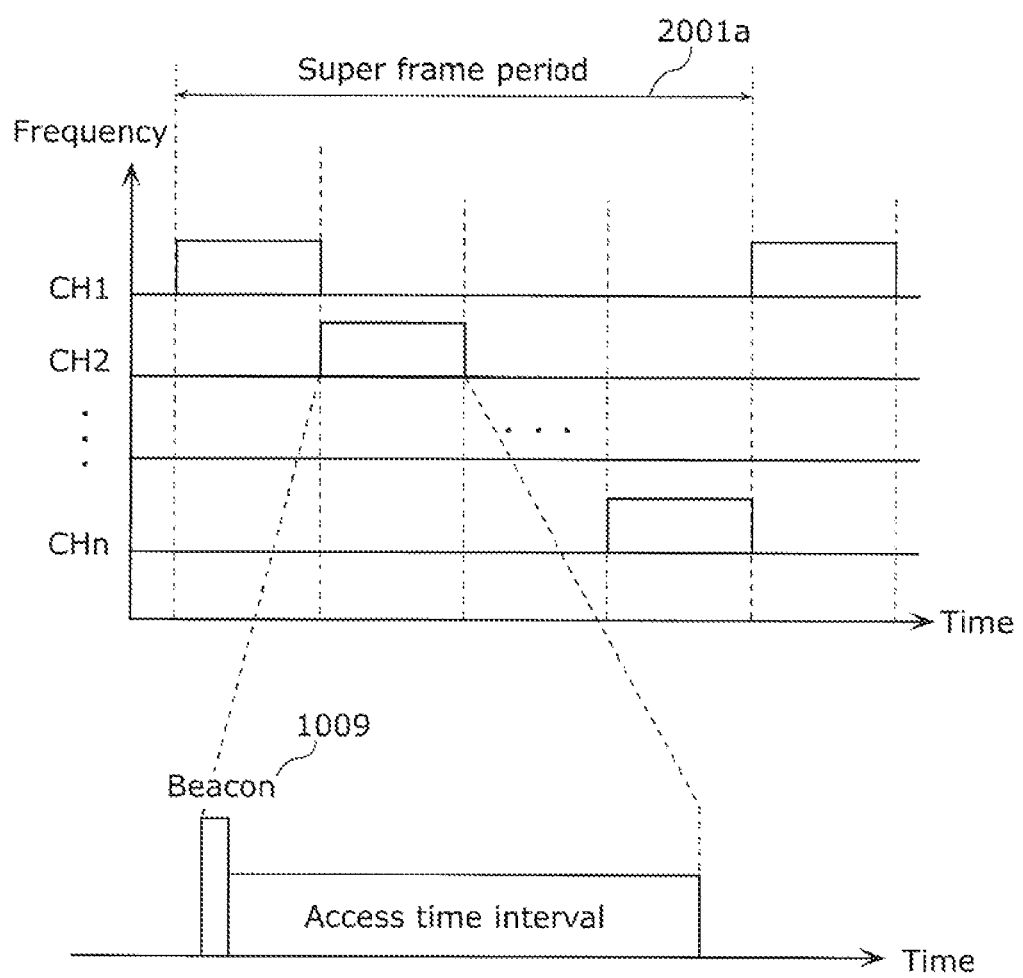
FIG. 36 is a diagram showing the correspondence between time and frequency channel of an energy controller in Embodiment 6 of the present invention.

The network configuration in Embodiment 6 differs from the network configuration in FIG. 1 of Embodiment 1 in that a plurality of radio channels are utilized. For example, in FIG. 35, the energy controller 100 and the network-connected home appliances 110a are connected to each other via a channel 1 (CH1); and the energy controller 100 and the network-connected home appliances 110b as well as the energy controller 100 and the network-connected home appliances 110c are connected to each other via a channel 2 (CH2), FIG. 36 is a diagram showing, on the time-axis, the manner in which the energy controller 100 in the present Embodiment 6 hops between channels (CH).

The energy controller 100 hops from CH1 through CHn. The period of hopping from CH1 through CHn is referred to as a super frame period 2001a. The energy controller 100 communicates with the network-connected home appliances 110a to 110c while changing CH sequentially.

An active time interval is provided for each CH, and the energy controller 100 always broadcasts a beacon frame 1009 at the beginning of the active time interval of each CH. The beacon frame 1009 includes control information related to a frame, such as the length of an active time interval, the length of an inactive time interval, and the time (beacon period) until the subsequent beacon frame is transmitted.

Figure 37:
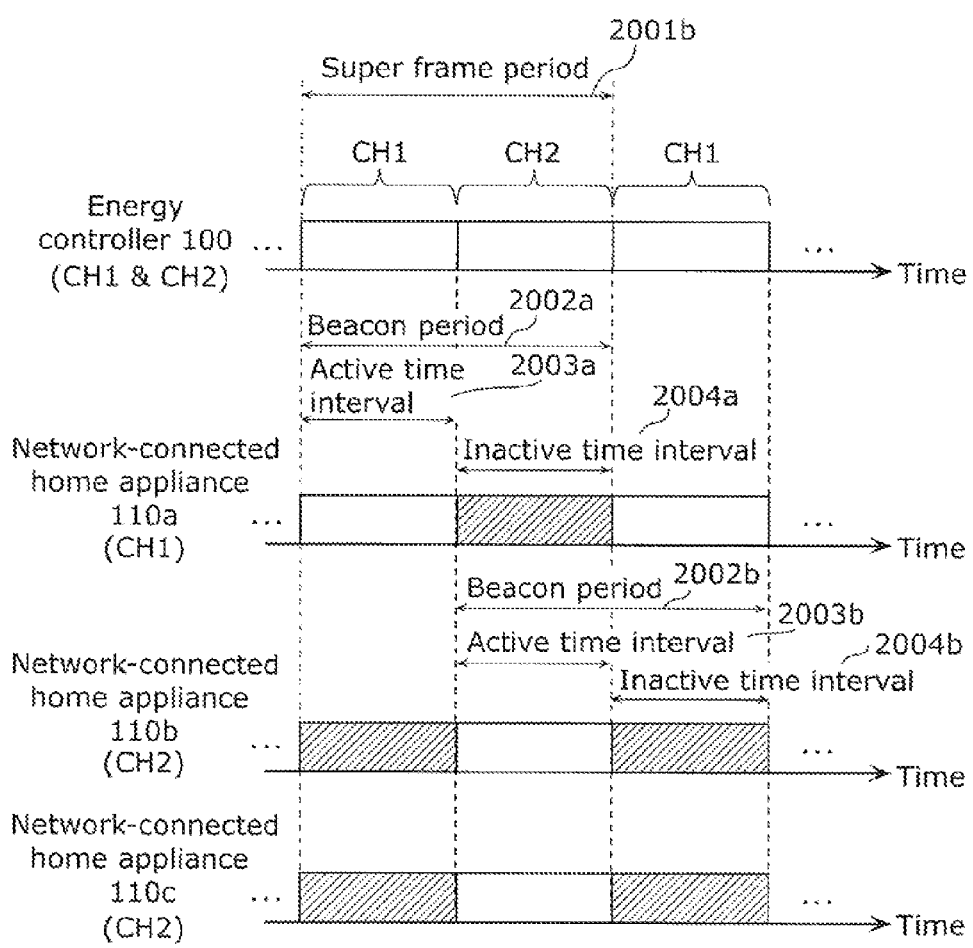
FIG. 37 is a diagram showing the correspondence between time and frequency channels of the energy controller and network-connected home appliances in Embodiment 6 of the present invention.

FIG. 37 is a diagram showing, on the time-axis, the relationship between the channels on which the energy controller 100 and the network-connected home appliances 110a, 110b, 110c in the present Embodiment 6 communicate with each other. FIG. 37 shows an example in which the energy controller 100 hops between CH1 and CH2. The number of channels for hopping is not necessarily limited to 2, however, in FIG. 37, hopping is assumed to be performed between CH1 and CH2 for the sake of convenience of description.

The energy controller 100 performs communication while switching between CH1 and CH2 repeatedly. The super frame period 2001b in this case is the sum of the active time interval of CH1 and the active time interval of CH2.

Next, it is assumed that the network-connected home appliances 110a, 110b, 110c do not hop between channels, and perform communication on a fixed channel.

That is to say, in the example of FIGS. 35 and 37, the network-connected home appliance 110a communicates with the energy controller 100 during an active time interval 2003a of CH1, and is set in an inactive time interval 2004a during the interval of CH2.

That is to say, a beacon period 2002a for the network connected home appliance 110a is the sum of the active time interval 2003a and the inactive time interval 2004a.

Similarly, the network connected home appliance 110b and the network connected home appliance 110c communicate with the energy controller 100 during an active time interval 2003b of CH2, and are set in an inactive time interval 2004b during the interval of CH1. That is to say, a beacon period 2002b for the network-connected home appliances 110b and 110c is the sum of the active time interval 2003b and the inactive time interval 2004b.

That is to say, the time slot of the inactive time interval 2004a for the network-connected home appliance 110a is the time slot of the active time interval 2003b for the network-connected home appliances 110b and 110c.

As described above, the present Embodiment 6 provides a system, in which the energy controller 100 hops between channels and the network-connected home appliances 110a, 110b, 110c communicate with the energy controller 100 on respective fixed channels.

In addition, low power consumption is achieved by each of the network-connected home appliances 110a, 110b, 110c, which uses a channel for communication and sets a period as an inactive time interval (for example, the inactive time intervals 2004a, 2004b), the period during which the energy controller 100 performs communication on a separate channel.

Figure 38:
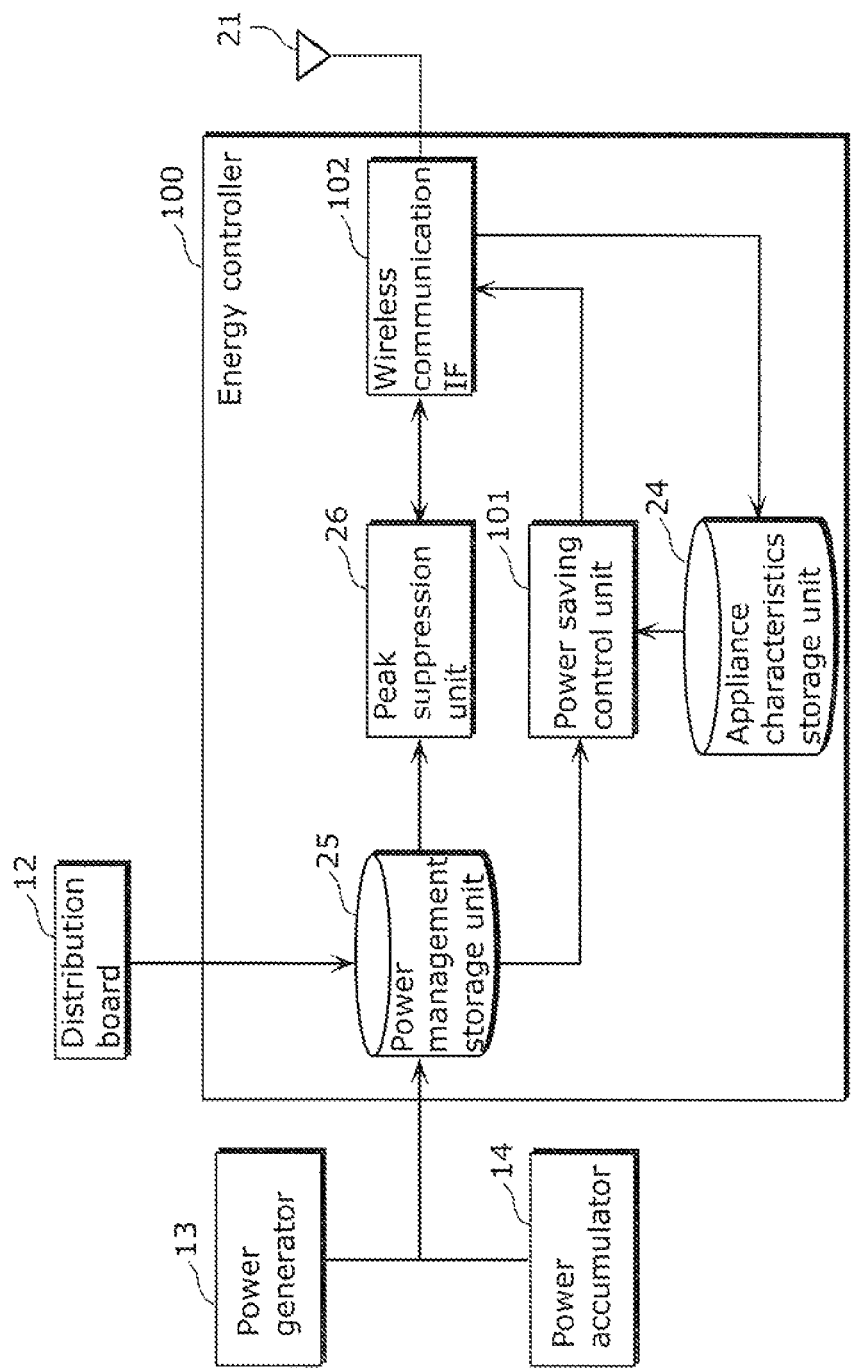
FIG. 38 is a block diagram showing the functional configuration of the energy controller in Embodiment 6 of the present invention.

FIG. 38 is a block diagram showing an example of the functional configuration of the energy controller 100 in Embodiment 6 of the present invention. A block having the same function as a block in the energy controller 10, which has been described with reference to FIG. 2 is labeled with the same numeral, and description is omitted here.

As shown in FIG. 38, the energy controller 100 includes a wireless communication IF 102 and a power saving control unit 101 in addition to the appliance characteristics storage unit 24, the power management storage unit 25, and the peak suppression unit 26 that are the same components as those included in the energy controller 10.

The wireless communication IF 102 transmits a beacon signal to the network-connected home appliances 110a to 110c on respective frequency channels, the beacon signal containing the information indicating a beacon period, an active time interval, and an inactive time interval. Specifically, the wireless communication IF 102 has functions of modulating data, demodulating data, controlling media access, generating a frame, switching between radio channels, and the like.

Examples of the wireless communication IF 102 include the functions of Physical Layer and MAC layer (Media Access Control Layer) that conform to the IEEE 802.15.4 standard. The details of the wireless communication IF 102 are described later in FIG. 39. The wireless communication IF 102 is included in "communication interface unit" described in the accompanying claims.

The power saving control unit 101 has a function of achieving power saving. In particular, the power saving control unit 101 has functions of calculating a beacon period, an active time interval, and an inactive time interval and changing the beacon period, the active time interval, and the inactive time interval, based on the home appliance characteristics table 24a, the power management table 25a, and the information of the number of frequency channels.

Specifically, the power saving control unit 23 determines a beacon period in such a manner that the beacon period is increased as a power value difference increases, which is the difference between the total power consumption value of the power consumption appliance and the available power supply value to the power consumption appliance containing the network-connected home appliances 110a to 110c. The details of the power saving control section 101 are described later in FIG. 40.

Figure 39:
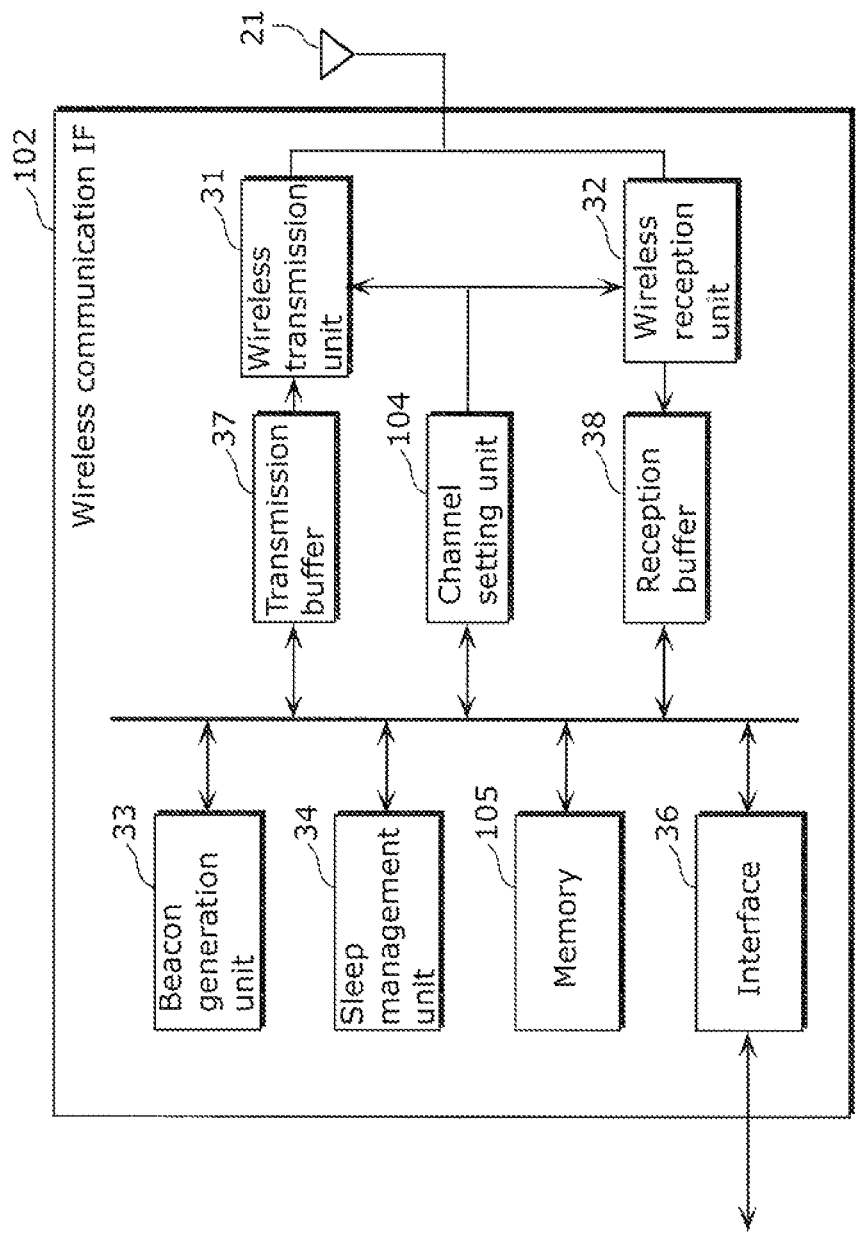
FIG. 39 is a block diagram showing the functional configuration of a wireless communication IF of the energy controller in Embodiment 6 of the present invention.

FIG. 39 is a block diagram showing the detailed functional configuration of the wireless communication IF 102 shown in FIG. 38. In FIG. 39, the same components as those of the wireless communication IF 22 shown in FIG. 3 are labeled with the same reference symbols, and description is omitted.

As shown in FIG. 39, the wireless communication IF 102 includes a channel setting unit 104 and a memory 105 in addition to the wireless transmission unit 31, the wireless reception unit 32, the beacon generation unit 33, the sleep management unit 34, the interface 36, the transmission buffer 37, and the reception buffer 38 that are the same components as those of the wireless communication IF 22.

As shown in FIG. 36, the channel setting unit 104 has a function of switching between channels in order to perform channel hopping. The current channel, the total number of channels, the order of channel hopping, and the like are stored in the memory 105.

The memory 105 stores information such as a beacon period, an active time interval, an inactive time interval, the current channel, the total number of channels, the order of channel hopping. The total number of channels is the total number of the frequency channels that are currently utilized, and corresponds to "number of frequency channels" described in the accompanying claims. The memory 105 includes the function of "number-of-channel storage unit" described in the accompanying claims.

Figure 40:
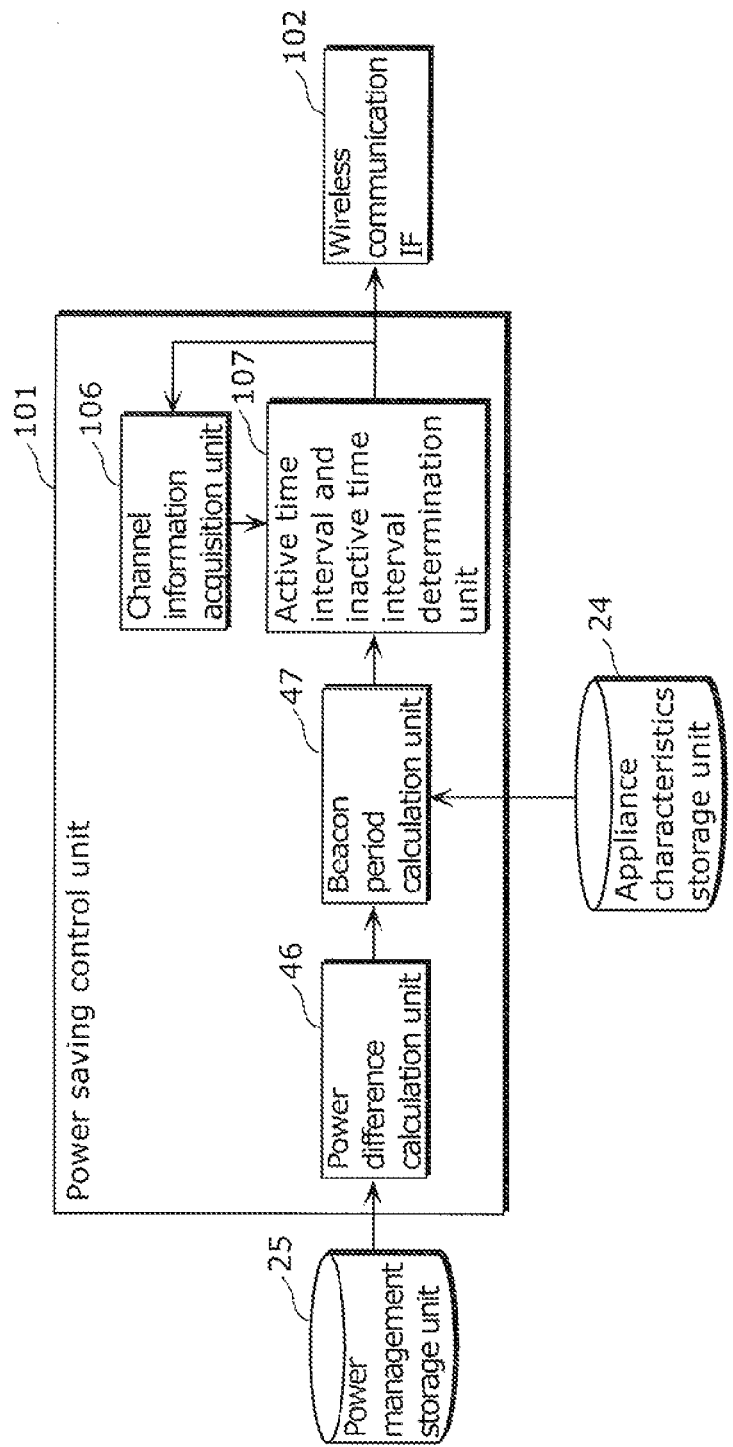
FIG. 40 is a block diagram showing the functional configuration of a power saving control unit of the energy controller in Embodiment 6 of the present invention.

FIG. 40 is a block diagram showing the detailed functional configuration of the power saving control unit 101 shown in FIG. 38. A block having the same function as a block in the power saving control unit 23, which has been described with reference to FIG. 6 is labeled with the same numeral, and description is omitted here.

As shown in FIG. 40, the power saving control unit 101 includes a channel information acquisition unit 106, and an active time interval and inactive time interval determination unit 107 in addition to the power difference calculation unit 46 and the beacon period calculation unit 47 that are the same components as those included in the power saving control unit 23.

The beacon period calculation unit 47 has the same function as that of FIG. 6 of Embodiment 1. Consequently, in the example using the above-mentioned Expression 1, the beacon period is calculated to be 6 sec.

The channel information acquisition unit 106 has a function of acquiring the information related to the total number of channels from the memory 105 of the wireless communication IF 102. For example, in the wireless network system of FIG. 37 of the present Embodiment 6, CH1 and CH2 are used and the total number of channel is 2.

The active time interval and inactive time interval determination unit 107 has a function of calculating an active time interval and an inactive time interval in a beacon period based on the information of the beacon period calculated by the beacon period calculation unit 47 and the total number of channels acquired by the channel information acquisition unit 106. The calculation method of the active time interval is as follows.

$$\text{active time interval} = \text{beacon period} \times \{1-(1/\text{total number of channels})\} \quad \text{(Expression 3)}$$

The calculation method of the inactive time interval is as follows.

$$\text{inactive time interval} = \text{beacon period} \times \{1-(1-/\text{total number of channels})\} \quad \text{(Expression 4)}$$

That is to say, the active time interval and inactive time interval determination unit 107 calculates an active time interval by multiplying a beacon period by the reciprocal of the total number of channels, and calculates an inactive time interval by multiplying a beacon period by the value obtained by subtracting the reciprocal of the total number of channels from 1.

For example, in the case where the beacon period of 8 sec is calculated by the beacon period calculation unit 47, and the total number of channels of 2 is acquired by the channel information acquisition unit 106, the active time interval and inactive time interval determination unit 107 calculates an active time interval of 4 sec (=8×½) and an inactive time interval of 4 sec (=8×(1−½)). The active time interval and inactive time interval determination unit 107 stores the calculated beacon period, active time interval, and inactive time interval into the memory 105 of the wireless communication IF 102.

An example of a wireless network system is considered in which the energy controller 100 hops between CH1, CH2, CH3, and CH4. In the case where the beacon period of 4 sec is calculated by the beacon period calculation unit 47, the active time interval and inactive time interval determination unit 107 acquires 4 by the channel information acquisition unit 106, and calculates an active time interval of 1 sec (=4×¼) and an inactive time interval of 3 sec (=4×(1−¼)). The active time interval and inactive time interval determination unit 107 stores the calculated beacon period, active time interval, and inactive time interval into the memory 105 of the wireless communication IF 102.

The functional configuration of the network-connected home appliances 110a, 110b, 110c in the present Embodiment 6 is similar to the functional configuration of the network-connected home appliances 11a, 11b, 11c shown in FIG. 9 of Embodiment 1, and thus description is omitted.

That is to say, in the present Embodiment 6, the energy controller 100 performs channel hopping, however, the network-connected home appliances 110a, 110b, 110c do not perform channel hopping. Therefore, the network-connected home appliances 110a to 110c have the same functional configuration as that of the network-connected home appliances 11a to 11c in Embodiment 1.

Figure 41:
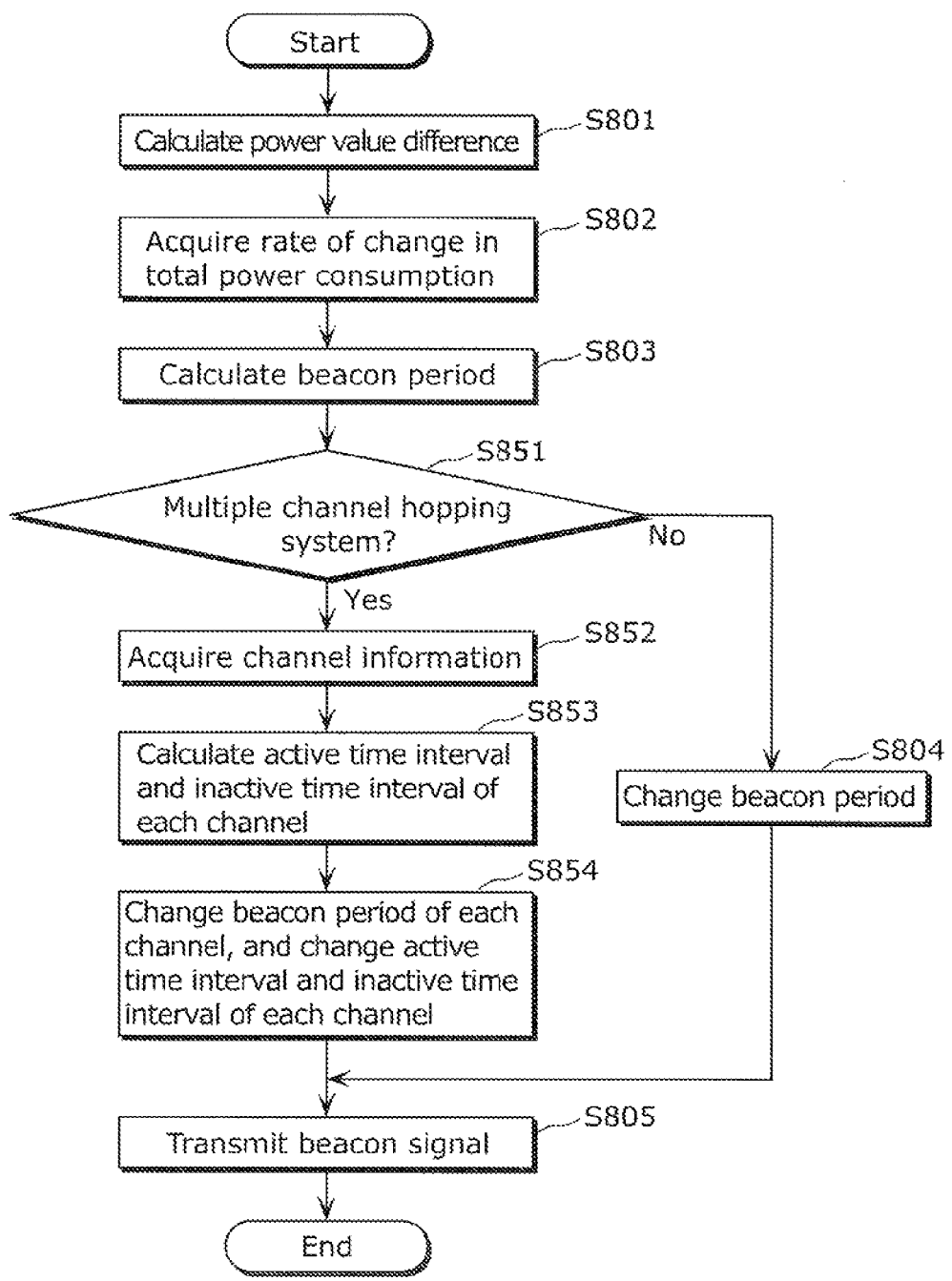
FIG. 41 is a flowchart showing the operation of the power saving control unit of the energy controller in Embodiment 6 of the present invention.

FIG. 41 is a flowchart showing the operation of a method of changing a beacon period, an active time interval, and an inactive time interval by the power saving control unit 101 in Embodiment 6 of the present invention. In the present processes, the processes of S801 to S803, S804 and S805 in FIG. 41 are respectively the same as the processes of S801 to S803, S804 and S805 that have been described with reference to FIG. 11, and thus description is omitted here.

As shown in FIG. 41, at first, the power difference calculation unit 46 of the power saving control unit 101 calculates an available power supply value to the power consumption appliance, and a power value difference between the available power supply value and the total power consumption value of the power consumption appliance (S801).

Subsequently, the beacon period calculation unit 47 acquires the maximum value of the maximum rate of change, as the rate of change of the total power consumption value of the power consumption appliance, from the home appliance characteristics table 24a (S802).

Subsequently, the beacon period calculation unit 47 calculates a beacon period based on the above-mentioned Expression 1 by dividing the power value difference by the maximum value of the maximum rate of change (S803).

Subsequently, the power saving control unit 101 checks whether or not the present wireless network system is a multiple channel hopping system (S851). Specifically, the power saving control unit 101 checks whether or not the present wireless network system is a multiple channel hopping system by referring to the memory 105 of the wireless communication IF 102.

When the power saving control unit 101 determines that the wireless network system is not a multiple channel hopping system (No at S851), the beacon period calculation unit 47 changes the current beacon period by setting the calculated beacon period to the memory 35 of the wireless communication IF 102 in the same manner as in Embodiment 1 (S804).

On the other hand, when the power saving control unit 101 determines that the wireless network system is a multiple channel hopping system (Yes at S851), the channel information acquisition unit 106 acquires the information of the total number of channels from the memory 105 of the wireless communication IF 102 (S852).

Subsequently, the active time interval and inactive time interval determination unit 107 calculates an active time interval based on the above-mentioned Expression 3, and calculates an inactive time interval based on the above-mentioned Expression 4 (S853).

Subsequently, the active time interval and inactive time interval determination unit 107 changes the current beacon period, active time interval, and inactive time interval by setting the calculated beacon period, active time interval, and inactive time interval to the memory 105 of the wireless communication IF 102 (S854).

As described above, the power saving control unit 23 determines a beacon period in such a manner that the beacon period is increased as a power value difference increases, which is the difference between the available power supply value to the power consumption appliance and the total power consumption value of the power consumption appliance.

The wireless communication IF 102 then transmits a beacon signal to the network-connected home appliances 110a to 110c on respective frequency channels, the beacon signal containing the information indicating a beacon period, an active time interval, and an inactive time interval (S805).

According to the present Embodiment 6, in a wireless network system where a wireless control station hops between a plurality of frequency channels to communicate with the wireless terminal devices, a beacon period is calculated by taking into consideration the characteristics of the rate of change in the power consumption of the home appliances that are connected, and the power value difference between the available power supply value and the total power consumption value. In addition, an active time interval and an inactive time interval are calculated by taking the total number of channels of the wireless network system into consideration. Consequently, in a system where a wireless control station hops between a plurality of frequency channels, low power consumption may be achieved by setting a longer beacon period for a larger power value difference, and separating an active time interval from an inactive time interval. Furthermore, a shorter beacon period is set for a smaller power value difference, and thus a request for peak suppression can be immediately processed.

As described above, with the energy controller 10 which is a communication device according to the present invention, a beacon period is calculated based on the characteristics of the rate of change in the power consumption of the home appliances, and the power value difference between the available power supply value (the home power generation power supply value, the electric power rate change boundary value, the distribution board supply capability value) and the total power consumption value. Therefore, control for peak suppression can be made without delay and fail, and a longer beacon period is set for a longer power value difference, and thus low power consumption of the communication terminal devices may be achieved.

In addition, the energy controller 10 may be applied to a wireless network system in which the beacon period is defined by several types of patterns as in the IEEE 802.15.4 standard. Consequently, the beacon period can be dynamically controlled in a system in which the beacon period is defined by several types of patterns.

Furthermore, the energy controller 10 may be applied to a wireless network system in which a plurality of applications having different allowable delay times are operated. Consequently, setting of a beacon period exceeding the allowable delay times for the applications may be prevented, and thus the allowable times for the applications may be satisfied.

Furthermore, a transmission period of awake data which controls the sleep state and the awake state of a communication terminal device is calculated based on the characteristics of the rate of change in the power consumption of the home appliances, and the power value difference between the available power supply value (the home power generation power supply value, the electric power rate change boundary value, the distribution board supply capability value) and the total power consumption value. Therefore, control for peak suppression can be made without delay and fail, and a longer transmission period of awake data is set for a longer power value difference, and thus low power consumption of the communication terminal devices may be achieved. Consequently, even in a communication network system in which a beacon frame is not utilized, a longer transmission period of awake data is set for a larger power value difference, and thus low power consumption is achieved, while a Shorter transmission period of awake data is set for a smaller power value difference, and thus a request for peak suppression can be immediately processed.

In addition, the energy controller 10 may be utilized not only in a wireless network system but also in a PLC network system.

Furthermore, even in a communication network system where a plurality of frequency channels are utilized, a beacon period is calculated based on the characteristics of the rate of change in the power consumption of the home appliances, and the power value difference between the available power supply value (the home power generation power supply value, the electric power rate change boundary value, the distribution board supply capability value) and the total power consumption value. Therefore, control for peak suppression can be made without delay and fail, and a longer beacon period is set for a longer power value difference, and thus low power consumption of the communication terminal devices may be achieved. Not only a beacon period is calculated, but also an active time interval and an inactive time interval in the beacon period are calculated for each of all channels in use, and thus low power consumption of the communication terminal devices which operate in respective frequency channels may be achieved in their inactive time intervals.

In the above, the communication device according to the present invention has been described using the above-described embodiments, however the present invention is not limited to these embodiments.

That is to say, it should be understood that the embodiments disclosed herein are intended for illustrative purposes in all senses and not in a limiting sense. The scope of the present invention is shown by the accompanying claims, and not by of the above description. It is intended that the accompanying claims and all modifications in the sense and range of the equivalents are included in the scope of the present invention.

Figure 42:
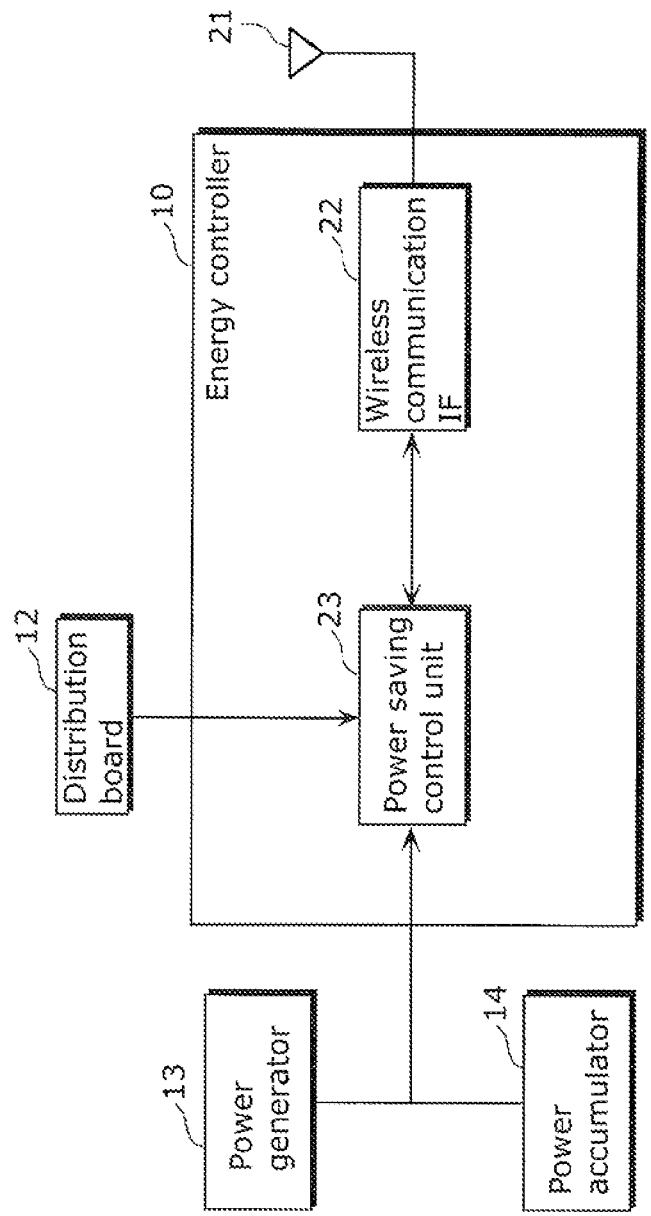
FIG. 42 is a block diagram showing the functional configuration of an energy controller in a modification of an embodiment of the present invention.
Figure 43:
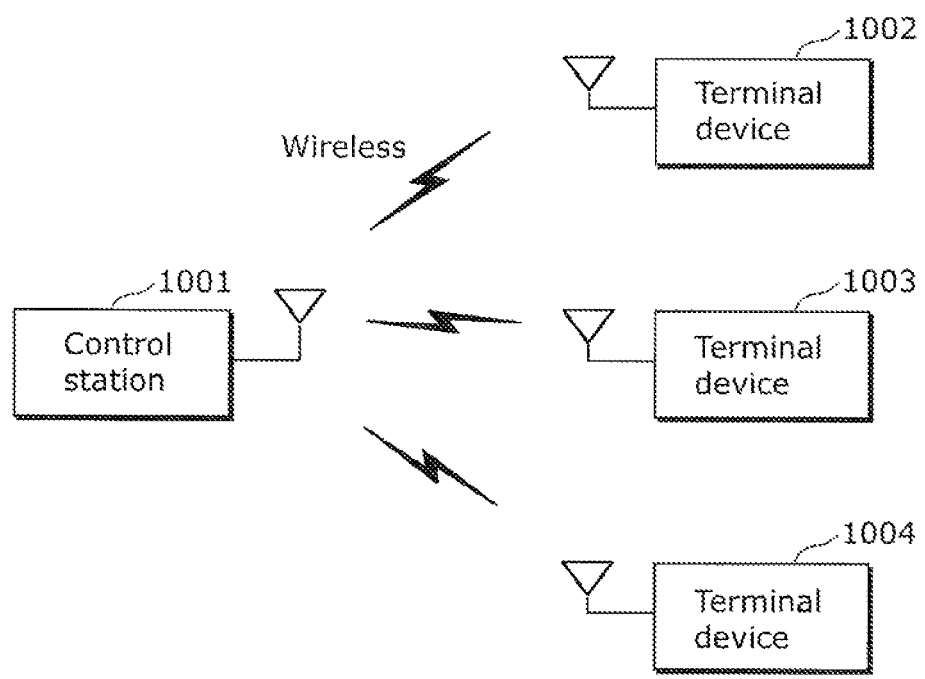
FIG. 43 is a diagram showing an example of a conventional wireless network configuration.

For example, in Embodiment 1 of the present invention, as shown in FIG. 42, the energy controller 10 needs to include the power saving control unit 23 and the wireless communication IF 22, but does not need to include any of the appliance characteristics storage unit 24, the power management storage unit 25, and the peak suppression unit 26. FIG. 42 is a block diagram showing the functional configuration of an energy controller in a modification of an embodiment of the present invention. That is to say, the power saving control unit 23 determines a beacon period based on the information obtained from the distribution board 12, the power generator 13, and the power accumulator 14 in such a manner that the beacon period is increased as a power value difference increases, which is the difference between the available power supply value to the power consumption appliance and the total power consumption value of the power consumption appliance. The wireless communication IF 22 transmits a beacon signal containing the information indicating the determined beacon period to the network-connected home appliances 11*a* to 11*c*. The energy controller in other Embodiments 2 to 6 may have a similar configuration to that of the energy controller 10 shown in FIG. 42.

In Embodiment 1, Embodiment 2, Embodiment 3, Embodiment 4, Embodiment 5, and Embodiment 6 of the present invention, a system is considered to have a configuration of devices with EMS application, in which a device having the function of a control station serves as an energy controller, and a device having the function of a terminal device serves as a network-connected home appliance. However, the configuration is not limited to the above-described configuration, and a device having the function of a control station may serve as a television, or a terminal device may serve not only as a network-connected home appliance, but also as an electronic control door or as an electric vehicle. Alternatively, the functions of a control station and a terminal unit are independently separated, and a communication adapter which can be externally connected to home appliances may be used. Consequently, the present invention may not only be applied to an energy controller and a network-connected home appliance, but also be mounted on or externally attached to all types of electrical machinery, and electronic devices.

The wireless communication IF in Embodiment 1, Embodiment 2, Embodiment 3, Embodiment 4, and Embodiment 6 of the present invention, and the PLC communication IF in Embodiment 5 of the present invention are not limited to only wireless or a power line (electric wire), but may be an interface connected to a telephone line, a coaxial cable, an optical cable, or the like. In addition, the wireless communication IF or the PLC communication IF may be a communication interface such as Ethernet(®), USB (Universal Serial Bus), HDMI (High-Definition Multimedia Interface)(®), or IEEE1394. Consequently, the energy controller and network connected home appliance of the present invention may perform communication via various transmission media.

Application used in Embodiment 1, Embodiment 2, Embodiment 3, Embodiment 4, Embodiment 5, and Embodiment 6 of the present invention has been assumed to be peak cut or peak shift for the purpose of suppressing the peak of the power consumption of the home appliances in a house. However, the application is not limited to these, and DSM (Demand Side Management) and DR (Demand Response) for the purpose of achieving smart grid, security intrusion notification for the purpose of crime prevention security, home appliance control from the outside of a house for the purpose of comfortable convenience, or traceability of a home appliance for the purpose of product safety. Accordingly the control station and the terminal device of the present invention may be operated with various applications.

Application used in Embodiment 1, Embodiment 2, Embodiment 3, Embodiment 4, Embodiment 5, and Embodiment 6 of the present invention has been assumed to be peak cut or peak shift for the purpose of suppressing the peak of the power consumption of the home appliances in a house. When there is no target device of peak control, it may be easily considered that control of the beacon period can be stopped. For example, when peak suppression is not possible for all the appliances in peak suppression possibility Yes/No of FIG. 8, control of the beacon period may be dynamically controlled and stopped.

The home appliance characteristics table 24a in Embodiment 1, Embodiment 2, Embodiment 3, Embodiment 4, Embodiment 5, and Embodiment 6 of the present invention may be pre-stored by the energy controller, however the invention is not limited to this case, and the home appliance characteristics table 24a may be generated while the energy controller monitors the operational situation of each appliance. For example, by monitoring the temporal variation in the power consumption of a microwave oven, the energy controller can acquire a rate of change and update the rate of change.

It is also possible to create a new configuration by combining the respective components in Embodiment 1, Embodiment 2, Embodiment 3, Embodiment 4, Embodiment 5, and Embodiment 6 of the present invention. For example, by combining the energy controller 10b of Embodiment 5 and the energy controller 100 of Embodiment 6, a configuration may be made in which multiple channel hopping is utilized in a PLC network system. Accordingly, a PLC network with multiple channels may be utilized.

The unit of power consumption is W (Watt) in Embodiment 1, Embodiment 2, Embodiment 3, Embodiment 4, Embodiment 5, and Embodiment 6 of the present invention, however, the invention is not limited to this case, and Watt hour (Wh), or kilo Watt hour (kWh) may be used as the unit of power consumption amount. Not only power consumption or power consumption amount, but also current consumption (unit: ampere) or voltage consumption (unit: bolt) may be used.

Furthermore, the configurations of Embodiment 1, Embodiment 2, Embodiment 3, Embodiment 4, Embodiment 5, and Embodiment 6 of the present invention may be achieved as a program to be executed by a computer with a CPU or an MPU. The program may also be stored in a storage medium such as a ROM (Read Only Memory) or a RAM (Random Access Memory), or may be distributed via a transmission medium such as the Internet.

The configurations of Embodiment 1, Embodiment 2, Embodiment 3, Embodiment 4, Embodiment 5, and Embodiment 6 of the present invention are not limited to the configuration of software which is operated with a CPU or an MPU, and may be typically achieved by hardware such as an LSI (Large Scale Integration) which is an integrated circuit. Each of these configurations may be individually implemented as a single chip, or all or part of the configurations may be implemented as a single chip. The integrated circuit may be referred to as IC, system LSI, super LSI, Ultra LSI, or the like depending on the degree of integration. Alternatively, the technique for circuit integration is not limited to LSI, but the circuit integration may be achieved with a dedicated circuit or a general-purpose processor. In addition, FPGA (Field Programmable Gate Array), or a reconfigurable processor for which connection and setup of the circuit cells inside an LSI can be reconfigured may be utilized. Furthermore, in the case where new technology of circuit integration which replaces the current semiconductor technology is invented due to the progress of semiconductor technology or other emerging technology, naturally, a functional block may be integrated using the technology. Application of biotechnology may have such potential.

The present invention may be achieved not only as such a communication device, but also as a method including steps which are performed by corresponding processing units which constitute the communication device.

The communication device according to the present invention, and the control method of the transmission period of a beacon signal transmitted by the communication device are useful for an energy management system (EMS) such as peak suppression.

REFERENCE SIGNS LIST

10, 10b, 100, 1021 Energy controller
11a to 11c, 11ab to 11cb, 110a to 110c, 1022, 1023, 1024 Network-connected home appliance
12, 12b, 1025 Distribution board
13, 13b Power generator
14, 14b Power accumulator
21 Antenna
21b Outlet plug
22, 61, 92, 102 Wireless communication IF
22b, 61b PLC communication IF
23, 71, 81, 91, 101 Power saving control unit
24 Appliance characteristics storage unit
24a Household appliance characteristics table
25 Power management storage unit
25a, 25b Power management table
26 Peak suppression unit
31 Wireless transmission unit
31b PLC transmission unit
32 Radio reception unit
32b PLC reception unit
33 Beacon generation unit
34 Sleep management unit
35 Memory
36 Interface
37 Transmission buffer
38 Reception buffer
46 Power difference calculation unit
47 Beacon period calculation unit
51 Visualization control unit
52 Power visualization storage unit
52a Power visualization table
53 Threshold value monitor unit
54 Peak cut control unit
62 Peak suppression unit
65 Beacon analysis unit
66 Sleep management unit
72 Transmission period pattern storage unit
72a. Beacon table
73 Beacon period selection unit
82 Application allowable delay storage unit
82a Application allowable delay table
83 Beacon period comparison unit
93 Awake data generation unit
95 Power saving control unit
104 Channel setting unit
105 Memory
106 Channel information acquisition unit
107 Active period and inactive time interval determination unit
210 Electric light wiring
220 Wire
230 Wireless
1001 Control station
1002, 1003, 1004 Terminal unit
1006, 2002a, 2002b Beacon period 1007, 2003a, 2003b Active period
1008, 2004a, 2004b Inactive time interval
2001a, 2001b Super frame period

The invention claimed is:

1. A communication device for transmitting and receiving data to and from a communication terminal device by transmitting a signal during a transmission period for establishing transmission and reception of the data to the communication terminal device when the communication terminal device, which alternately switches between an active state and a sleep state, is switched to the active state, the active state being triggered by receipt of the signal and is a state in which communication is possible, and the sleep state being a state in which communication is not possible, the communication device comprising:
   a power saving control unit configured to control the transmission period used for transmitting the signal used for switching the communication terminal device from the sleep state to the active state in such a manner that the transmission period during which the signal is transmitted is increased as a power value difference increases, the power value difference being a value obtained by subtracting a total power consumption value of a power consumption appliance including the communication terminal device from an available power supply value for power available to the power consumption appliance; and
   a communication interface unit configured to transmit the signal containing information indicating the transmission period to the communication terminal device so as to set the communication terminal device in the active state with a period according to the transmission period determined by the power saving control unit.

2. The communication device according to claim 1, further comprising
   a power management storage unit configured to store a generated power value of a power generator, an accumulated power value of a power accumulator, and the total power consumption value of the power consumption appliance,
   wherein the power saving control unit is configured to calculate the power value difference by subtracting the total power consumption value from the available power supply value, which is set to a sum of the generated power value and the accumulated power value, and to determine the transmission period such that the transmission period is increased as the calculated power value difference increases.

3. The communication device according to claim 1, further comprising
   a power management storage unit configured to store an electric power rate change boundary value which is an electric power value at which an electric power rate is incremented, and the total power consumption value of the power consumption appliance,
   wherein the power saving control unit is configured to calculate the power value difference by subtracting the total power consumption value from the available power supply value, which is set to the electric power rate change boundary value, and to determine the transmission period such that the transmission period is increased as the calculated power value difference increases.

4. The communication device according to claim 1, further comprising
   a power management storage unit configured to store a distribution board supply capability value indicating a power value that can be supplied by a distribution board, and the total power consumption value of the power consumption appliance,
   wherein the power saving control unit is configured to calculate the power value difference by subtracting the total power consumption value from the available power supply value, which is set to the distribution board supply capability value, and to determine the transmission period such that the transmission period is increased as the calculated power value difference increases.

5. The communication device according to claim 1, further comprising
   an appliance characteristics storage unit configured to store respective rates of change in power consumption values in the power consumption appliance,
   wherein the power saving control unit is configured to calculate and determine a transmission period by dividing the power value difference by a value which is obtained by using a rate of change in the total power consumption value, the rate of change being calculated based on the rates of change in the power consumption values.

6. The communication device according to claim 1, further comprising
   a transmission period pattern storage unit configured to store transmission period patterns, each of which is a pattern of the transmission period,
   wherein the power saving control unit is configured to calculate a transmission period during which the signal is transmitted in such a manner that the transmission period is increased as the power value difference increases, and to determine a transmission period as the determined transmission period, which is less than or equal to the calculated transmission period and is longest among the transmission period patterns.

7. The communication device according to claim 1, further comprising
   an application allowable delay storage unit configured to store allowable delay times which may be allowed when predetermined application is executed,
   wherein the power saving control unit is configured to calculate a transmission period during which the signal is transmitted in such a manner that the transmission period is increased as the power value difference increases, and
   to determine an allowable delay time as the determined transmission period, which has a shortest value out of the allowable delay times which are stored in the application allowable delay storage unit when the calculated transmission period is longer than the shortest allowable delay time, and
   to determine the calculated transmission period as the determined transmission period when the calculated transmission period is shorter than or equal to the shortest allowable delay time.

8. The communication device according to claim 1,
   wherein the signal is a beacon signal, or an awake signal which controls the active state and the sleep state of the communication terminal device.

9. The communication device according to claim 1, further comprising
   a number-of-channel storage unit configured to store a number of frequency channels which is a total of frequency channels currently utilized,
   wherein the power saving control unit is further configured to calculate an active time interval and an inactive time interval in the determined transmission period by using the number of frequency channels, and the communication interface unit is configured to transmit the signal containing information indicating the transmission period, the active time interval, and the inactive time interval over each frequency channel.

10. The communication device according to claim 9, wherein the power saving control unit is configured to calculate the active time interval by multiplying the determined transmission period by a reciprocal of the number of frequency channels, and to calculate the inactive time interval by multiplying the determined transmission period by a value obtained by subtracting the reciprocal of the number of frequency channels from 1.

11. The communication device according to claim 1, wherein the communication interface unit is a wireless communication interface conforming to the IEEE 802.15.4 standard or a power line communication interface.

12. A method of communication for transmitting and receiving data to and from a communication terminal device by transmitting a signal during a transmission period for establishing transmission and reception of the data to the communication terminal device when the communication terminal device, which alternately switches between an active state and a sleep state, is switched to the active state, the active state being triggered by receipt of the signal and is a state in which communication is possible, and the sleep state being a state in which communication is not possible, the method comprising:

controlling a transmission period used for transmitting the signal used for switching the communication terminal device from the sleep state to the active state in such a manner that the transmission period during which the signal is transmitted is increased as a power value difference increases, the power value difference being a value obtained by subtracting a total power consumption value of a power consumption appliance including the communication terminal device from an available power supply value for power available to the power consumption appliance; and transmitting the signal containing information indicating the transmission period to the communication terminal device so as to set the communication terminal device in the active state with a period according to the transmission period determined by the controlling step.

13. A non-transitory computer-readable recording medium having a computer program recorded thereon for transmitting and receiving data to and from a communication terminal device by transmitting a signal during a transmission period for establishing transmission and reception of the data to the communication terminal device when the communication terminal device, which alternately switches between an active state and a sleep state, is switched to the active state, the active state being triggered by receipt of the signal and is a state in which communication is possible, and the sleep state being a state in which communication is not possible, the program causing a computer to execute:

controlling a transmission period used for transmitting the signal used for switching the communication terminal device from the sleep state to the active state in such a manner that the transmission period during which the signal is transmitted is increased as a power value difference increases, the power difference value being a value obtained by subtracting a total power consumption value of a power consumption appliance including the communication terminal device from an available power supply value for power available to the power consumption appliance; and transmitting the signal containing information indicating the transmission period to the communication terminal device so as to set the communication terminal device in the active state with a period according to the determined transmission period determined by the controlling step.

14. An integrated circuit for transmitting and receiving data to and from a communication terminal device by transmitting a signal during a transmission period for establishing transmission and reception of the data to the communication terminal device when the communication terminal device, which alternately switches between an active state and a sleep state, is switched to the active state, the active state being triggered by receipt of the signal and is a state in which communication is possible, and the sleep state being a state in which communication is not possible, the integrated circuit comprising:

a power saving control unit configured to control the transmission period used for transmitting the signal used for switching the communication terminal device from the sleep state to the active state in such a manner that the transmission period during which the signal is transmitted is increased as a power value difference increases, the power value difference being a value obtained by subtracting a total power consumption value of a power consumption appliance including the communication terminal device from an available power supply value for power available to the power consumption appliance; and a communication interface unit configured to transmit the signal containing information indicating the transmission period to the communication terminal device so as to set the communication terminal device in the active state with a period according to the transmission period determined by the power saving control unit.

* * * * *